United States Patent
Shipton

(10) Patent No.: US 7,891,253 B2
(45) Date of Patent: Feb. 22, 2011

(54) CAPACITIVE FORCE SENSOR

(75) Inventor: Gary Shipton, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 68 days.

(21) Appl. No.: 12/100,403

(22) Filed: Apr. 10, 2008

(65) Prior Publication Data

US 2008/0250864 A1 Oct. 16, 2008

Related U.S. Application Data

(60) Provisional application No. 60/911,260, filed on Apr. 11, 2007.

(51) Int. Cl.
*G01B 7/16* (2006.01)

(52) U.S. Cl. .................... 73/780; 73/862.626

(58) Field of Classification Search .............. 73/780, 73/862.626
See application file for complete search history.

(56) References Cited

U.S. PATENT DOCUMENTS

| | | | | |
|---|---|---|---|---|
| 3,995,696 A * | 12/1976 | Kainer et al. | .................. | 172/7 |
| 4,198,670 A * | 4/1980 | Mann | ...................... | 361/283.4 |
| 4,398,426 A * | 8/1983 | Park et al. | ...................... | 73/724 |
| 4,582,152 A * | 4/1986 | Gibbons | .................. | 177/210 C |
| 4,743,836 A * | 5/1988 | Grzybowski et al. | ........ | 324/678 |
| 4,864,618 A | 9/1989 | Wright et al. | | |
| 4,977,480 A * | 12/1990 | Nishihara | ................. | 361/283.4 |
| 5,051,736 A | 9/1991 | Bennett et al. | | |
| 5,477,012 A | 12/1995 | Sekendur | | |
| 5,652,412 A | 7/1997 | Lazzouni et al. | | |
| 5,661,506 A | 8/1997 | Lazzouni et al. | | |
| 5,692,073 A | 11/1997 | Cass | | |
| 5,770,802 A * | 6/1998 | Berthold et al. | ............... | 73/765 |
| 5,804,736 A * | 9/1998 | Klauder et al. | ................ | 73/724 |
| 5,852,434 A | 12/1998 | Sekendur | | |
| 5,854,625 A * | 12/1998 | Frisch et al. | ................ | 345/173 |
| 6,026,694 A * | 2/2000 | Gray | ...................... | 73/862.68 |
| 6,076,734 A | 6/2000 | Dougherty et al. | | |
| 6,496,348 B2 * | 12/2002 | McIntosh | .................... | 361/115 |
| 6,664,786 B2 * | 12/2003 | Kretschmann et al. | ...... | 324/259 |
| 6,744,264 B2 * | 6/2004 | Gogoi et al. | ................ | 324/658 |
| 6,834,258 B2 * | 12/2004 | Schulte et al. | ............. | 702/183 |
| 6,888,358 B2 * | 5/2005 | Lechner et al. | ............ | 324/607 |
| 6,964,374 B1 | 11/2005 | Djuknic et al. | | |
| 7,236,113 B1 * | 6/2007 | Wang | ........................ | 341/143 |
| 2007/0014490 A1 | 1/2007 | Silverbrook et al. | | |
| 2007/0025805 A1 | 2/2007 | Silverbrook et al. | | |

FOREIGN PATENT DOCUMENTS

| | | |
|---|---|---|
| GB | 2306669 A | 5/1997 |
| WO | WO 99/50787 A1 | 1/1999 |
| WO | WO 99/18487 A2 | 4/1999 |
| WO | WO 2006/132960 A1 | 12/2006 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

*Primary Examiner*—Max Noori

(57) ABSTRACT

A force sensor is provided which has a capacitive sensor circuit incorporating a sensor capacitor having variable capacitance $C_{sen}$ arranged so that an output of the capacitive sensor circuit is proportional to $1/C_{sen}$.

5 Claims, 37 Drawing Sheets

CAPACITIVE FORCE SENSOR

FIELD OF THE INVENTION

The present invention relates to force sensors. It has been developed primarily to provide force sensors for use in optical sensing devices, such as pens, pointers and the like.

CO-PENDING APPLICATIONS

The following applications have been filed by the Applicant simultaneously with the present application:
12100405 12100407 12100408

The disclosures of these co-pending applications are incorporated herein by reference. The above applications have been identified by their filing docket number, which will be substituted with the corresponding application number, once assigned.

CROSS REFERENCES

The following patents or patent applications filed by the applicant or assignee of the present invention are hereby incorporated by cross-reference.

| | | | | | | |
|---|---|---|---|---|---|---|
| 6290349 | 6428155 | 6439706 | 6454482 | 6457883 | 6474773 | 6474888 |
| 6502614 | 6527365 | 6549935 | 6550997 | 6591884 | 6609653 | 6622999 |
| 6627870 | 6644545 | 6644642 | 6651879 | 6669385 | 6678499 | 6679420 |
| 6681045 | 6714678 | 6718061 | 6720985 | 6724374 | 6727996 | 6728000 |
| 6737591 | 6741871 | 6760119 | 6766942 | 6766944 | 6766945 | 6768821 |
| 6785016 | 6786397 | 6788293 | 6788982 | 6789191 | 6789194 | 6789731 |
| 6792165 | 6795593 | 6797895 | 6808330 | 6813039 | 6813558 | 6816274 |
| 6822639 | 6824044 | 6825945 | 6825956 | 6826547 | 6827116 | 6829387 |
| 6830196 | 6831682 | 6832717 | 6839053 | 6840606 | 6843420 | 6847883 |
| 6847961 | 6850931 | 6862105 | 6865570 | 6867880 | 6870966 | 6889896 |
| 6914593 | 6922779 | 6927871 | 6929186 | 6938826 | 6946672 | 6947027 |
| 6957768 | 6957921 | 6957923 | 6959298 | 6963845 | 6965439 | 6965454 |
| 6965882 | 6970264 | 6972864 | 6973450 | 6975299 | 6976035 | 6976220 |
| 6977746 | 6978019 | 6980306 | 6980318 | 6980704 | 6982701 | 6982703 |
| 6982798 | 6982807 | 6983878 | 6986459 | 6987506 | 6987573 | 6987581 |
| 6989911 | 6991153 | 6991154 | 6992662 | 6994264 | 6995859 | 6996274 |
| 7004390 | 7007851 | 7009738 | 7010147 | 7011128 | 7012710 | 7014123 |
| 7015900 | 7015901 | 7017823 | 7017826 | 7019319 | 7025276 | 7031010 |
| 7034953 | 7036918 | 7038066 | 7038797 | 7041916 | 7043096 | 7044363 |
| 7044381 | 7048178 | 7055739 | 7057608 | 7062651 | 7064851 | 7068382 |
| 7068389 | 7070110 | 7077333 | 7079712 | 7080780 | 7082562 | 7088459 |
| 7091344 | 7091960 | 7093923 | 7093991 | 7094910 | 7096199 | 7097094 |
| 7097106 | 7099019 | 7102772 | 7105753 | 7106888 | 7108192 | 7110126 |
| 7111791 | 7118025 | 7120853 | 7122076 | 7122685 | 7123239 | 7123245 |
| 7125098 | 7128265 | 7128270 | 7131058 | 7131596 | 7131724 | 7132612 |
| 7133557 | 7134598 | 7134601 | 7137549 | 7137566 | 7138391 | 7139431 |
| 7148345 | 7148499 | 7148644 | 7150396 | 7150398 | 7150404 | 7153956 |
| 7156289 | 7156292 | 7159777 | 7159784 | 7162088 | 7162222 | 7162259 |
| 7162269 | 7162442 | 7167270 | 7168867 | 7170499 | 7173722 | 7174056 |
| 7174329 | 7175079 | 7175089 | 7177054 | 7178718 | 7178719 | 7180507 |
| 7180609 | 7181448 | 7182247 | 7187370 | 7188769 | 7188930 | 7190346 |
| 7190474 | 7190491 | 7197374 | 7200591 | 7202959 | 7204941 | 7207483 |
| 7207485 | 7213756 | 7216224 | 7218978 | 7221781 | 7222098 | 7225402 |
| 7225979 | 7227527 | 7231293 | 7233320 | 7233924 | 7243835 | 7243849 |
| 7245294 | 7245760 | 7249901 | 7251050 | 7259884 | 7263225 | 7263270 |
| 7263508 | 7264173 | 7267273 | 7270266 | 7271931 | 7277085 | 7278018 |
| 7278566 | 7278727 | 7282164 | 7284701 | 7286113 | 7286887 | 7287688 |
| 7289103 | 7289882 | 7290210 | 7292363 | 7293233 | 7293234 | 7293240 |
| 7295332 | 7295839 | 7295922 | 7296737 | 7299969 | 7308148 | 7314177 |
| 7314181 | 7322524 | 7324859 | 7324989 | 7327485 | 7330974 | 7334739 |
| 7336267 | 7336389 | 7347357 | 7350236 | 11738974 | 11739014 | 11749158 |
| 11754310 | 11845672 | 11849360 | 11856061 | 11856062 | 11856064 | 11856066 |
| 11863253 | 11863255 | 11863258 | 11863262 | 11863263 | 11863264 | 11863265 |
| 11863266 | 11863267 | 11863268 | 11863269 | 11863270 | 11863271 | 11863273 |
| 11866305 | 11866313 | 11866324 | 11866348 | 11866359 | 11951874 | 11957470 |
| 11970951 | 12015477 | 12015487 | 12015507 | 12015508 | 12015509 | 12015510 |
| 12015511 | 12015512 | 12015513 | 12023005 | 12023860 | 12025746 | 12025747 |
| 12025748 | 12025749 | 12025750 | 12025751 | 12025754 | 12025756 | 12025757 |
| 12025759 | 12025760 | 12025761 | 12025762 | 12025764 | 12025765 | 12025766 |
| 12025767 | 12025768 | 12031615 | 12036264 | 12036266 | 12036904 | 12043851 |
| 12050161 | 12050927 | 12054194 | 12055316 | 12056254 | 12056260 | 60911260 |
| 60951700 | 60971535 | 60974077 | 61027756 | 09/575172 | 09/575181 | 09/575197 |
| 09/607843 | 09/693514 | 09/693690 | 09/722174 | 10/291471 | 10/291481 | 10/291523 |
| 10/291542 | 10/291546 | 10/291555 | 10/291559 | 10/291576 | 10/291592 | 10/291718 |
| 10/291821 | 10/291825 | 10/409864 | 10/492152 | 10/492161 | 10/492168 | 10/492169 |
| 10/502575 | 10/510391 | 10/510392 | 10/531229 | 10/531733 | 10/537159 | 10/683040 |
| 10/683151 | 10/685523 | 10/685583 | 10/685584 | 10/743671 | 10/778056 | 10/778057 |
| 10/778058 | 10/778059 | 10/778060 | 10/778061 | 10/778062 | 10/778063 | 10/778090 |
| 10/786631 | 10/793933 | 10/804034 | 10/815609 | 10/815610 | 10/815613 | 10/815614 |
| 10/815617 | 10/815618 | 10/815620 | 10/815621 | 10/815628 | 10/815630 | 10/815634 |
| 10/815635 | 10/815636 | 10/815637 | 10/815638 | 10/815642 | 10/815647 | 10/831232 |
| 10/893372 | 10/900129 | 10/901154 | 10/913350 | 10/913372 | 10/913373 | 10/913374 |
| 10/913376 | 10/913379 | 10/913380 | 10/917436 | 10/917466 | 10/917467 | 10/919379 |

-continued

| | | | | | | |
|---|---|---|---|---|---|---|
| 10/932044 | 10/943849 | 10/943856 | 10/943872 | 10/943874 | 10/943877 | 10/943878 |
| 10/944043 | 10/944044 | 10/949288 | 10/949307 | 10/954170 | 10/962412 | 10/962552 |
| 10/965733 | 10/965933 | 10/971146 | 10/974742 | 10/981616 | 10/981626 | 10/982974 |
| 10/982975 | 10/983029 | 10/986375 | 10/992713 | 11/020106 | 11/020260 | 11/020319 |
| 11/020321 | 11/026045 | 11/041556 | 11/041580 | 11/041609 | 11/041610 | 11/041624 |
| 11/041625 | 11/041626 | 11/041627 | 11/041648 | 11/041649 | 11/041650 | 11/041651 |
| 11/041652 | 11/041698 | 11/041723 | 11/051032 | 11/059674 | 11/074777 | 11/074782 |
| 11/074800 | 11/074802 | 11/075917 | 11/082815 | 11/082827 | 11/082829 | 11/082940 |
| 11/084742 | 11/084796 | 11/084806 | 11/102843 | 11/107817 | 11/107941 | 11/107944 |
| 11/123136 | 11/124256 | 11/144840 | 11/149160 | 11/154676 | 11/155556 | 11/155557 |
| 11/172814 | 11/172815 | 11/172816 | 11/182002 | 11/185722 | 11/188016 | 11/193435 |
| 11/193479 | 11/193481 | 11/193482 | 11/202218 | 11/202251 | 11/202252 | 11/202253 |
| 11/203200 | 11/203205 | 11/203424 | 11/206778 | 11/222977 | 11/227239 | 11/250465 |
| 11/281671 | 11/286334 | 11/298474 | 11/331109 | 11/349143 | 11/442385 | 11/442428 |
| 11/478590 | 11/480957 | 11/482985 | 11/482986 | 11/482990 | 11/488162 | 11/488163 |
| 11/488164 | 11/488165 | 11/488166 | 11/488167 | 11/488168 | 11/488832 | 11/495814 |
| 11/495820 | 11/495821 | 11/495822 | 11/495823 | 11/520170 | 11/583942 | 11/592990 |
| 11/603057 | 11/653219 | 11/653242 | 11/672522 | 11/672533 | 11/672891 | 11/672947 |
| 11/672950 | 11/672954 | 11/706309 | 11/706964 | 11/706966 | 11/712434 | 11/730392 |
| 11/737094 | 11/739032 | 11/743657 | 11/753570 | 11/754311 | 11/754312 | 11/754313 |
| 11/754314 | 11/754315 | 11/754316 | 11/754317 | 11/754318 | 11/754319 | 11/754320 |
| 11/754321 | 11/754370 | 11/756624 | 11/756625 | 11/756626 | 11/756627 | 11/756629 |
| 11/756630 | 11/756631 | 11/764694 | 11/782596 | 11/829936 | 11/830848 | 11/830849 |
| 11/831961 | 11/831962 | 11/831963 | 11/832629 | 11/832637 | 11/834628 | 11/839494 |
| 11/839497 | 11/839542 | 11/842948 | 11/863257 | 11/865711 | 11/866387 | 11/866394 |
| 11/934077 | 11/936638 | 11/944404 | 11/944449 | 12/047276 | 12/047311 | 12/047321 |
| 12/049376 | 12/049377 | 12/049379 | 12/049987 | 12/050005 | 12/050014 | 12/050025 |
| 12/050054 | 12/050067 | 12/050080 | 12/050092 | 12/050101 | 60/953443 | |

BACKGROUND OF THE INVENTION

The Applicant has developed the Netpage system discussed in detail below. As the invention is particularly well suited to sensing devices for this system, it will be described in a Netpage context. However, it will be appreciated that force sensors have uses in many applications. In particular, hand-held optical sensors have broad ranging applications in many different fields and the invention is not limited to its use within the Netpage system or, indeed, optical sensing devices.

The Netpage system involves the interaction between a user and a computer network (or stand alone computer) via a pen and paper based interface. The 'pen' is an electronic stylus with a marking or non-marking nib and an optical sensor for reading a pattern of coded data on the paper (or other surface).

One of the primary features of the Netpage pen is its ability to 'click' on interactive elements on a Netpage in the same way a mouse can click on screen-based interactive elements (e.g. hyperlinks and so on). However, with a Netpage pen, the user simply puts the nib on the interactive element in order to click on it. The optical sensor identifies the element via its unique page and location ID while a force sensor registers a 'pen down' condition when the nib is pressed against the page. Registering 'pen down' and 'pen up' is also fundamental to capturing the user's handwriting on Netpage input fields. Non-binary force signals are also captured for reproducing hand-drawn strokes with varying force-related width and opacity. Force variation can also be used as one of the dimensions examined during signature verification.

The force sensor is required to sense accurately relatively light forces (such as the force of handwriting on a nib). It should also require minimal power and be suitable for incorporation into a handheld sensing device.

SUMMARY OF THE INVENTION

In a first aspect the present invention provides a force sensor comprising a capacitive sensor circuit incorporating a sensor capacitor having variable capacitance $C_{sen}$ arranged so that an output of the capacitive sensor circuit is proportional to $1/C_{sen}$.

Optionally, the sensor capacitor is a parallel plate capacitor having one fixed plate and one movable plate.

Optionally, the movable plate is configured to move relative to the fixed plate due to a pressure force exerted on the movable plate thereby altering separation of the plates and said capacitance $C_{sen}$.

Optionally, a compression spring is connected to the movable plate.

Optionally, the sensor capacitor is positioned within a capacitive feedback circuit of the capacitive sensor circuit such that one of the plates of the sensor capacitor is connected directly to the capacitive sensor circuit.

Optionally, the capacitive sensor circuit is a sigma-delta convertor circuit.

In a second aspect the present invention provided a sensing device for interacting with a substrate, said sensing device comprising: a force sensor for detecting whether the sensing device is interacting with the substrate; and an image sensor for sensing coded data disposed on the substrate, said force sensor comprising a capacitive sensor circuit incorporating a sensor capacitor having variable capacitance $C_{sen}$ arranged so that an output of the capacitive sensor circuit is proportional to $1/C_{sen}$.

In a further aspect there is provided a sensing device comprising a processor configured for generating interaction data using the sensed coded data.

In another aspect there is provided a sensing device configured such that the image sensor senses the coded data only when the force sensor detects that the sensing device is interacting with the substrate.

In a further aspect there is provided a sensing device selected from the group comprising: a clicker lacking a nib or stylus, a pointer having a non-marking stylus; and a pen having a marking nib.

Optionally, the sensor capacitor is a parallel plate capacitor having one fixed plate and one movable plate.

Optionally, the movable plate is configured to move relative to the fixed plate due to a pressure force exerted on the movable plate thereby altering separation of the plates and said capacitance $C_{sen}$.

Optionally, a compression spring is connected to the movable plate.

Optionally, the sensor capacitor is positioned within a capacitive feedback circuit of the capacitive sensor circuit such that one of the plates of the sensor capacitor is connected directly to the capacitive sensor circuit.

Optionally, the capacitive sensor circuit is a sigma-delta convertor circuit.

In a third aspect the present invention provided a force sensor comprising a capacitive sensor circuit incorporating a sensor capacitor having a variable capacitance $C_{sen}$ and a reference capacitor relatively arranged so that the capacitive sensor circuit is near saturation when $C_{sen}$ is at a minimum expected value.

Optionally, the sensor capacitor is a parallel plate capacitor having one fixed plate and one movable plate.

Optionally, the movable plate is configured to move relative to the fixed plate due to a pressure force exerted on the movable plate thereby altering separation of the plates and said capacitance $C_{sen}$.

Optionally, a compression spring is connected to the movable plate.

Optionally, the capacitive sensor circuit is a sigma-delta convertor circuit.

Optionally, correlated double sampling is applied to an integrator of the sigma-delta convertor circuit.

In a fourth aspect the present invention provided a sensing device for interacting with a substrate, said sensing device comprising: a force sensor for detecting whether the sensing device is interacting with the substrate; and an image sensor for sensing coded data disposed on the substrate, said force sensor comprising a capacitive sensor circuit incorporating a sensor capacitor having a variable capacitance $C_{sen}$ and a reference capacitor relatively arranged so that the capacitive sensor circuit is near saturation when $C_{sen}$ is at a minimum expected value.

In a further aspect there is provided a sensing device comprising a processor configured for generating interaction data using the sensed coded data.

In another aspect there is provided a sensing device configured such that the image sensor senses the coded data only when the force sensor detects that the sensing device is interacting with the substrate.

In a further aspect there is provided a sensing device selected from the group comprising: a clicker lacking a nib or stylus, a pointer having a non-marking stylus; and a pen having a marking nib.

Optionally, the sensor capacitor is a parallel plate capacitor having one fixed plate and one movable plate.

Optionally, the movable plate is configured to move relative to the fixed plate due to a pressure force exerted on the movable plate thereby altering separation of the plates and said capacitance $C_{sen}$.

Optionally, a compression spring is connected to the movable plate.

Optionally, the capacitive sensor circuit is a sigma-delta convertor circuit.

Optionally, correlated double sampling is applied to an integrator of the sigma-delta convertor circuit.

BRIEF DESCRIPTION OF DRAWINGS

Optional embodiments of the invention will now be described, by way of non-limiting example only, with reference to the accompanying drawings, in which.

DETAILED DESCRIPTION OF PREFERRED AND OTHER EMBODIMENTS

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface).

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

Figure 2:
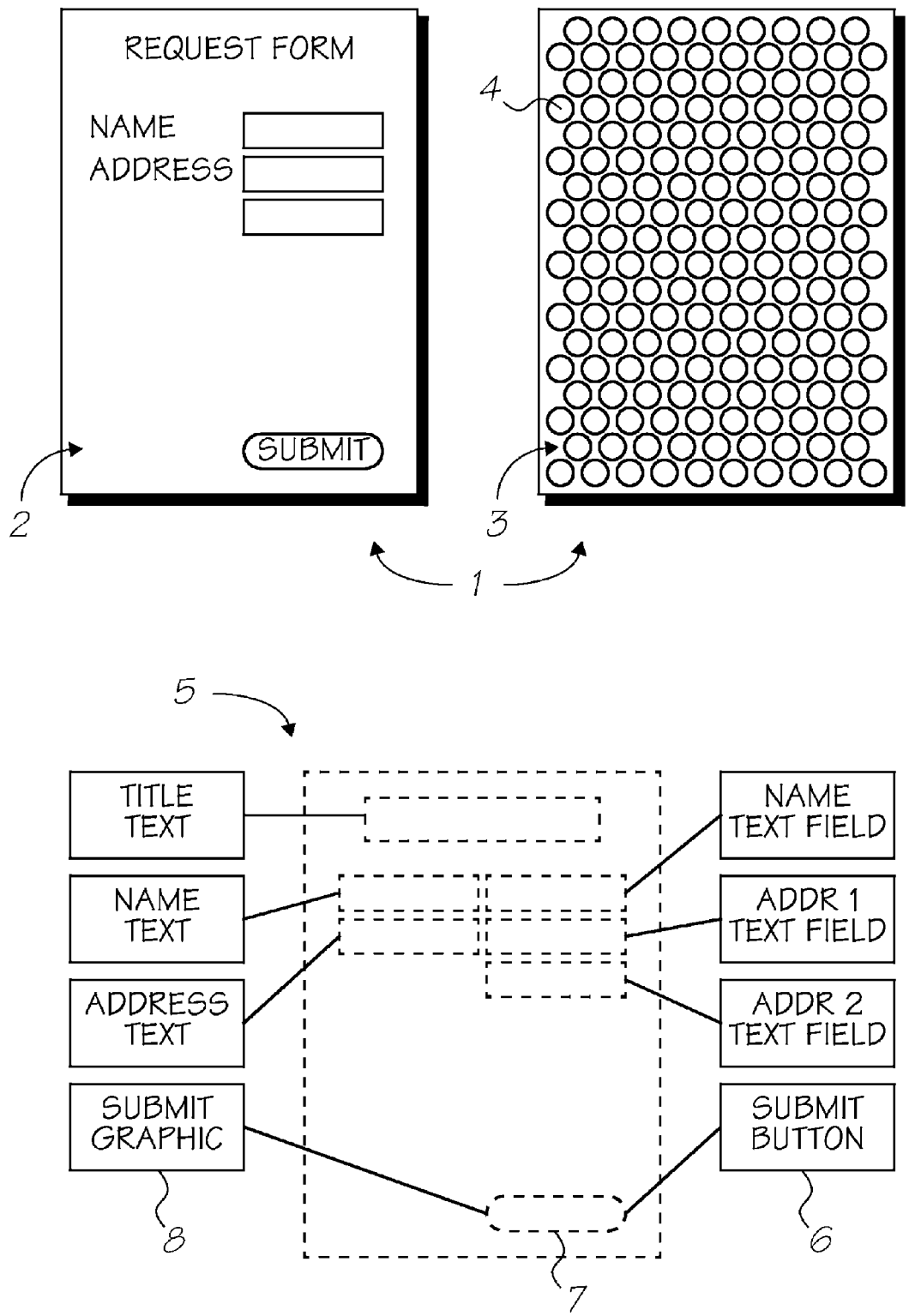
FIG. 2 is a schematic of a the relationship between a sample printed netpage and its online page description.

As illustrated in FIG. 2, a printed netpage 1 can represent an interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 1:
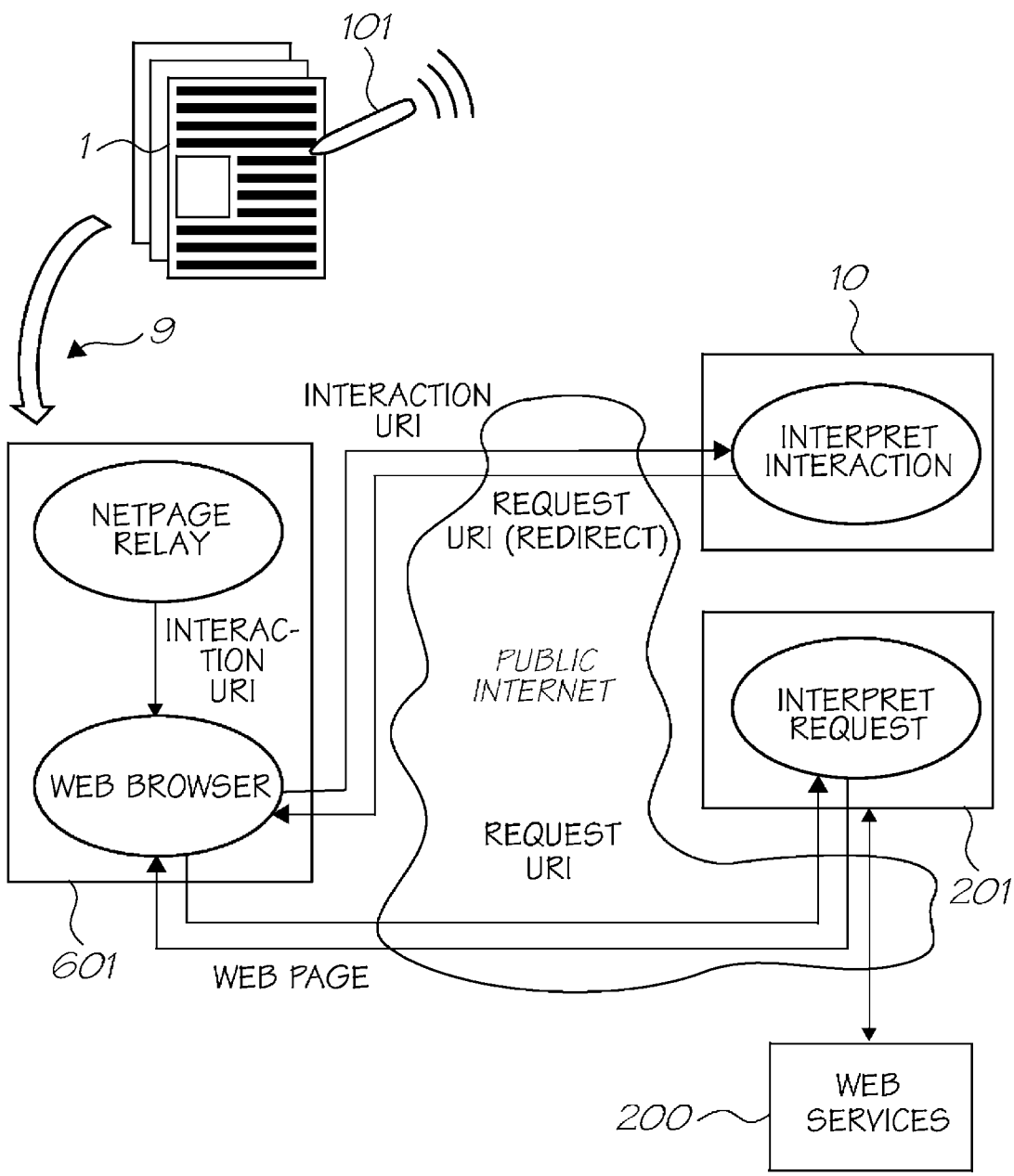
FIG. 1 shows an embodiment of basic netpage architecture.
Figure 3:
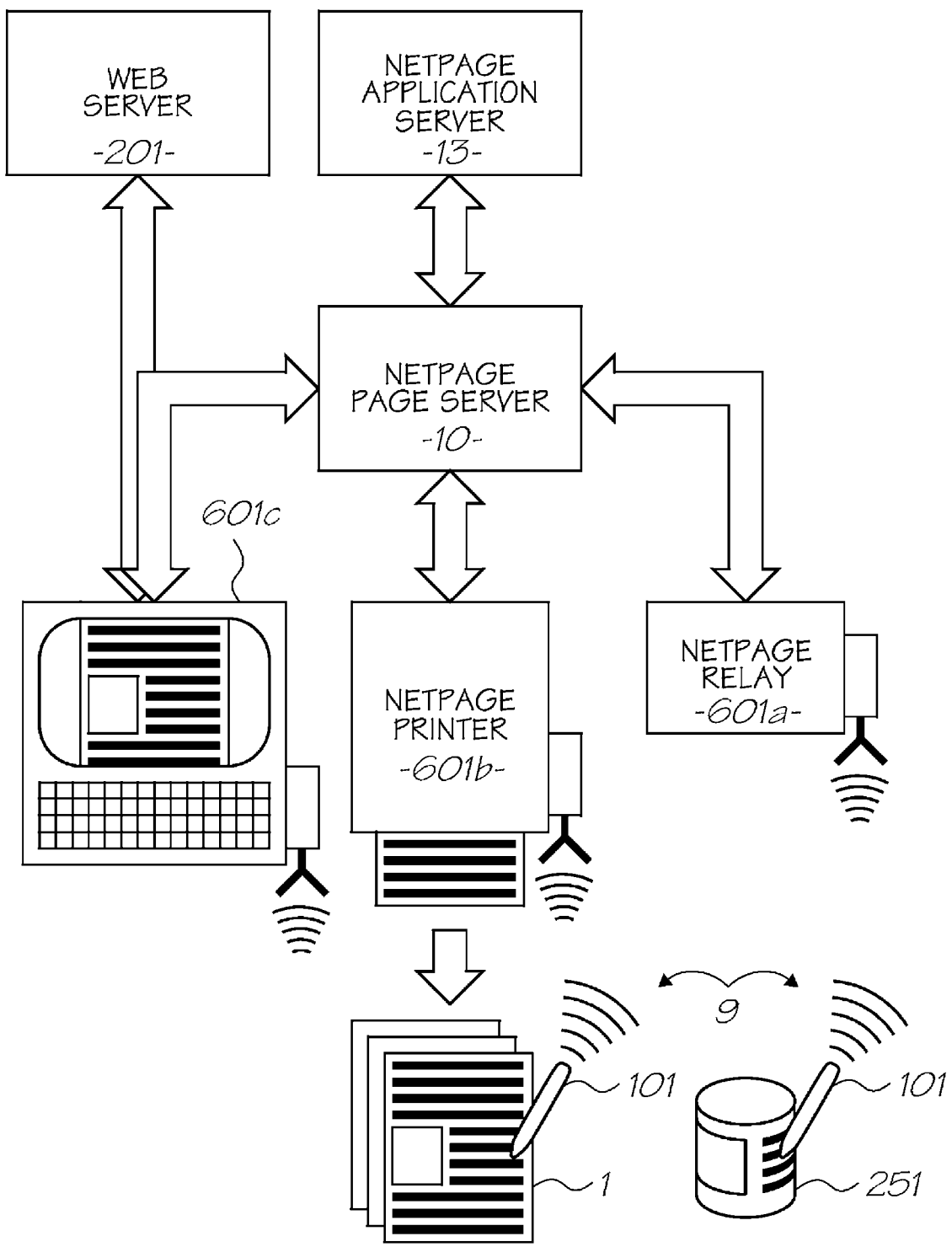
FIG. 3 shows an embodiment of basic netpage architecture with various alternatives for the relay device.
Figure 3A:
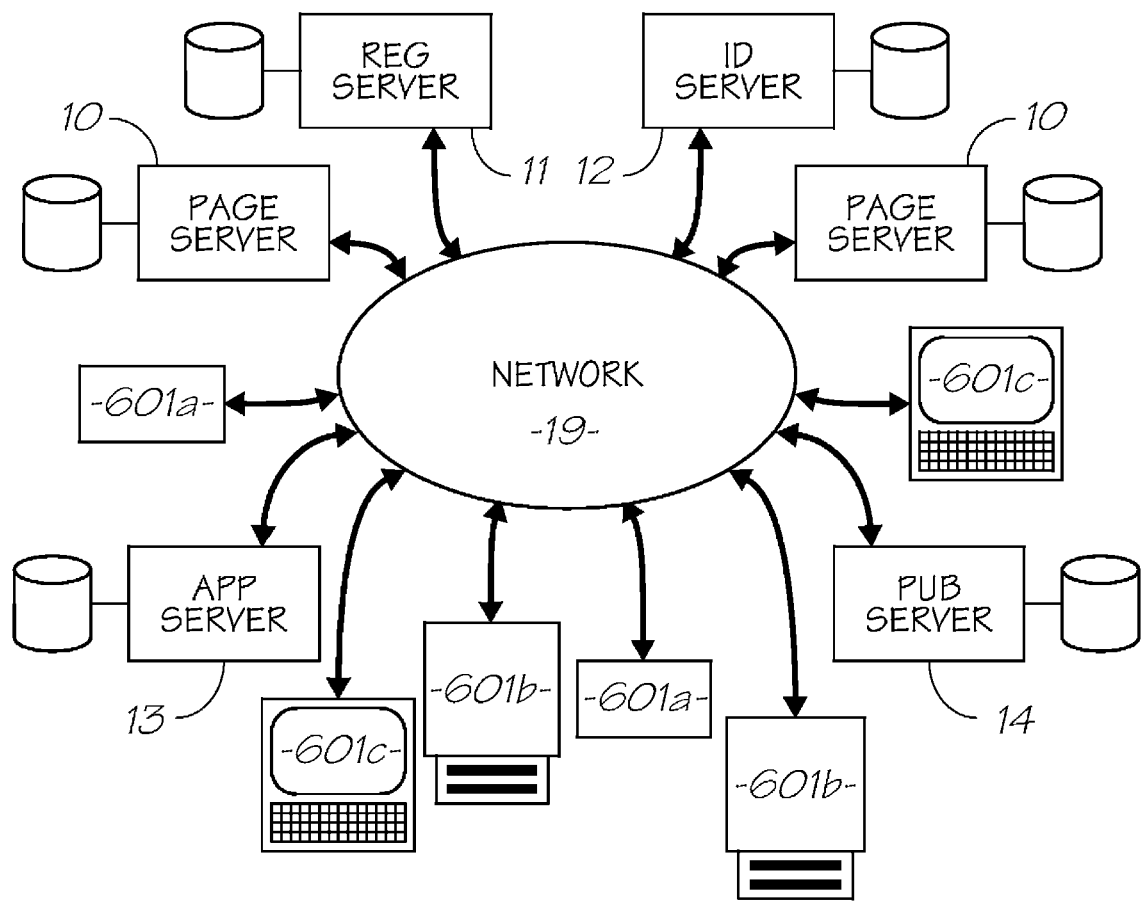
FIG. 3A illustrates a collection of netpage servers, Web terminals, printers and relays interconnected via a network.

As illustrated in FIGS. 1 and 3, netpage sensing device 101, such as the pen shown in FIGS. 8 and 9 and described in more detail below, works in conjunction with a netpage relay device 601, which is an Internet-connected device for home, office or mobile use. The pen is wireless and communicates securely with the netpage relay device 601 via a short-range radio link 9. In an alternative embodiment, the netpage pen 101 utilises a wired connection, such as a USB or other serial connection, to the relay device 601.

The relay device 601 performs the basic function of relaying interaction data to a page server 10, which interprets the interaction data. As shown in FIG. 3, the relay device 601 may, for example, take the form of a personal computer 601a, a netpage printer 601b or some other relay 601c.

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 3, the netpage sensing device 101 interacts with the coded data on a printed netpage 1, or other printed substrate such as a label of a product item 251, and communicates, via a short-range radio link 9, the interaction to the relay 601. The relay 601 sends corresponding interaction data to the relevant netpage page server 10 for interpretation. Raw data received from the sensing device 101 may be relayed directly to the page server 10 as interaction data. Alternatively, the interaction data may be encoded in the form of an interaction URI and transmitted to the page server 10 via a user's web browser. Of course, the relay device 601 (e.g. mobile phone) may incorporate a web browser and a user display.

In appropriate circumstances, the page server sends a corresponding message to application computer software running on a netpage application server 13. The application server may in turn send a response which is displayed on a user display device associated with the relay 601, or printed on the originating netpage printer.

The netpage relay device 601 can be configured to support any number of sensing devices, and a sensing device can work with any number of netpage relays. In the preferred implementation, each netpage sensing device 101 has a unique identifier. This allows each user to maintain a distinct profile with respect to a netpage page server 10 or application server 13.

Digital, on-demand delivery of netpages 1 may be performed by the netpage printer 601b, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by an area image sensor in the netpage sensing device, and the tag data is transmitted to the netpage system via the nearest netpage relay device. The pen is wireless and communicates with the netpage relaye device via a short-range radio link. Tags are sufficiently small and densely arranged that the sensing device can reliably image at least one tag even on a single click on the page. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description for each printed netpage.

Figure 4:
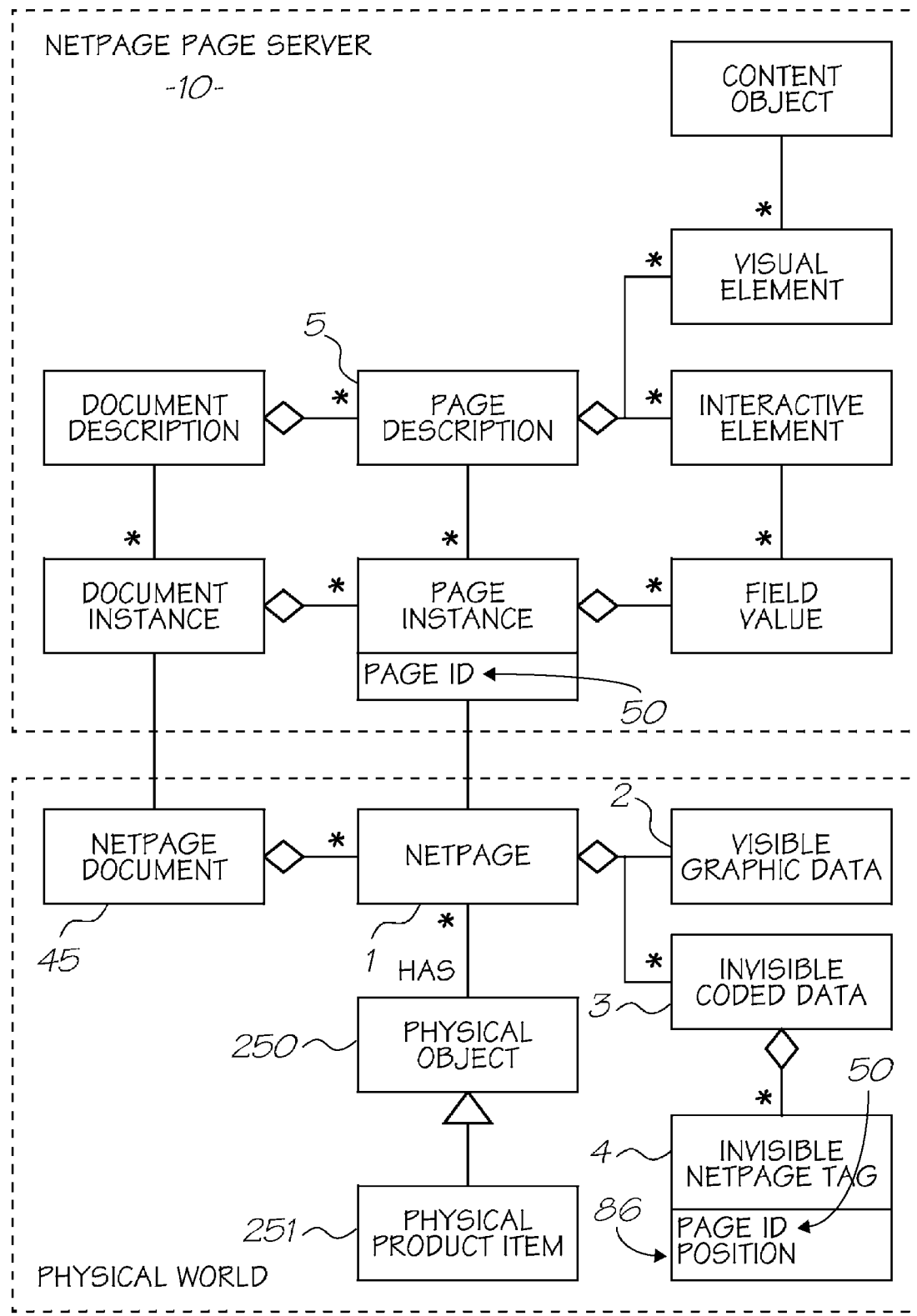
FIG. 4 is a schematic view of a high-level structure of a printed netpage and its online page description.

The relationship between the page description, the page instance, and the printed netpage is shown in FIG. 4. The printed netpage may be part of a printed netpage document 45. The page instance may be associated with both the netpage printer which printed it and, if known, the netpage user who requested it.

2 Netpage Tags

2.1 Tag Data Content

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

As will be more clearly explained below, in a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

TABLE 1

| Tag data | |
|---|---|
| Field | Precision (bits) |
| Page ID/Region ID | 100 |
| Tag ID/x-y coordinates | 16 |
| Flags | 4 |
| Total | 120 |

Each tag contains 120 bits of information, typically allocated as shown in Table 1. Assuming a maximum tag density of 64 per square inch, a 16-bit tag ID supports a region size of up to 1024 square inches. Larger regions can be mapped continuously without increasing the tag ID precision simply by using abutting regions and maps. The 100-bit region ID allows $2^{100}$ (~$10^{30}$ or a million trillion trillion) different regions to be uniquely identified.

2.2 Tag Data Encoding

The 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

2.3 Physical Tag Structure

Figure 5A:
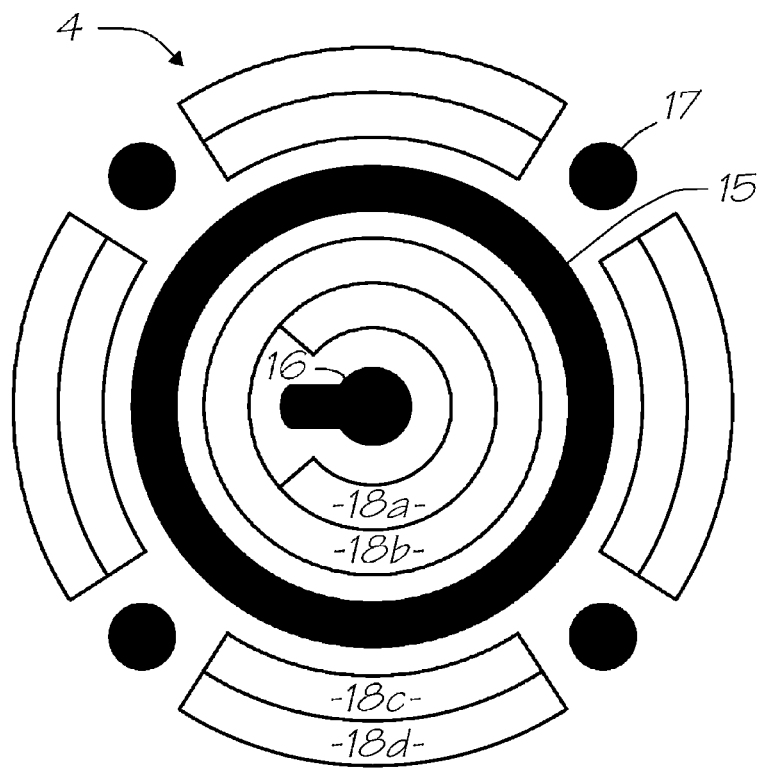
FIG. 5A is a plan view showing a structure of a netpage tag.

The physical representation of the tag, shown in FIG. 5a, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data.

To achieve proper tag reproduction, the tag is rendered at a resolution of 256×256 dots. When printed at 1600 dots per inch this yields a tag with a diameter of about 4 mm. At this resolution the tag is designed to be surrounded by a "quiet area" of radius 16 dots. Since the quiet area is also contributed by adjacent tags, it only adds 16 dots to the effective diameter of the tag.

The tag includes six target structures. A detection ring 15 allows the sensing device to initially detect the tag. The ring is easy to detect because it is rotationally invariant and because a simple correction of its aspect ratio removes most of the effects of perspective distortion. An orientation axis 16 allows the sensing device to determine the approximate planar orientation of the tag due to the yaw of the sensor. The orientation axis is skewed to yield a unique orientation. Four perspective targets 17 allow the sensing device to infer an accurate two-dimensional perspective transform of the tag and hence an accurate three-dimensional position and orientation of the tag relative to the sensor.

All target structures are redundantly large to improve their immunity to noise.

The overall tag shape is circular. This supports, amongst other things, optimal tag packing on an irregular triangular grid. In combination with the circular detection ring, this makes a circular arrangement of data bits within the tag optimal. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges.

The 15 4-bit data symbols of each of the six codewords are allocated to the four concentric symbol rings 18a to 18d in interleaved fashion. Symbols are allocated alternately in circular progression around the tag.

The interleaving is designed to maximise the average spatial distance between any two symbols of the same codeword.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

Figure 5B:
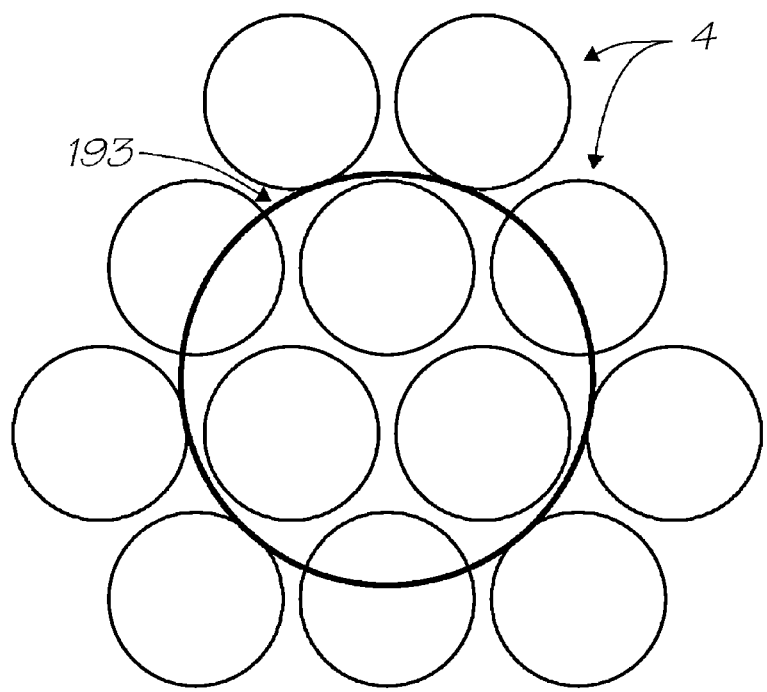
FIG. 5B is a plan view showing a relationship between a set of the tags shown in FIG. 5a and a field of view of a netpage sensing device in the form of a netpage pen.

Assuming a circular tag shape, the minimum diameter of the sensor field of view is obtained when the tags are tiled on a equilateral triangular grid, as shown in FIG. 5b.

2.4 Tag Image Processing and Decoding

Figure 7:
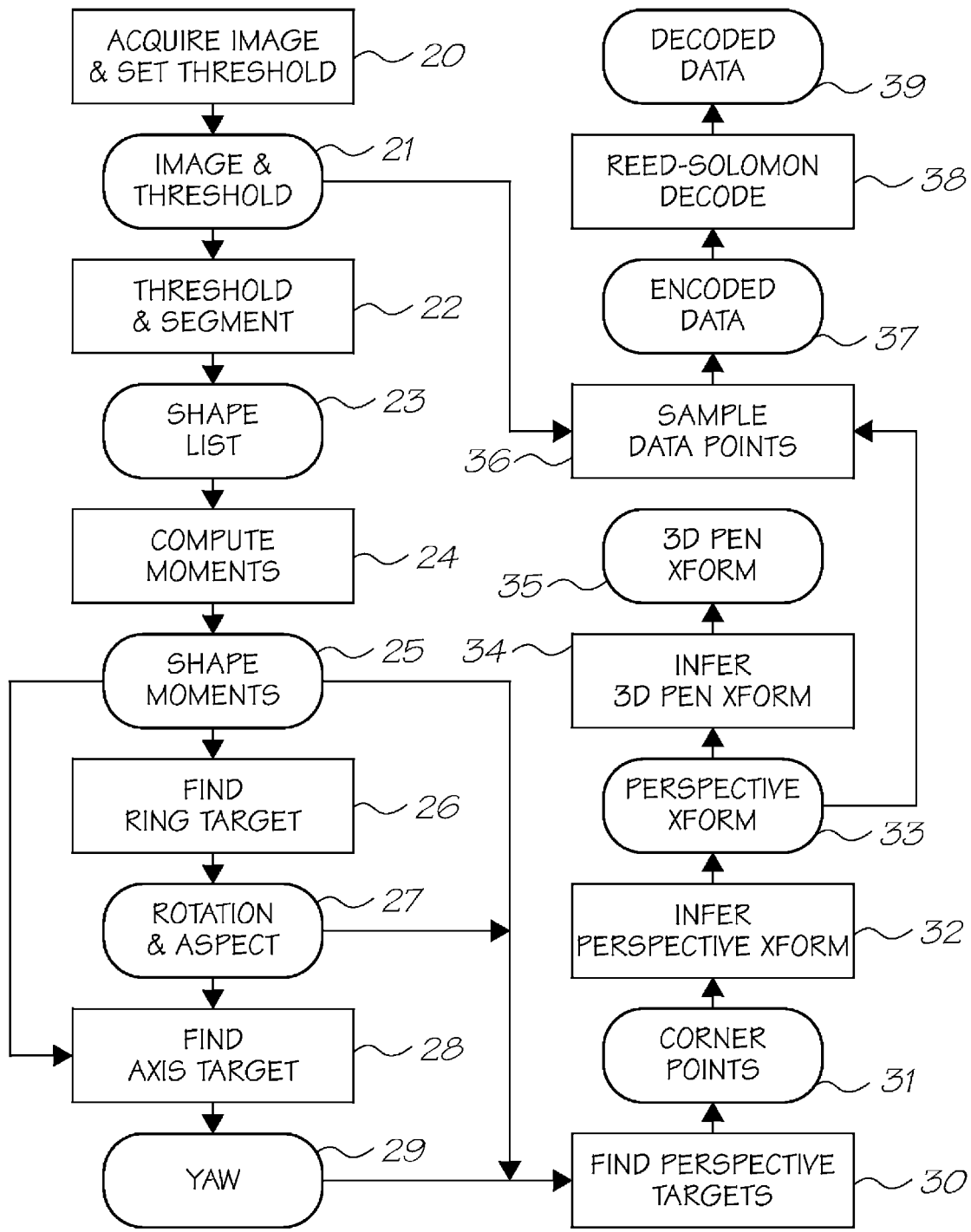
FIG. 7 is a flowchart of a tag image processing and decoding algorithm.

The tag image processing and decoding performed by a sensing device such as the netpage pen is shown in FIG. 7. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the pen's physical axis and the pen's optical axis.

2.5 Alternative Tag Structures

The tag structure described above is designed to support the tagging of non-planar surfaces where a regular tiling of tags may not be possible. In the more usual case of planar surfaces where a regular tiling of tags is possible, i.e. surfaces such as sheets of paper and the like, more efficient tag structures can be used which exploit the regular nature of the tiling.

Figure 6A:
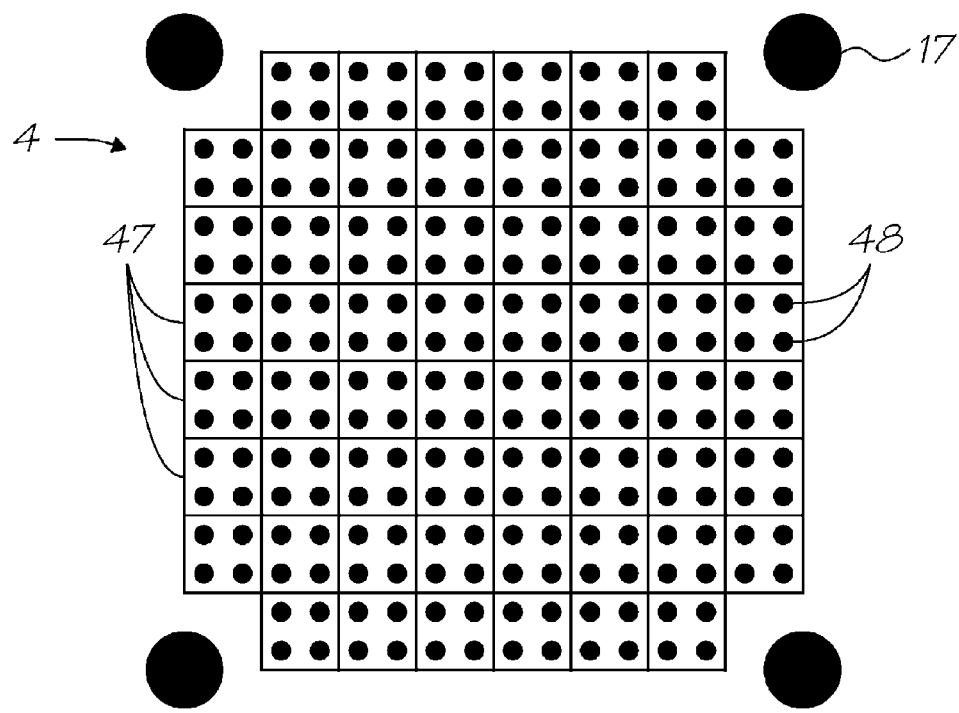
FIG. 6A is a plan view showing an alternative structure of a netpage tag.
Figure 6B:
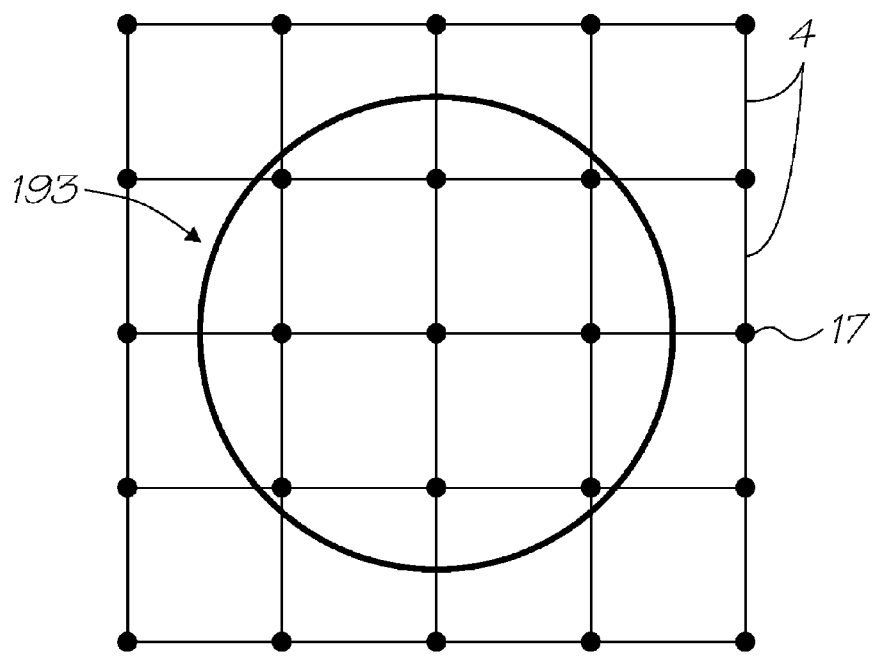
FIG. 6B is a plan view showing a relationship between a set of the tags shown in FIG. 6a and a field of view of a netpage sensing device in the form of a netpage pen.
Figures 6C, 6D:
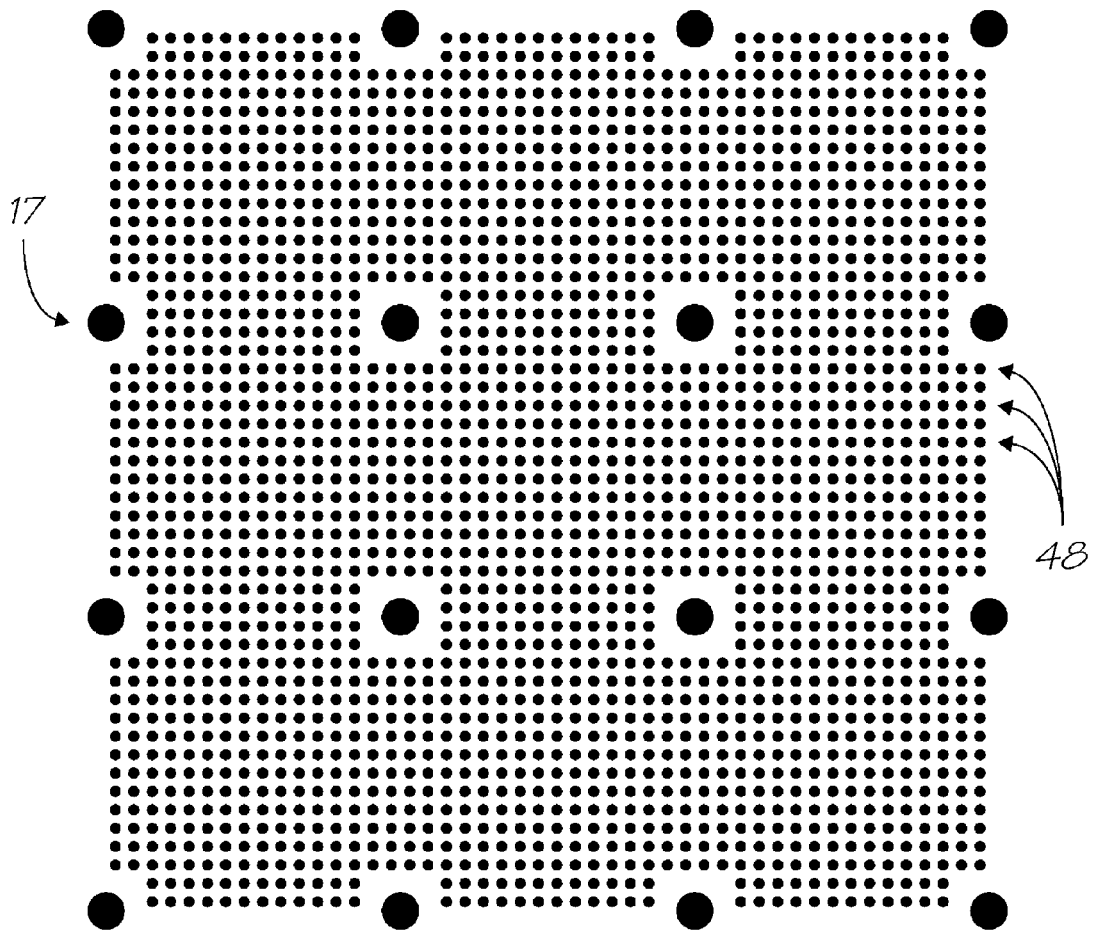
FIG. 6C is a plan view showing an arrangement of nine of the tags shown in FIG. 6a where targets are shared between adjacent tags.
FIG. 6D is a plan view showing the interleaving and rotation of the symbols of the four codewords of the tag shown in FIG. 6A.

FIG. 6a shows a square tag 4 with four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 6b and 6c. FIG. 6b shows a square tiling of 16 tags and the corresponding minimum field of view 193, which must span the diagonals of two tags. FIG. 6c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits.

The data-bearing dots 48 of the tag are designed to not overlap their neighbors, so that groups of tags cannot produce structures which resemble targets. This also saves ink. The perspective targets therefore allow detection of the tag, so further targets are not required. Tag image processing proceeds as described in section 1.2.4 above, with the exception that steps 26 and 28 are omitted.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 6d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Additional tag structures are disclosed in U.S. Pat. No. 6,929,186 ("Orientation-indicating machine-readable coded data") filed by the applicant or assignee of the present invention.

2.6 Tag Map

Figure 22:
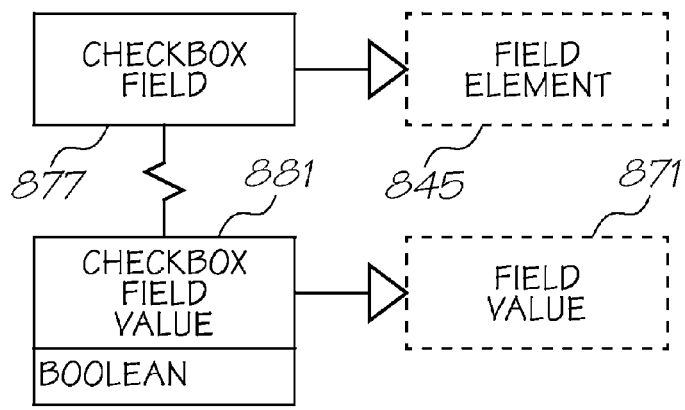
FIG. 22 is a schematic view of a checkbox field class diagram.

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encode Cartesian (x-y) coordinates or polar coordinates, depending on the surface type on which it appears. The tag ID structure is dictated by and known to the tag map, and tag IDs associated with different tag maps may therefore have different structures.

2.7 Tagging Schemes

The preferred coding scheme uses "location-indicating" tags as already discussed. An alternative coding scheme uses object-indicating tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating tag contains a tag ID which directly identifies a user interface element in the page description associated with the region. All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

3 Document and Page Descriptions

Figure 13:
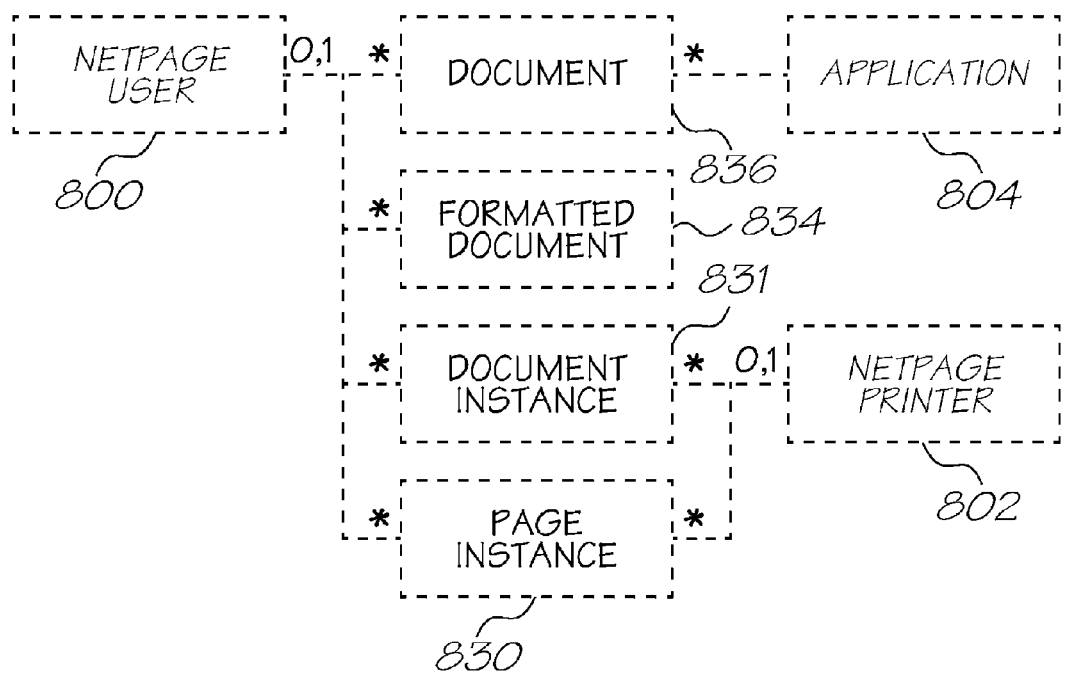
FIG. 13 is a schematic view of a document and page ownership class diagram.
Figure 12:
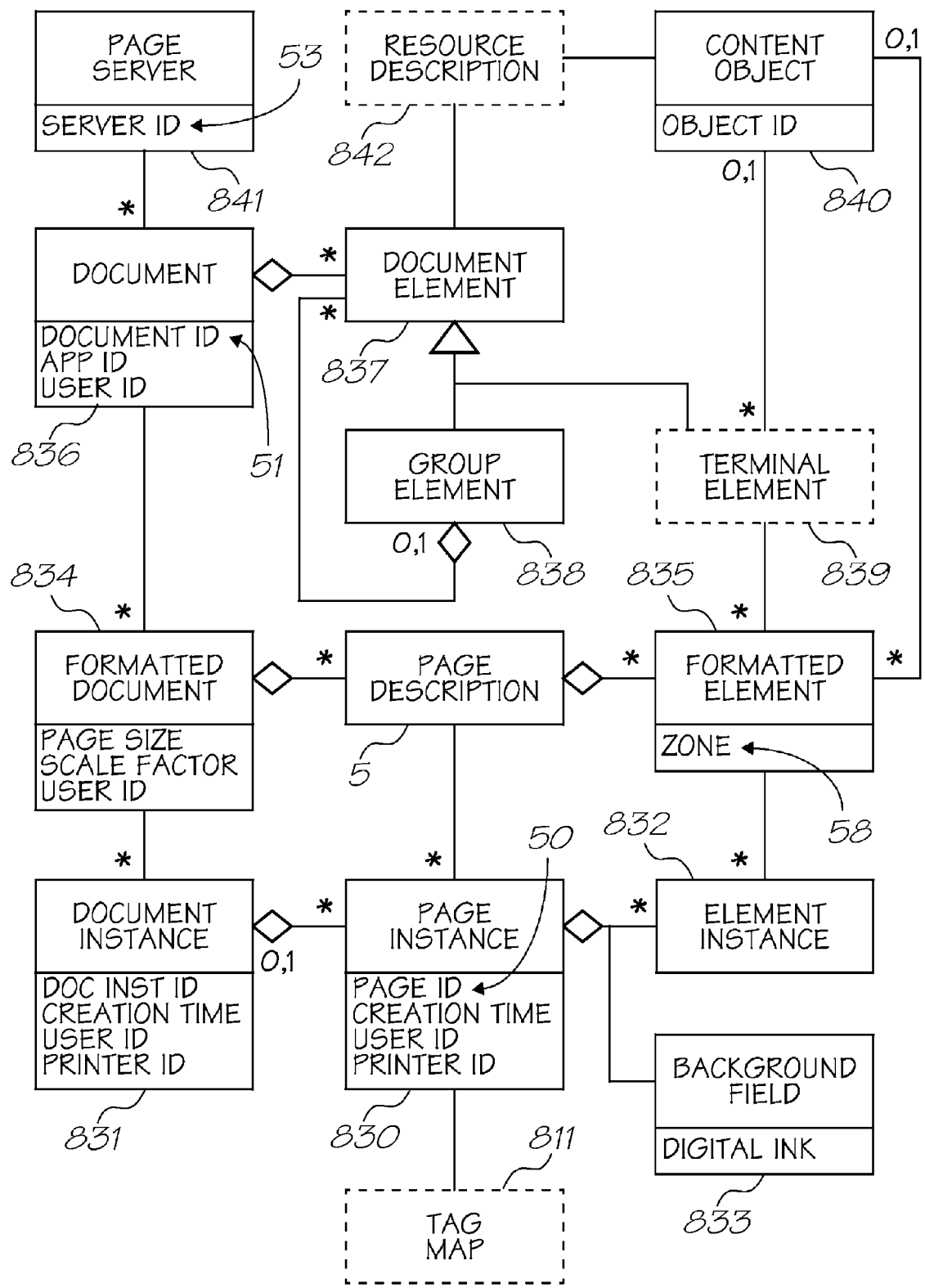
FIG. 12 is a schematic view of a document and page description class diagram.

A preferred embodiment of a document and page description class diagram is shown in FIGS. 12 and 13.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a a copy of a document to be printed without being forced to accept the source document's specific format. The user or a printing press may be requesting a copy for a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 14:
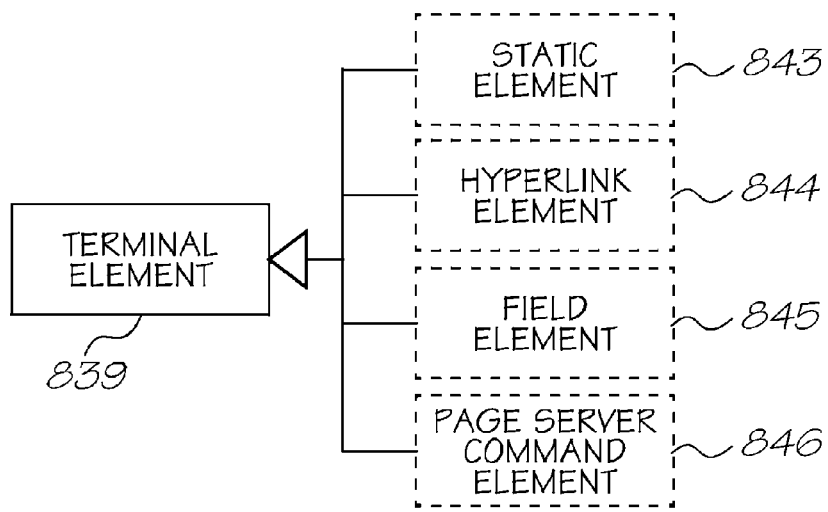
FIG. 14 is a schematic view of a terminal element specialization class diagram.
Figure 15:
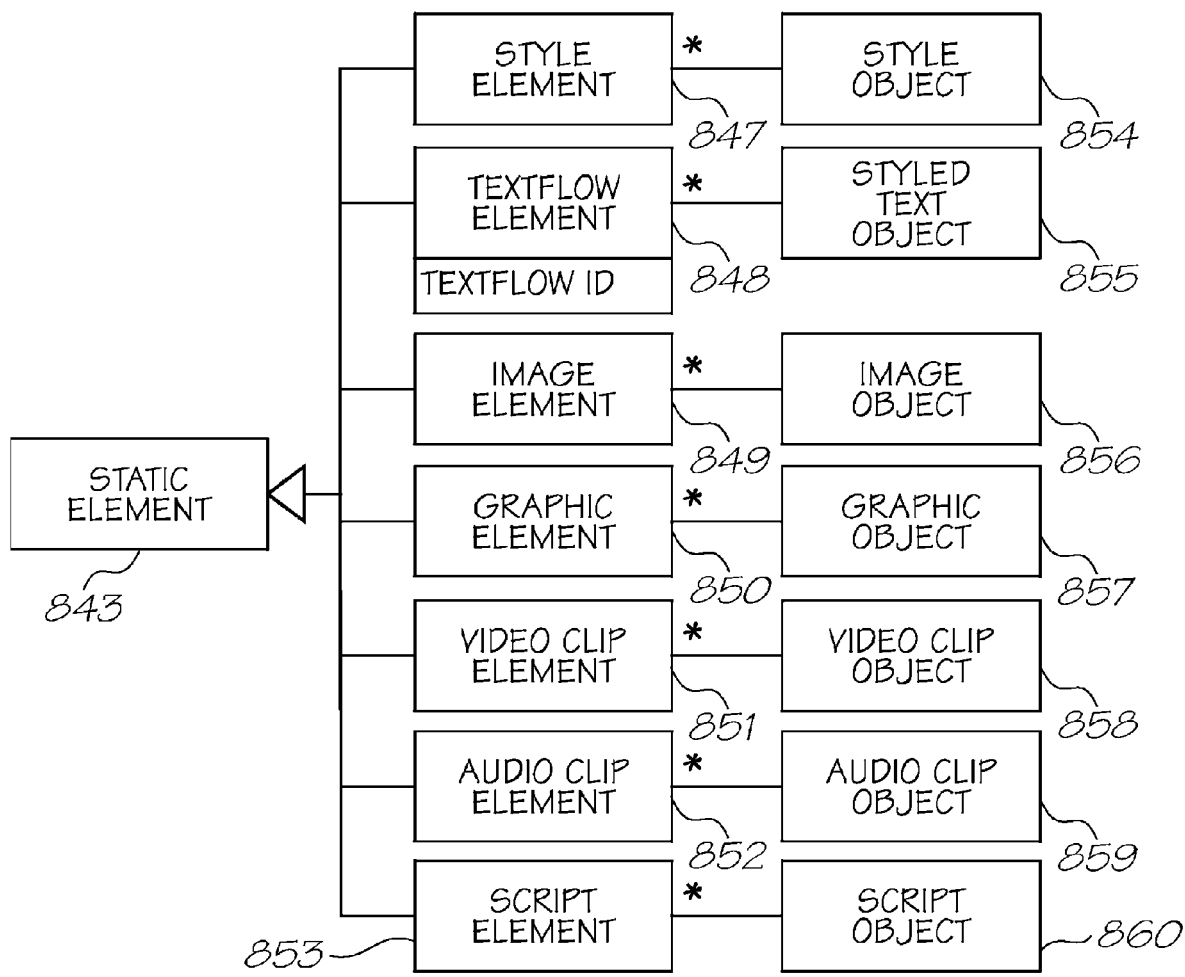
FIG. 15 is a schematic view of a static element specialization class diagram.

A terminal element 839 can be a visual element or an input element. A visual element can be a static element 843 or a dynamic element 846. An input element can be a hyperlink element 844 or a field element 845, as shown in FIG. 14. A static element 843 can be a style element 847 with an associated style object 854, a textflow element 848 with an associated styled text object 855, an image element 849 with an associated image element 856, a graphic element 850 with an associated graphic object 857, a video clip element 851 with an associated video clip object 858, an audio clip element 852 with an associated audio clip object 859, or a script element 853 with an associated script object 860, as shown in FIG. 15.

A page instance has a background field 833 which is used to record any digital ink captured on the page which does not apply to a specific input element.

In the preferred form of the invention, a tag map 811 is associated with each page instance to allow tags on the page to be translated into locations on the page.

4 The Netpage Network

In a preferred embodiment, a netpage network consists of a distributed set of netpage page servers 10, netpage registration servers 11, netpage ID servers 12, netpage application servers 13, and netpage relay devices 601 connected via a network 19 such as the Internet, as shown in FIG. 3.

The netpage registration server 11 is a server which records relationships between users, pens, printers and applications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage relays 601 send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage relay uses the Internet Distributed Name System (DNS), or similar, to resolve a netpage page ID 50 into the network address of the netpage page server handling the corresponding page instance.

A netpage application server 13 is a server which hosts interactive netpage applications.

Netpage servers can be hosted on a variety of network server platforms from manufacturers such as IBM, Hewlett-Packard, and Sun. Multiple netpage servers can run concurrently on a single host, and a single server can be distributed over a number of hosts. Some or all of the functionality provided by netpage servers, and in particular the functionality provided by the ID server and the page server, can also be provided directly in a netpage appliance such as a netpage printer, in a computer workstation, or on a local network.

5 The Netpage Pen

The active sensing device of the netpage system may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). A pen 101 is described herein, although it will be appreciated that clickers and pointers may be of similar construction. The pen 101 uses its embedded controller 134 to capture and decode netpage tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen may be encrypted and wirelessly transmitted to the printer (or base station), the printer or base station interpreting the data with respect to the (known) page structure.

Figure 11:
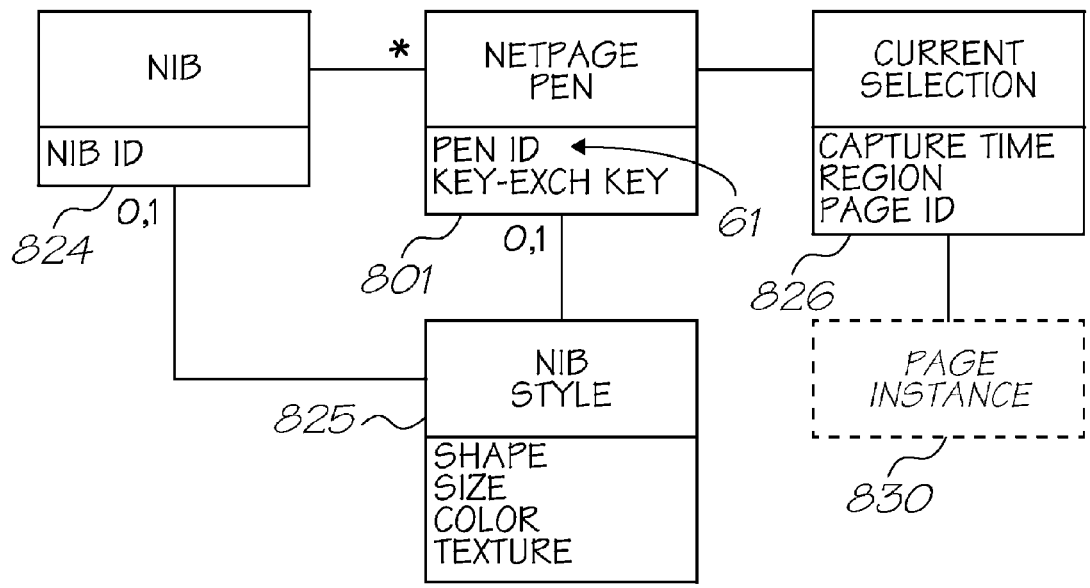
FIG. 11 is a schematic view of a pen class diagram.

The preferred embodiment of the netpage pen 101 operates both as a normal marking ink pen and as a non-marking stylus (i.e. as a pointer). The marking aspect, however, is not necessary for using the netpage system as a browsing system, such as when it is used as an Internet interface. Each netpage pen is registered with the netpage system and has a unique pen ID 61. FIG. 11 shows the netpage pen class diagram, reflecting pen-related information maintained by a registration server 11 on the netpage network.

When the nib is in contact with a netpage, the pen determines its position and orientation relative to the page. The nib is attached to a force sensor, and the force on the nib is interpreted relative to a threshold to indicate whether the pen is "up" or "down". This allows an interactive element on the page to be 'clicked' by pressing with the pen nib, in order to request, say, information from a network. Furthermore, the force is captured as a continuous value to allow, say, the full dynamics of a signature to be verified. The force sensor is described in more detail in Section 8.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

The pen 101 may have one or more buttons 209, which are pressed by the user to select a mode of the pen. The button(s) are used to determine a behavior of the pen, which, in turn, determines how a stroke is interpreted by the page server 10.

Whenever the pen is within range of a relay device 601 with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is wireless and transmits digital ink to the relay device 601 via a short-range radio link. The transmitted digital ink is encrypted for privacy and security and packetized for efficient transmission, but is always flushed on a pen-up event to ensure timely handling in the printer.

When the pen is out-of-range of a relay device 601 it buffers digital ink in internal memory, which has a capacity of over ten minutes of continuous handwriting. When the pen is once again within range of a relay device, it transfers any buffered digital ink.

A pen can be registered with any number of relay devices, but because all state data resides in netpages both on paper and on the network, it is largely immaterial which relay device a pen is communicating with at any particular time.

One embodiment of the pen is described in greater detail in Section 7 below, with reference to FIGS. 8 to 10.

6 Netpage Interaction

The netpage relay device 601 receives data relating to a stroke from the pen 101 when the pen is used to interact with a netpage 1. The coded data 3 of the tags 4 is read by the pen when it is used to execute a movement, such as a stroke. The data allows the identity of the particular page to be determined and an indication of the positioning of the pen relative to the page to be obtained. Interaction data comprising the page ID 50 and at least one position of the pen, is transmitted to the relay device 601, where it resolves, via the DNS, the page ID 50 of the stroke into the network address of the netpage page server 10 which maintains the corresponding page instance 830. It then transmits the stroke to the page server. If the page was recently identified in an earlier stroke, then the relay device may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register may be indicated by the lack of response from the pen's "ok" LED.

There are two kinds of input elements in a netpage page description: hyperlinks and form fields. Input through a form field can also trigger the activation of an associated hyperlink.

6.1 Hyperlinks

A hyperlink is a means of sending a message to a remote application, and typically elicits a displayed or printed response in the netpage system.

Figure 16:
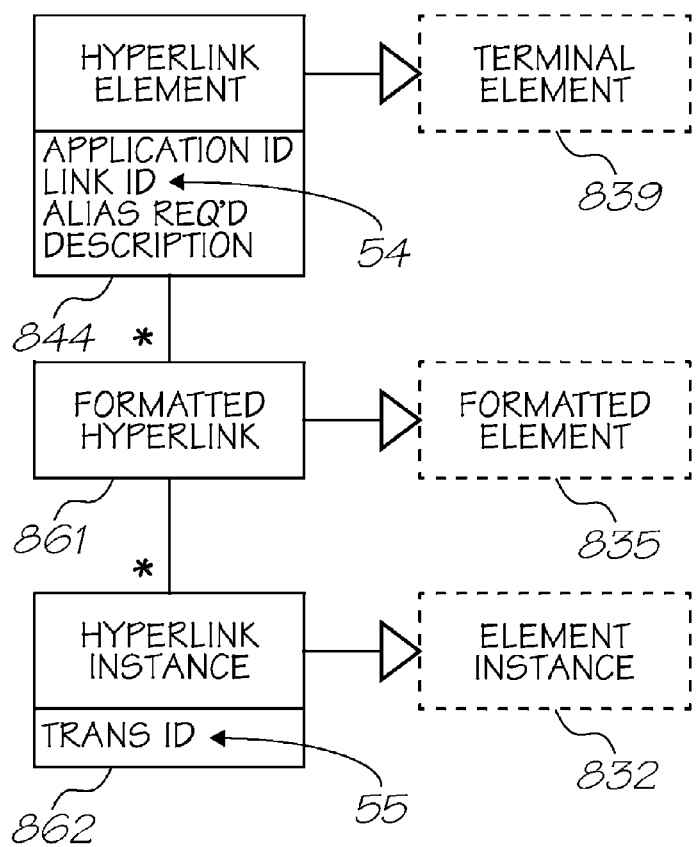
FIG. 16 is a schematic view of a hyperlink element class diagram.

A hyperlink element 844 identifies the application 71 which handles activation of the hyperlink, a link ID 54 which identifies the hyperlink to the application, an "alias required" flag which asks the system to include the user's application alias ID 65 in the hyperlink activation, and a description which is used when the hyperlink is recorded as a favorite or appears in the user's history. The hyperlink element class diagram is shown in FIG. 16.

Figure 17:
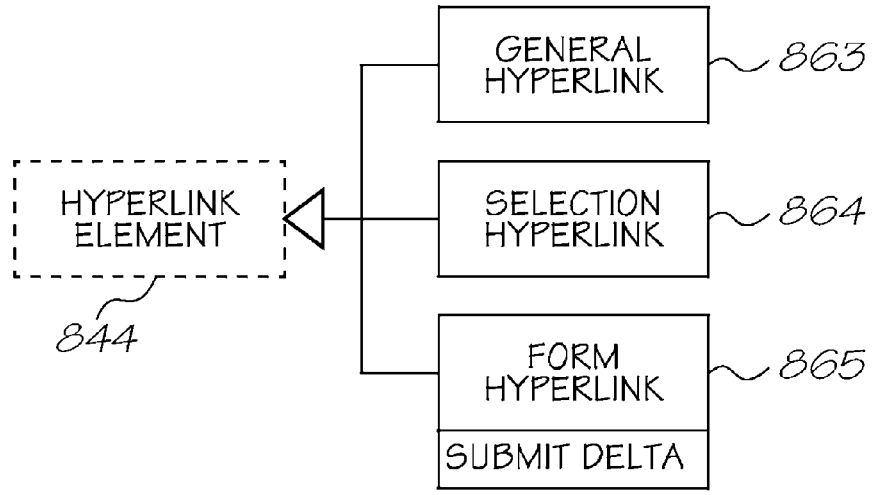
FIG. 17 is a schematic view of a hyperlink element specialization class diagram.

When a hyperlink is activated, the page server sends a request to an application somewhere on the network. The application is identified by an application ID 64, and the application ID is resolved in the normal way via the DNS. There are three types of hyperlinks: general hyperlinks 863, form hyperlinks 865, and selection hyperlinks 864, as shown in FIG. 17. A general hyperlink can implement a request for a linked document, or may simply signal a preference to a server. A form hyperlink submits the corresponding form to the application. A selection hyperlink submits the current selection to the application. If the current selection contains a single-word piece of text, for example, the application may return a single-page document giving the word's meaning within the context in which it appears, or a translation into a different language. Each hyperlink type is characterized by what information is submitted to the application.

The corresponding hyperlink instance 862 records a transaction ID 55 which can be specific to the page instance on which the hyperlink instance appears. The transaction ID can identify user-specific data to the application, for example a "shopping cart" of pending purchases maintained by a purchasing application on behalf of the user.

The system includes the pen's current selection 826 in a selection hyperlink activation. The system includes the content of the associated form instance 868 in a form hyperlink activation, although if the hyperlink has its "submit delta" attribute set, only input since the last form submission is included. The system includes an effective return path in all hyperlink activations.

Figure 18:
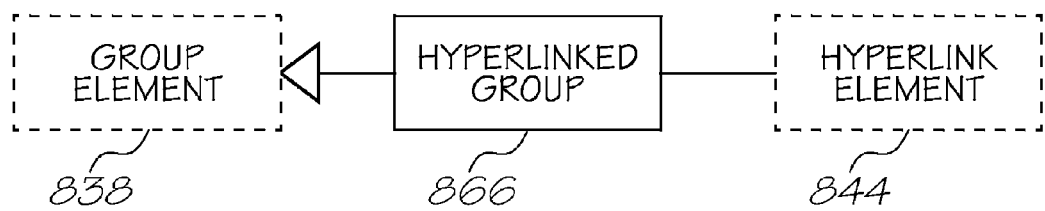
FIG. 18 is a schematic view of a hyperlinked group class diagram.

A hyperlinked group 866 is a group element 838 which has an associated hyperlink, as shown in FIG. 18. When input occurs through any field element in the group, the hyperlink 844 associated with the group is activated. A hyperlinked group can be used to associate hyperlink behavior with a field such as a checkbox. It can also be used, in conjunction with the "submit delta" attribute of a form hyperlink, to provide continuous input to an application. It can therefore be used to support a "blackboard" interaction model, i.e. where input is captured and therefore shared as soon as it occurs.

6.2 Hyperlink Activation Protocol

Figure 42:
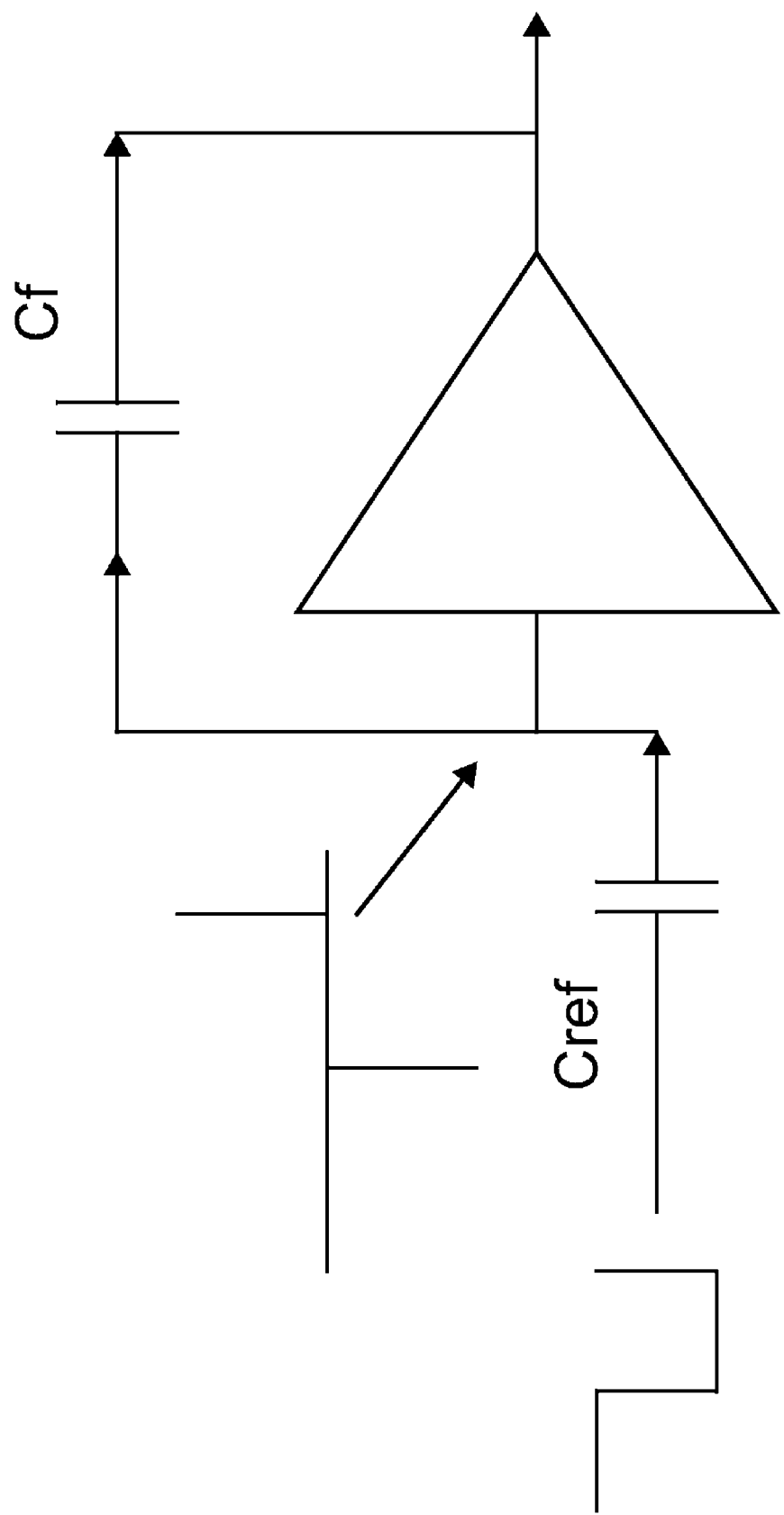
FIG. 42 shows summing point voltage.

A preferred embodiment of a hyperlink activation protocol is shown in FIG. 42.

When a user clicks on a netpage with a netpage pen, the pen communicates the click, in the form of interaction data, to the nearest netpage relay device 601. The click identifies the page and a location on the page. The relay device 601 already knows the ID 61 of the pen from the pen connection protocol.

The relay device 601 determines, via the DNS, the network address of the page server 10 handling the particular page ID 50. The address may already be in its cache if the user has recently interacted with the same page. The relay device 601 then forwards the pen ID, its own device ID 62, the page ID and click location to the page server.

The page server loads the page description 5 identified by the page ID and determines which input element's zone 58, if any, the click lies in. Assuming the relevant input element is a hyperlink element 844, the page server then obtains the associated application ID 64 and link ID 54, and determines, via the DNS, the network address of the application server hosting the application 71.

Figure 26:
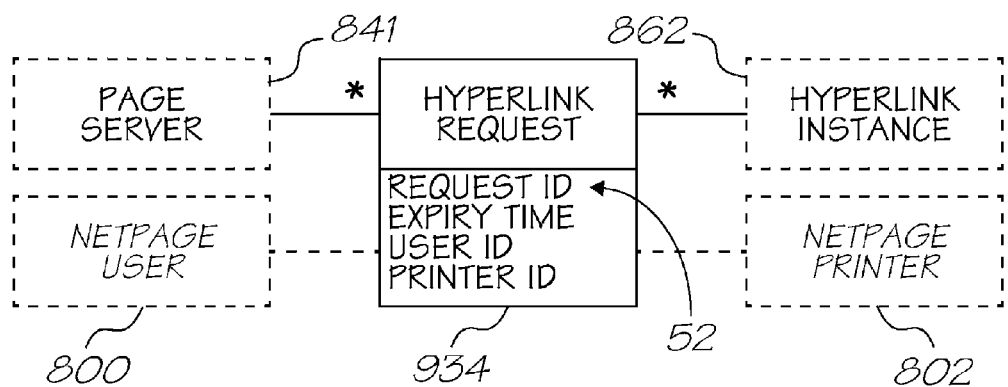
FIG. 26 is a schematic view of a hyperlink request class diagram.

The page server uses the pen ID 61 to obtain the corresponding user ID 60 from the registration server 11, and then allocates a globally unique hyperlink request ID 52 and builds a hyperlink request 934. The hyperlink request class diagram is shown in FIG. 26. The hyperlink request records the IDs of the requesting user and relay device, and identifies the clicked hyperlink instance 862. The page server then sends its own server ID 53, the hyperlink request ID, and the link ID to the application.

The application produces a response document according to application-specific logic, and obtains a document ID 51 from an ID server 12. It then sends the document to the page server 10b responsible for the document's newly allocated ID, together with the requesting page server's ID and the hyperlink request ID.

The second page server sends the hyperlink request ID and application ID to the first page server to obtain the corresponding user ID and device ID 62. The first page server rejects the request if the hyperlink request has expired or is for a different application.

The second page server allocates document instance and page IDs 50, returns the newly allocated page IDs to the application, adds the complete document to its own database, and finally sends the page descriptions to the requesting relay device.

The hyperlink instance may include a meaningful transaction ID 55, in which case the first page server includes the transaction ID in the message sent to the application. This allows the application to establish a transaction-specific context for the hyperlink activation.

If the hyperlink requires a user alias, i.e. its "alias required" attribute is set, then the first page server sends both the pen ID 61 and the hyperlink's application ID 64 to the registration server 11 to obtain not just the user ID corresponding to the pen ID but also the alias ID 65 corresponding to the application ID and the user ID. It includes the alias ID in the message sent to the application, allowing the application to establish a user-specific context for the hyperlink activation.

6.3 Forms

A form defines a collection of related input fields used to capture a related set of inputs through a printed netpage. A form allows a user to submit one or more parameters to an application software program running on a server.

Figure 19:
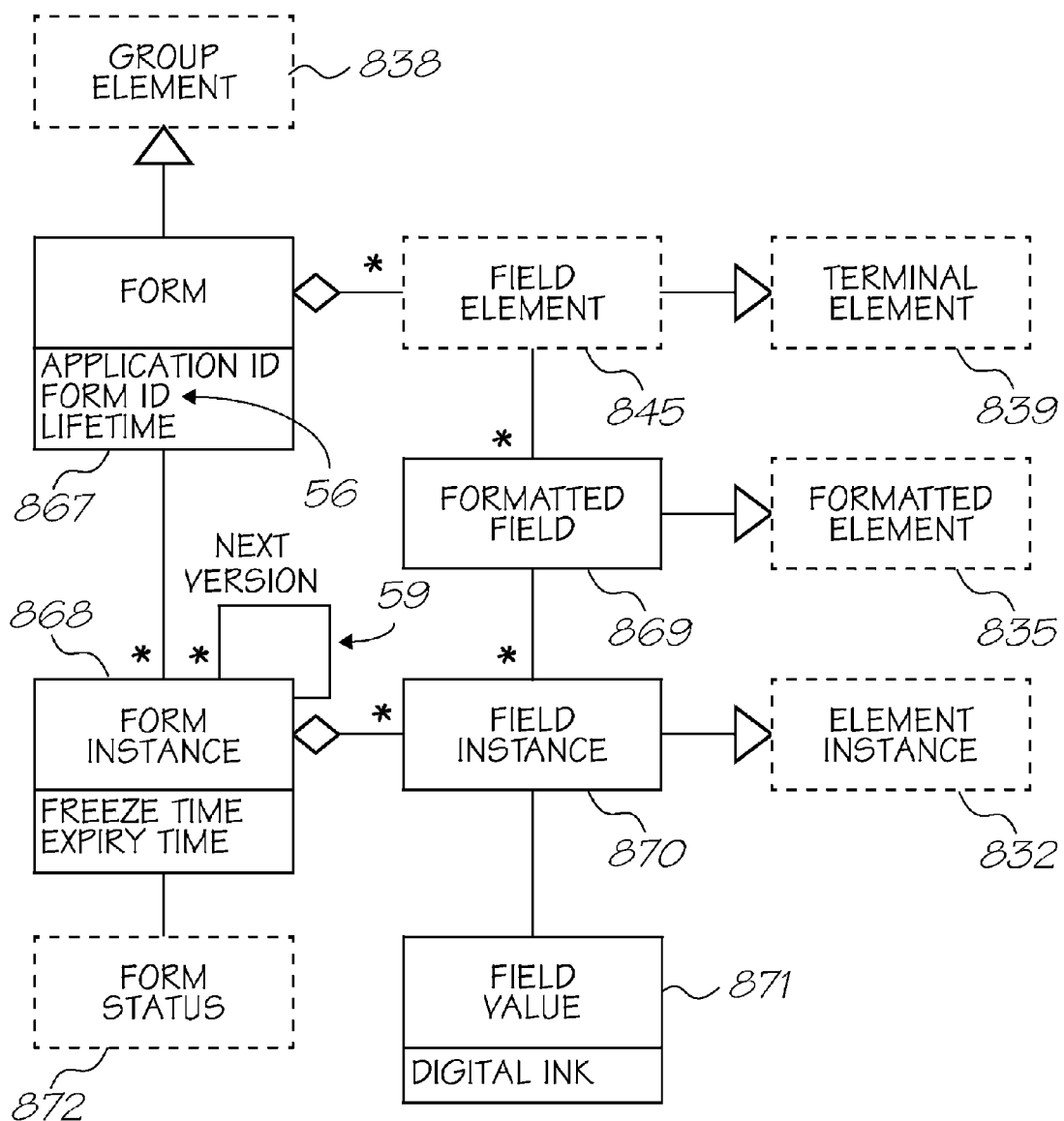
FIG. 19 is a schematic view of a form class diagram.

A form 867 is a group element 838 in the document hierarchy. It ultimately contains a set of terminal field elements 839. A form instance 868 represents a printed instance of a form. It consists of a set of field instances 870 which correspond to the field elements 845 of the form. Each field instance has an associated value 871, whose type depends on the type of the corresponding field element. Each field value records input through a particular printed form instance, i.e. through one or more printed netpages. The form class diagram is shown in FIG. 19.

Each form instance has a status 872 which indicates whether the form is active, frozen, submitted, void or expired. A form is active when first printed. A form becomes frozen once it is signed or once its freeze time is reached. A form becomes submitted once one of its submission hyperlinks has been activated, unless the hyperlink has its "submit delta" attribute set. A form becomes void when the user invokes a void form, reset form or duplicate form page command. A form expires when its specified expiry time is reached, i.e. when the time the form has been active exceeds the form's specified lifetime. While the form is active, form input is allowed. Input through a form which is not active is instead captured in the background field 833 of the relevant page instance. When the form is active or frozen, form submission is allowed. Any attempt to submit a form when the form is not active or frozen is rejected, and instead elicits an form status report.

Each form instance is associated (at 59) with any form instances derived from it, thus providing a version history. This allows all but the latest version of a form in a particular time period to be excluded from a search.

Figure 20:
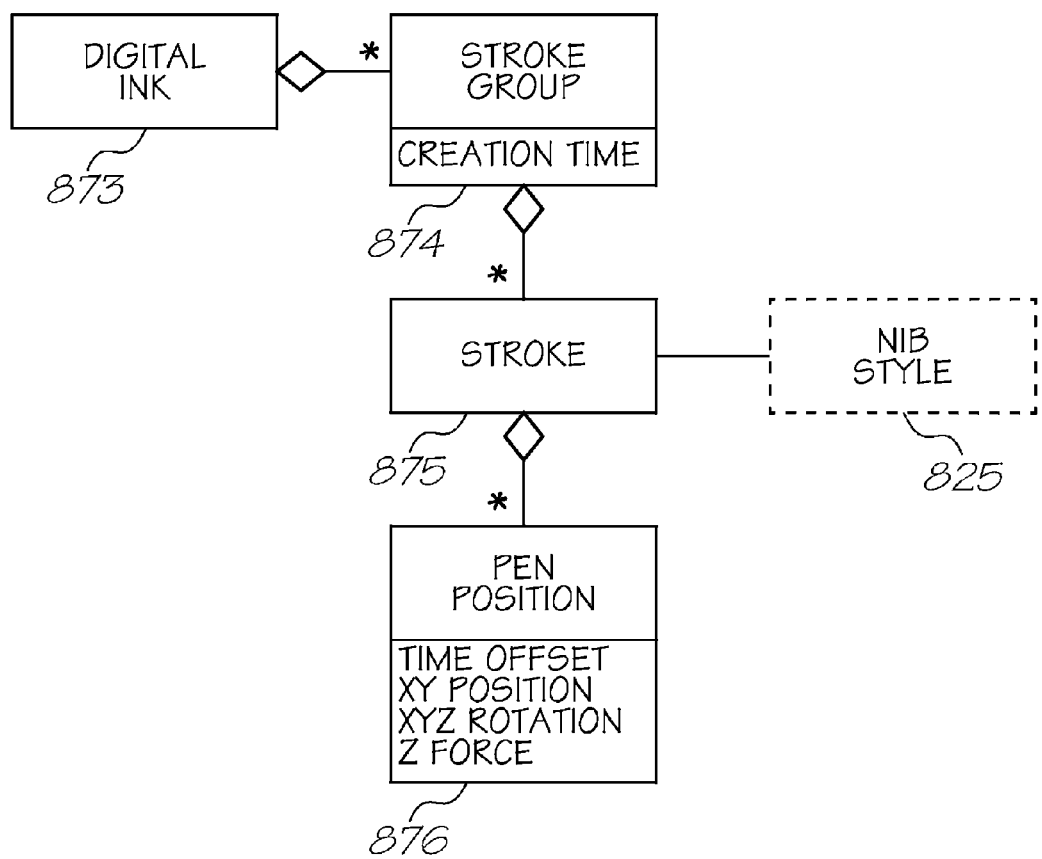
FIG. 20 is a schematic view of a digital ink class diagram.

All input is captured as digital ink. Digital ink 873 consists of a set of timestamped stroke groups 874, each of which consists of a set of styled strokes 875. Each stroke consists of a set of timestamped pen positions 876, each of which also includes pen orientation and nib force. The digital ink class diagram is shown in FIG. 20.

Figure 21:
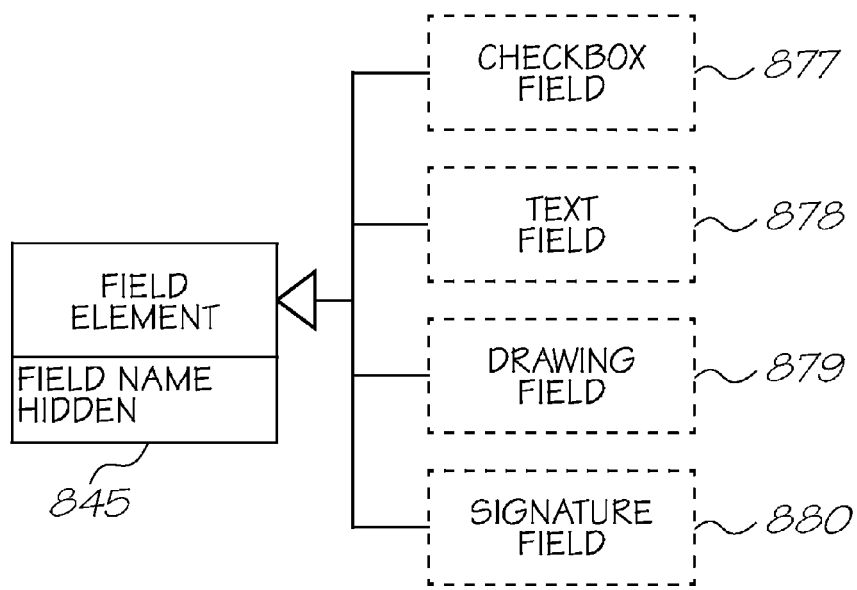
FIG. 21 is a schematic view of a field element specialization class diagram.

A field element 845 can be a checkbox field 877, a text field 878, a drawing field 879, or a signature field 880. The field element class diagram is shown in FIG. 21. Any digital ink captured in a field's zone 58 is assigned to the field.

A checkbox field has an associated boolean value 881, as shown in FIG. 22. Any mark (a tick, a cross, a stroke, a fill zigzag, etc.) captured in a checkbox field's zone causes a true value to be assigned to the field's value.

Figure 23:
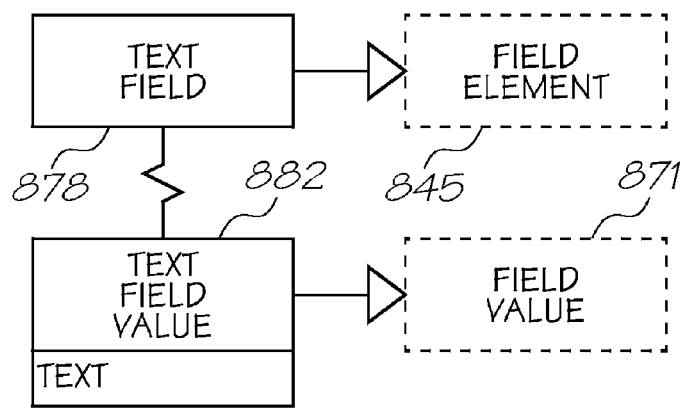
FIG. 23 is a schematic view of a text field class diagram.

A text field has an associated text value 882, as shown in FIG. 23. Any digital ink captured in a text field's zone is automatically converted to text via online handwriting recognition, and the text is assigned to the field's value. Online handwriting recognition is well-understood (see, for example, Tappert, C., C. Y. Suen and T. Wakahara, "The State of the Art in On-Line Handwriting Recognition", IEEE Transactions on Pattern Analysis and Machine Intelligence, Vol. 12, No. 8, August 1990, the contents of which are herein incorporated by cross-reference).

Figure 24:
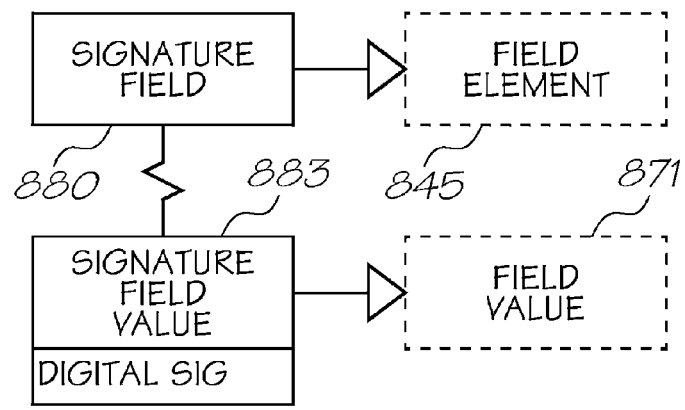
FIG. 24 is a schematic view of a signature field class diagram.

A signature field has an associated digital signature value 883, as shown in FIG. 24. Any digital ink captured in a signature field's zone is automatically verified with respect to the identity of the owner of the pen, and a digital signature of the content of the form of which the field is part is generated and assigned to the field's value. The digital signature is generated using the pen user's private signature key specific to the application which owns the form. Online signature verification is well-understood (see, for example, Plamondon, R. and G. Lorette, "Automatic Signature Verification and Writer Identification—The State of the Art", Pattern Recognition, Vol. 22, No. 2, 1989, the contents of which are herein incorporated by cross-reference).

A field element is hidden if its "hidden" attribute is set. A hidden field element does not have an input zone on a page and does not accept input. It can have an associated field value which is included in the form data when the form containing the field is submitted.

"Editing" commands, such as strike-throughs indicating deletion, can also be recognized in form fields.

Because the handwriting recognition algorithm works "online" (i.e. with access to the dynamics of the pen movement), rather than "offline" (i.e. with access only to a bitmap of pen markings), it can recognize run-on discretely-written characters with relatively high accuracy, without a writer-dependent training phase. A writer-dependent model of handwriting is automatically generated over time, however, and can be generated up-front if necessary, Digital ink, as already stated, consists of a sequence of strokes. Any stroke which starts in a particular element's zone is appended to that element's digital ink stream, ready for interpretation. Any stroke not appended to an object's digital ink stream is appended to the background field's digital ink stream.

Digital ink captured in the background field is interpreted as a selection gesture. Circumscription of one or more objects is generally interpreted as a selection of the circumscribed objects, although the actual interpretation is application-specific.

Table 2 summarizes some typical pen interactions with a netpage.

TABLE 2

Summary of typical pen interactions with a netpage

| Object | Type | Pen input | Action |
| --- | --- | --- | --- |
| Hyperlink | General | Click | Submit action to application |
| | Form | Click | Submit form to application |
| | Selection | Click | Submit selection to application |
| Form field | Checkbox | Any mark | Assign true to field |
| | Text | Handwriting | Convert digital ink to text; assign text to field |
| | Drawing | Digital ink | Assign digital ink to field |
| | Signature | Signature | Verify digital ink signature; generate digital signature of form; assign digital signature to field |
| None | — | Circumscription | Assign digital ink to current selection |

The system maintains a current selection for each pen. The selection consists simply of the most recent stroke captured in the background field. The selection is cleared after an inactivity timeout to ensure predictable behavior.

The raw digital ink captured in every field is retained on the netpage page server and is optionally transmitted with the form data when the form is submitted to the application. This allows the application to interrogate the raw digital ink should it suspect the original conversion, such as the conversion of handwritten text. This can, for example, involve human intervention at the application level for forms which fail certain application-specific consistency checks. As an extension to this, the entire background area of a form can be designated as a drawing field. The application can then decide, on the basis of the presence of digital ink outside the explicit fields of the form, to route the form to a human operator, on the assumption that the user may have indicated amendments to the filled-in fields outside of those fields.

Figure 25:
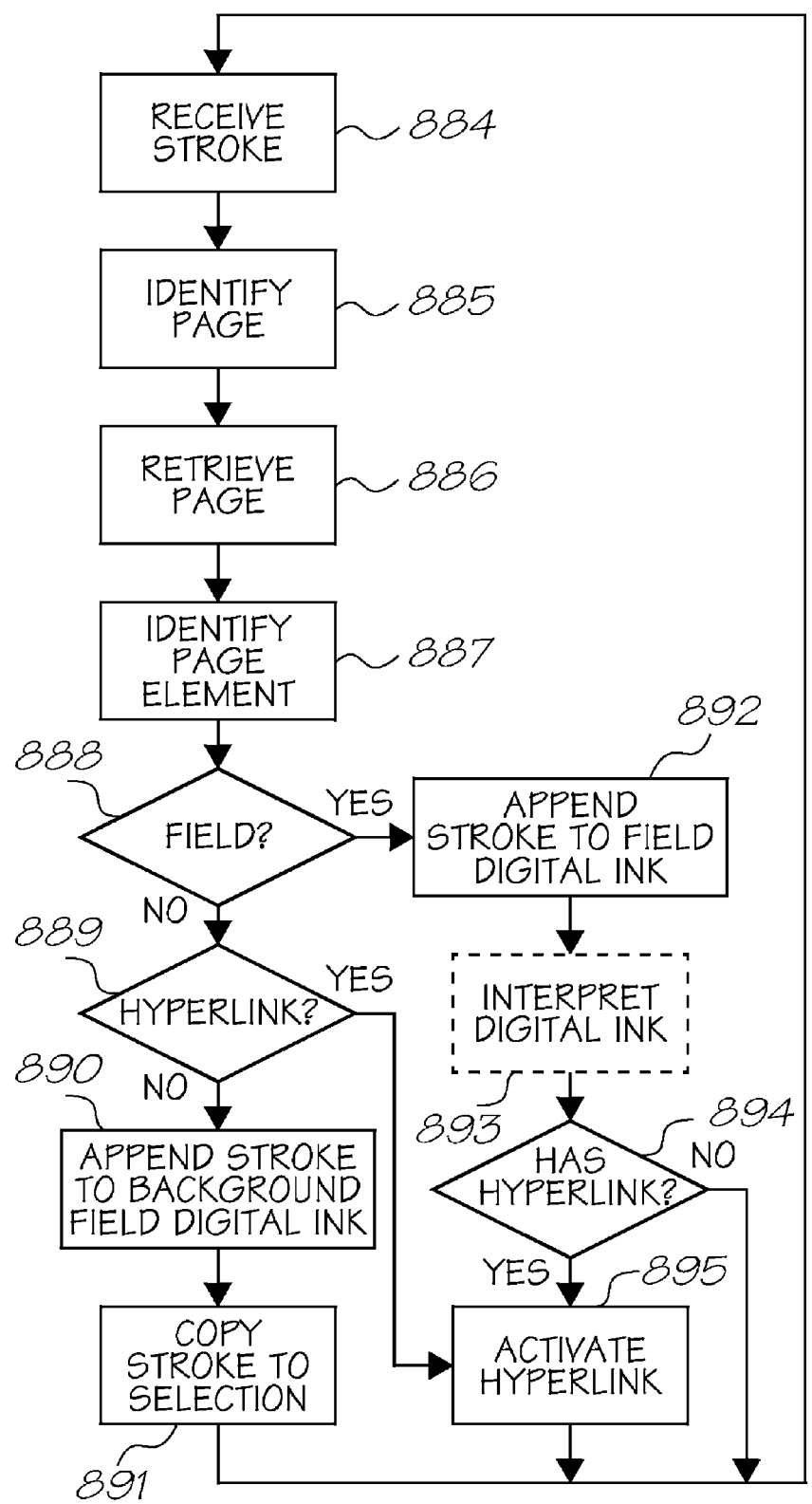
FIG. 25 is a flowchart of an input processing algorithm.

FIG. 25 shows a flowchart of the process of handling pen input relative to a netpage. The process consists of receiving (at 884) a stroke from the pen; identifying (at 885) the page instance 830 to which the page ID 50 in the stroke refers; retrieving (at 886) the page description 5; identifying (at 887) a formatted element 839 whose zone 58 the stroke intersects; determining (at 888) whether the formatted element corresponds to a field element, and if so appending (at 892) the received stroke to the digital ink of the field value 871, interpreting (at 893) the accumulated digital ink of the field, and determining (at 894) whether the field is part of a hyperlinked group 866 and if so activating (at 895) the associated hyperlink; alternatively determining (at 889) whether the formatted element corresponds to a hyperlink element and if so activating (at 895) the corresponding hyperlink; alternatively, in the absence of an input field or hyperlink, appending (at 890) the received stroke to the digital ink of the background field 833; and copying (at 891) the received stroke to the current selection 826 of the current pen, as maintained by the registration server.

Figure 25A:
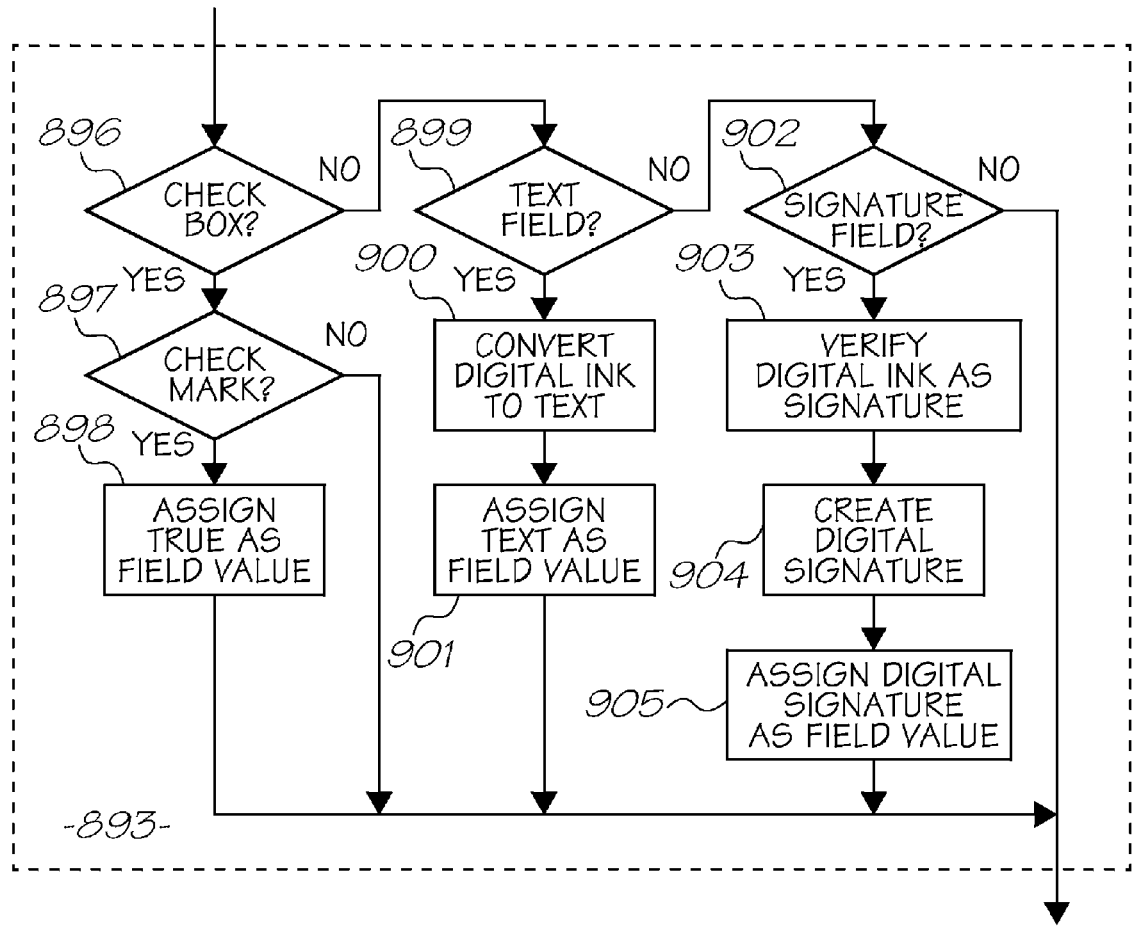
FIG. 25A is a detailed flowchart of one step of the flowchart of FIG. 25.

FIG. 25A shows a detailed flowchart of step 893 in the process shown in FIG. 25, where the accumulated digital ink of a field is interpreted according to the type of the field. The process consists of determining (at 896) whether the field is a checkbox and (at 897) whether the digital ink represents a checkmark, and if so assigning (at 898) a true value to the field value; alternatively determining (at 899) whether the field is a text field and if so converting (at 900) the digital ink to computer text, with the help of the appropriate registration server, and assigning (at 901) the converted computer text to the field value; alternatively determining (at 902) whether the field is a signature field and if so verifying (at 903) the digital ink as the signature of the pen's owner, with the help of the appropriate registration server, creating (at 904) a digital signature of the contents of the corresponding form, also with the help of the registration server and using the pen owner's private signature key relating to the corresponding application, and assigning (at 905) the digital signature to the field value.

7 Netpage Pen and Printer Description

7.1 Pen Mechanics

Figure 8:
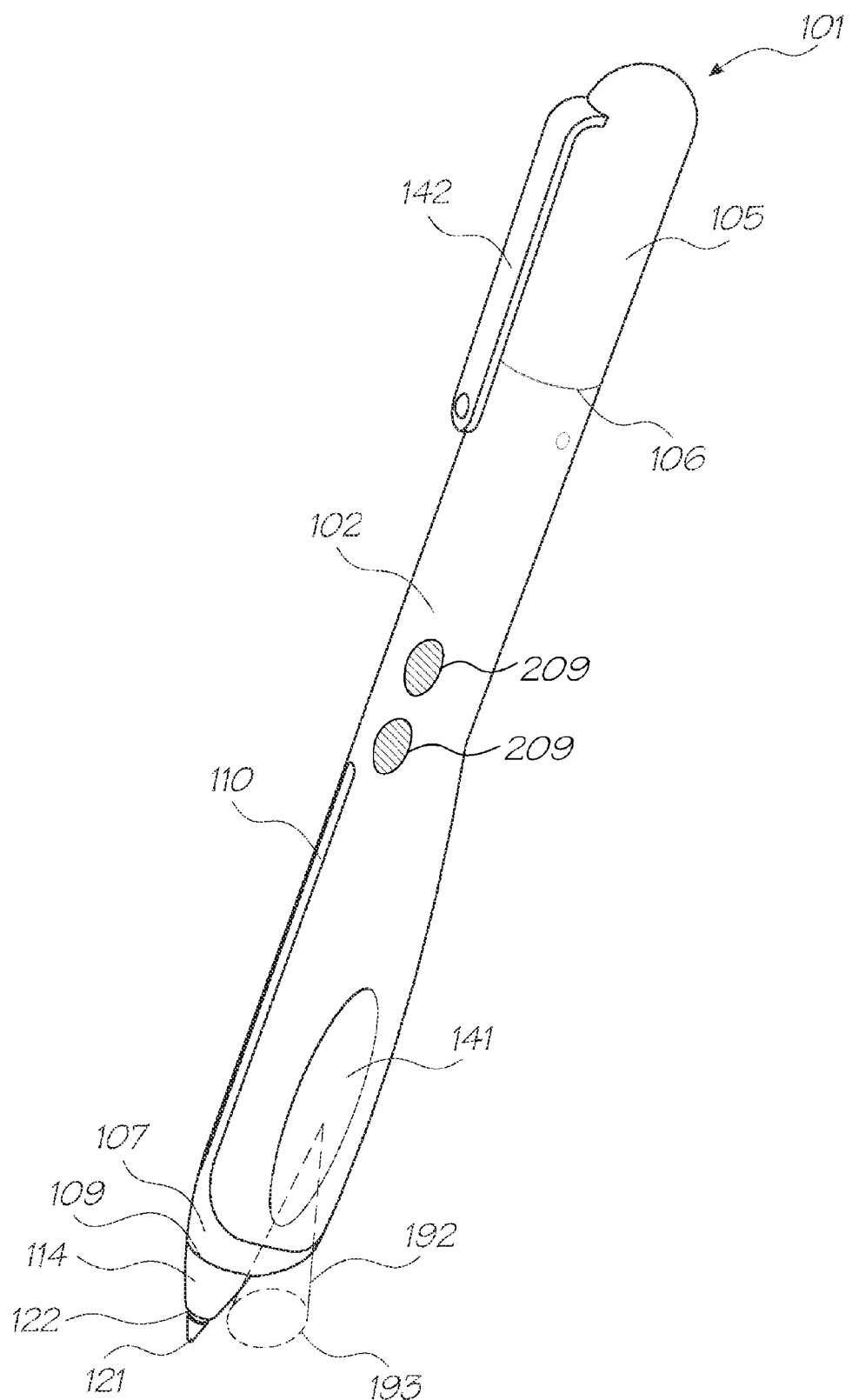
FIG. 8 is a perspective view of a netpage pen and its associated tag-sensing field-of-view cone.
Figure 9:
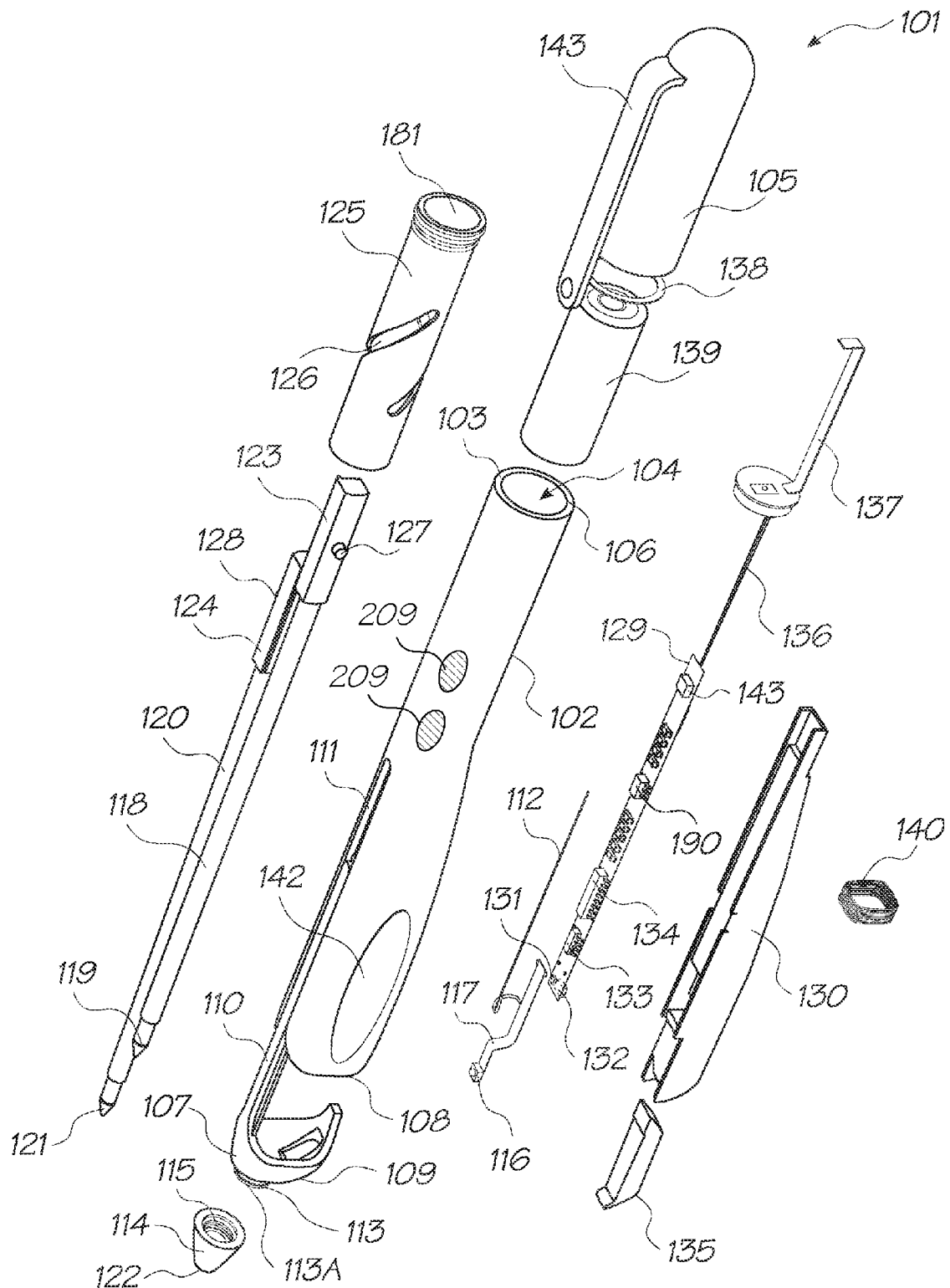
FIG. 9 is a perspective exploded view of the netpage pen shown in FIG. 8.
Figure 10:
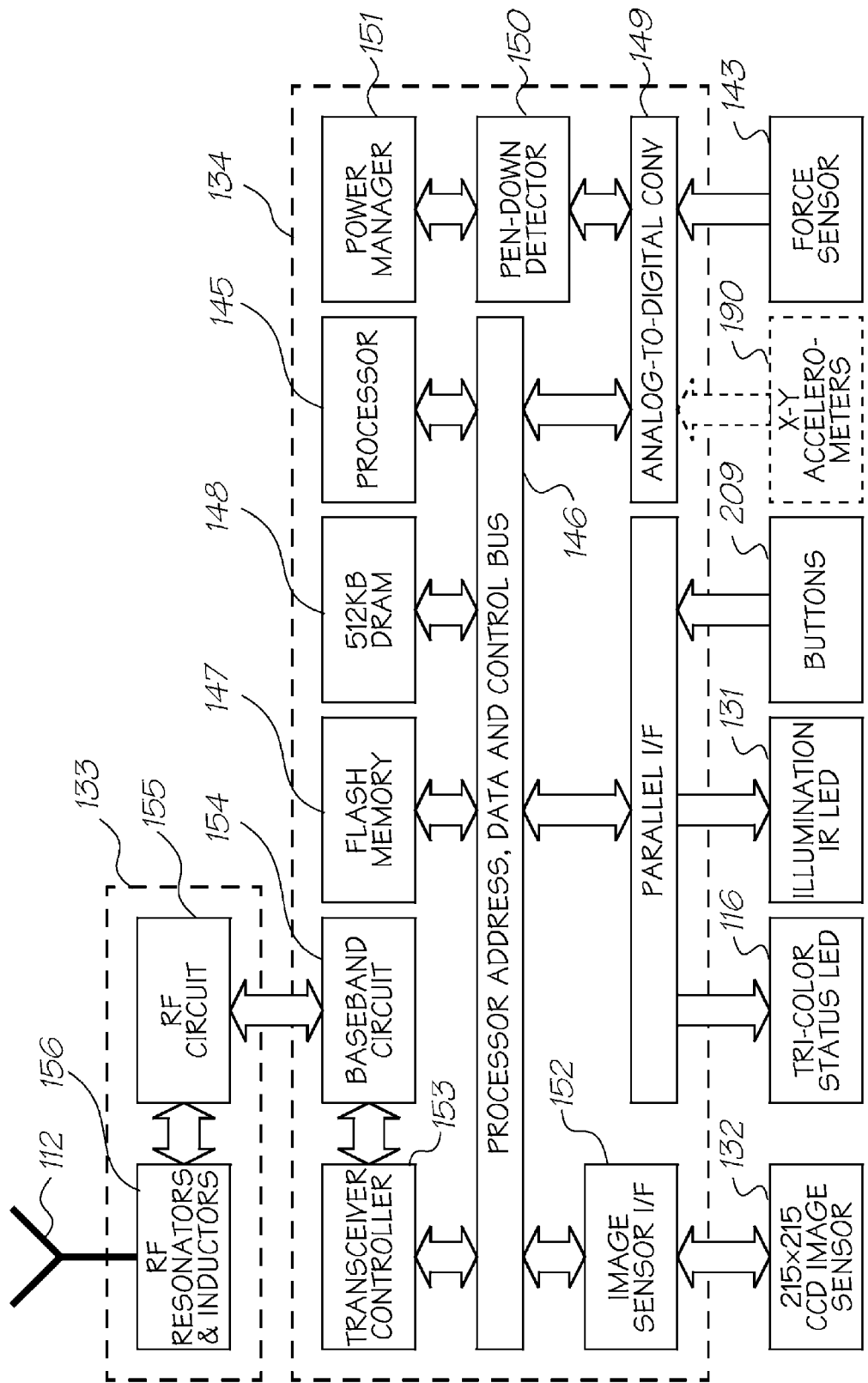
FIG. 10 is a schematic block diagram of a pen controller for the netpage pen shown in FIGS. 8 and 9.

Referring to FIGS. 8 and 9, the pen, generally designated by reference numeral 101, includes a housing 102 in the form of a plastics moulding having walls 103 defining an interior space 104 for mounting the pen components. Mode selector buttons 209 are provided on the housing 102. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

Stylus 120 nib 121 out;
Ink cartridge 118 nib 119 out; and

Neither ink cartridge 118 nib 119 out nor stylus 120 nib 121 out.

A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts a force sensor 143 for detecting displacement in the cam barrel 125 when either the stylus 120 or the ink cartridge 118 is used for writing, in order to enable a determination of the force being applied to the surface by the pen nib 119 or stylus nib 121. Exemplary arrangements for the force sensor 143 are discussed in detail in Section 8.

Rubber grip pads 141 and 142 are provided towards the end 108 of the housing 102 to assist gripping the pen 101, and top 105 also includes a clip 142 for clipping the pen 101 to a pocket.

7.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation of the pen and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a relay device 601, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

Figure 27:
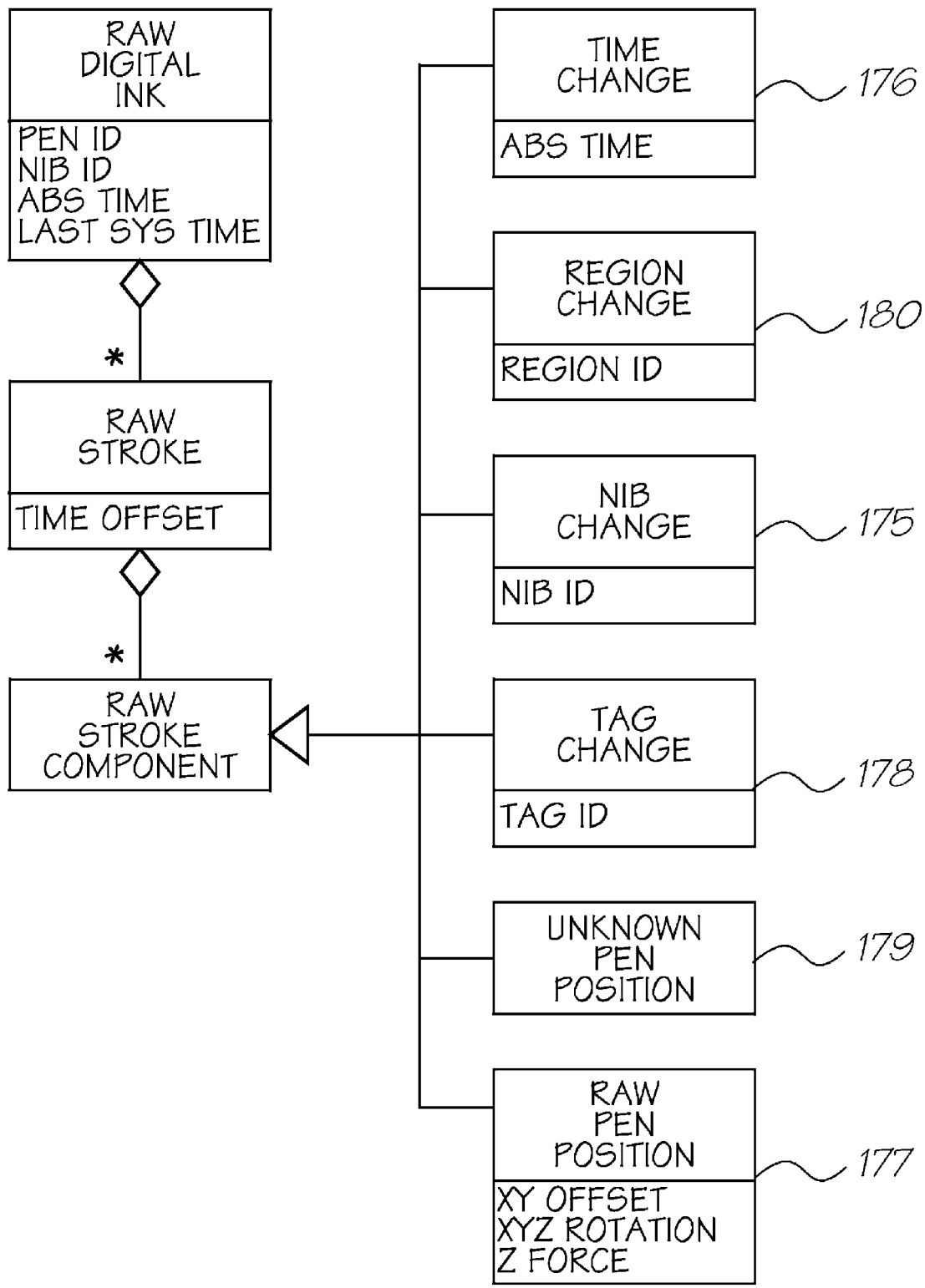
FIG. 27 is a schematic view of a raw digital ink class diagram.

In Applicant's U.S. Pat. No. 6,870,966, the contents of which is incorporated herein by reference, a pen 101 having an interchangeable ink cartridge nib and stylus nib was described. Accordingly, and referring to FIG. 27, when the pen 101 connects to the computing system, the controller 134 notifies the system of the pen ID, nib ID 175, current absolute time 176, and the last absolute time it obtained from the system prior to going offline. The pen ID allows the computing system to identify the pen when there is more than one pen being operated with the computing system.

The nib ID allows the computing system to identify which nib (stylus nib 121 or ink cartridge nib 119) is presently being used. The computing system can vary its operation depending upon which nib is being used. For example, if the ink cartridge nib 119 is being used the computing system may defer producing feedback output because immediate feedback is provided by the ink markings made on the surface. Where the stylus nib 121 is being used, the computing system may produce immediate feedback output.

Since a user may change the nib 119, 121 between one stroke and the next, the pen 101 optionally records a nib ID for a stroke 175. This becomes the nib ID implicitly associated with later strokes.

Cartridges having particular nib characteristics may be interchangeable in the pen. The pen controller 134 may interrogate a cartridge to obtain the nib ID 175 of the cartridge. The nib ID 175 may be stored in a ROM or a barcode on the cartridge. The controller 134 notifies the system of the nib ID whenever it changes. The system is thereby able to determine the characteristics of the nib used to produce a stroke 175, and is thereby subsequently able to reproduce the characteristics of the stroke itself.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131 and the force sensor 143.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor 143 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor 143, controls the LEDs 116 and 131, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a 215×215 pixel CCD (such a sensor is produced by Matsushita Electronic Corporation, and is described in a paper by Itakura, K T Nobusada, N Okusenya, R Nagayoshi, and M Ozaki, "A 1 mm 50 k-Pixel IT CCD Image Sensor for Miniature Camera System", IEEE Transactions on Electronic Devices, Volt 47, number 1, January 2000, which is incorporated herein by reference) with an IR filter.

The controller ASIC 134 enters a quiescent state after a period of inactivity when the pen 101 is not in contact with a surface. It incorporates a dedicated circuit 150 which monitors the force sensor 143 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

In a further embodiment, the pen 101 includes a pair of orthogonal accelerometers mounted in the normal plane of the pen 101 axis. The accelerometers 190 are shown in FIGS. 9 and 10 in ghost outline.

The provision of the accelerometers enables this embodiment of the pen 101 to sense motion without reference to surface location tags, allowing the location tags to be sampled at a lower rate. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate, is short.

8 Force Sensor

Figure 28:
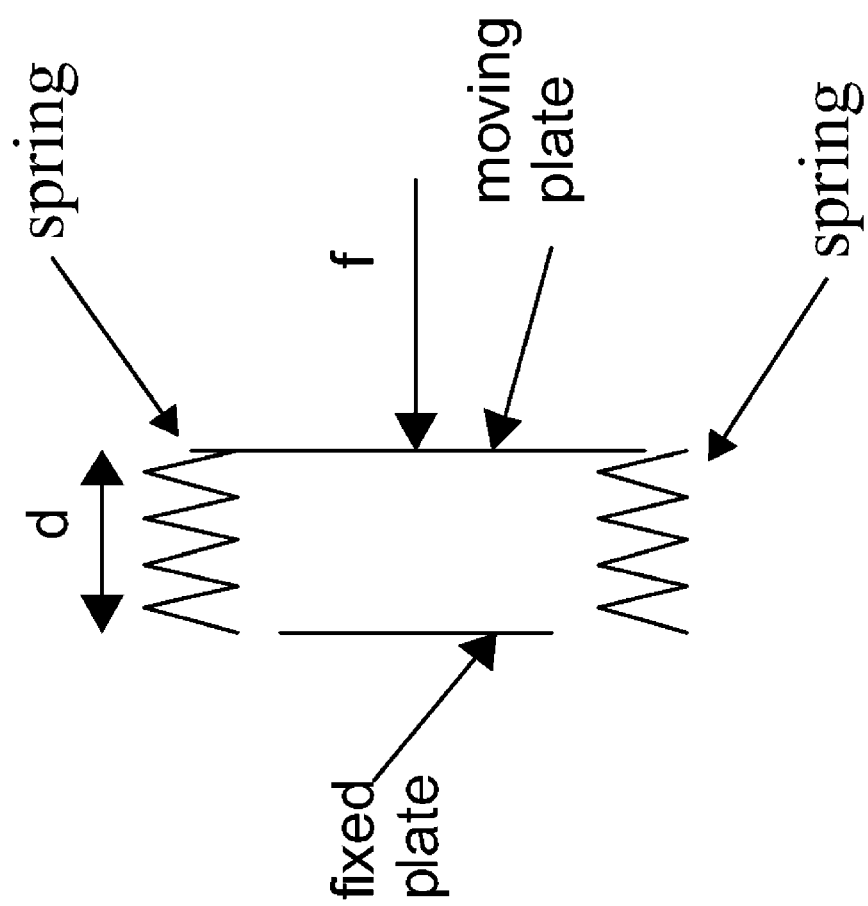
FIG. 28 is a schematic of a parallel plate capacitor with fixed and moveable plates.

A force sensor suitable for connection to the nib of the pen is a parallel plate capacitor having one fixed plate and one moveable plate that is attached to at least one spring, as illustrated in FIG. 28. An applied force compresses the spring changing the distance between the plates and thus the capacitance. By measuring the change in capacitance the amount of applied force can be known.

In FIG. 28, two springs are depicted in order to assist in balanced alteration of the plate separation, however one spring or more than two springs can be used. Further, in FIG. 28 the springs are depicted as being located between the fixed and movable plates merely for illustrative purposes, and the spring(s) can be externally located with respect to the plates. Furthermore, one of ordinary skill in the art understands that other parallel capacitor arrangements, or other mechanical arrangements, are possible for the force sensor. One of ordinary skill in the art also understands that this exemplary force sensor can be applied to situations and environments other than a Netpage system.

The variable capacitance of such the parallel plate capacitor of FIG. 28 scan be approximated by:

$$C_{sen} = \frac{K_1}{d} \quad (EQ\ 1)$$

where $K_1$ is a constant for a given sensor and d is the distance between the plates. The distance d is controlled by the applied force f to a spring and one arrangement is for the force to be measured to be applied to the spring which compresses it and reduces the distance d in proportion to the applied force. Then:

$$d = K_2 - \frac{f}{K_3} \quad (EQ\ 2)$$

where $K_2$ is the initial distance between the plates with no applied force and $K_3$ is related to the spring constant. Then:

$$C_{sen} = \frac{K_1 K_3}{(K_2 K_3 - f)} \quad (EQ\ 3)$$

Figure 29:
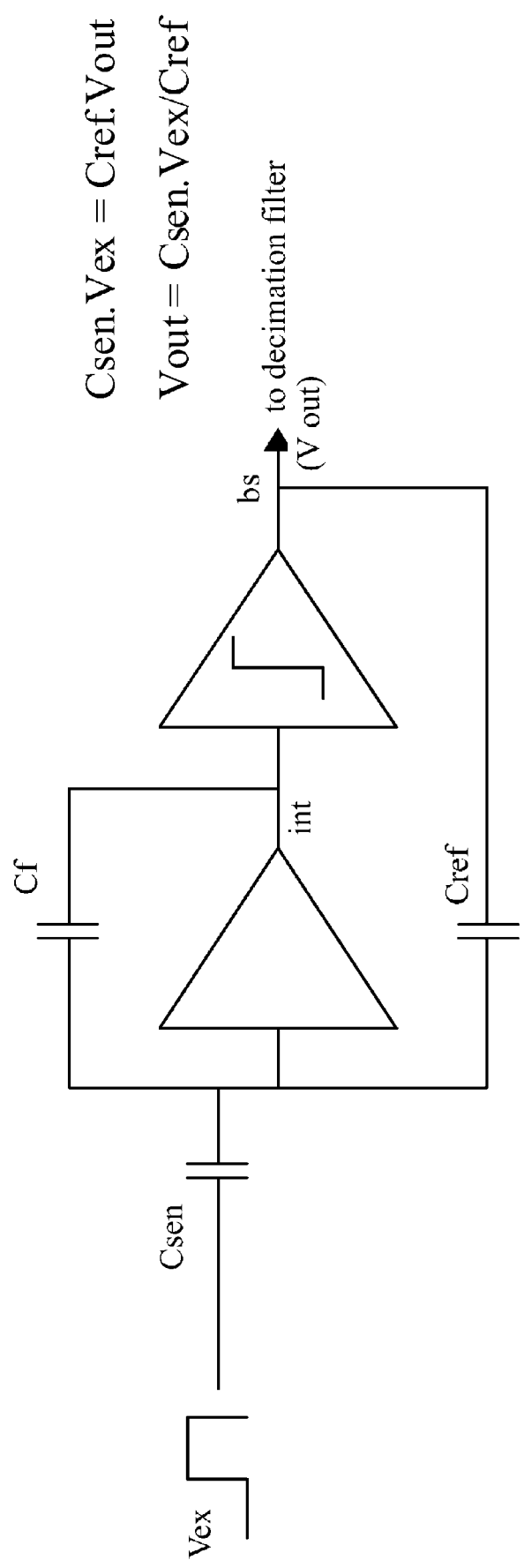
FIG. 29 is a schematic of a conventional (proportional to Csen) sensor.
Figure 30:
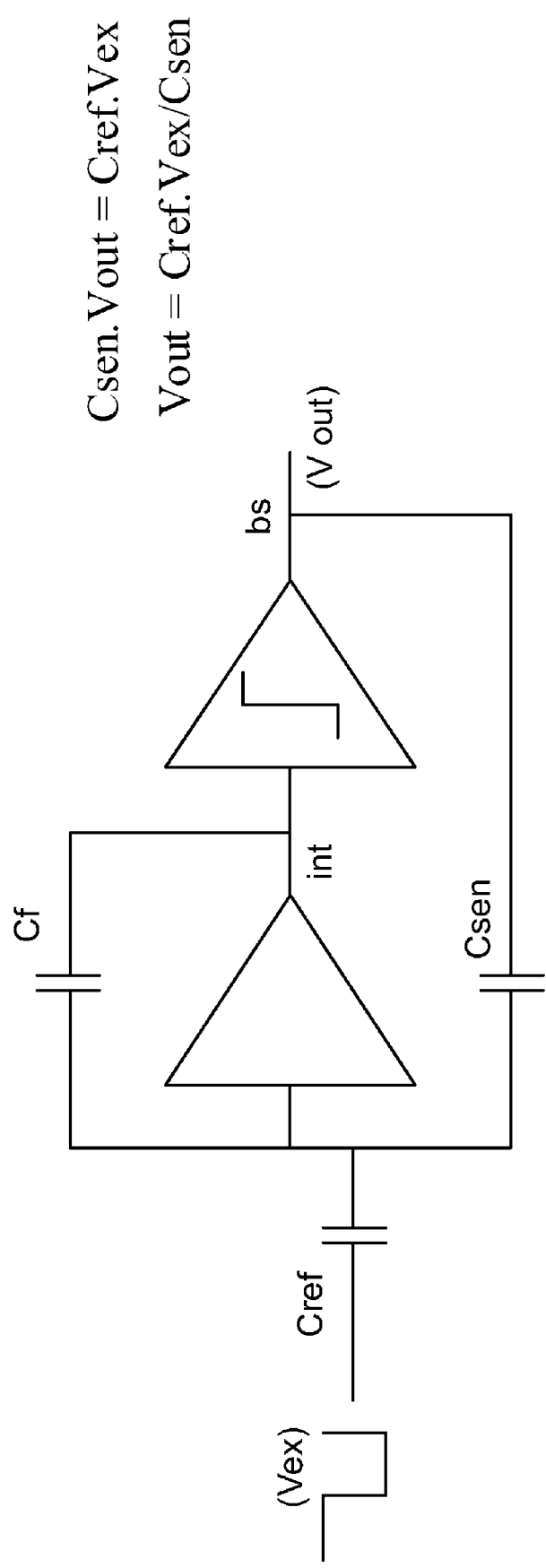
FIG. 30 is a schematic of a 1/C sensor.

One way to measure capacitance $C_{sen}$, to thereby determine the applied force f, is to use a capacitive sensor circuit, such as a delta-sigma modulator or convertor. A conventional delta-sigma convertor is illustrated in FIG. 29 and a first example of a delta-sigma modulator in accordance with an embodiment of the present invention is illustrated in FIG. 30. Both cases are illustrated in simplified form, i.e., switches of the switched capacitor circuits are not shown. This is also the case for the below described further circuit diagrams.

In the circuit of FIG. 29, an excitation signal Vex is applied to a parallel plate capacitor Csen and a signal bs is a bitstream whose mean value, Vout, represents the output of the convertor. A decimation filter is used to convert the single (or multi) bit signal bs to a multi-bit digital signal which is the output of the convertor.

When the circuit is in balance (i.e., $C_{sen}=0$), the delta-sigma convertor adjusts its bitstream duty cycle to be 50:50. The gain of an integrator int is controlled with a feedback capacitor Cf which allows the output to remain in a linear range. The sensitivity to capacitance change in the capacitor Csen is controlled by a reference capacitor Cref. When the squarewave excitation signal Vex and the output Vout of a comparator have the same voltage swing, the conversion gain becomes independent of the swing. The convertor output may then be expressed as:

$$V_{dig} = K_{dig}\left(\frac{C_{sen}}{C_{ref}}\right) \quad (EQ\ 4)$$

where $K_{dig}$ is the gain of the decimation filter at the output. Then:

$$f_{meas} = K_4 - \frac{K_5}{V_{dig}} \quad (EQ\ 5)$$

where $K_4=K_2K_3$ and $K_5=K_1K_3K_{dig}/C_{ref}$.

The calculation of the measured force $f_{meas}$ from $V_{dig}$ then requires a division and subtraction.

In the embodiment of the present invention, this calculation is avoided by placing the parallel plate capacitor $C_{sen}$ in a feedback path of a delta-sigma convertor, as illustrated FIG. 30. In particular, the positions of the parallel plate capacitor Csen and the reference capacitor Cref are reversed from the positions in the conventional convertor circuit such that one of the plates of the capacitor Csen is connected directly to the output of the convertor and the reference capacitor Cref is at the input of the convertor.

Now with a decimation filter at the output of the convertor which produces $V_{dig}$ as a unipolar signal, the bitstream can be inverted to provide subtraction so that:

$$V_{dig} = K_{dig}\left(1 - \frac{C_{ref}}{C_{sen}}\right) \quad (EQ\ 6)$$

then:

-continued $$f_{meas} = K_6 V_{dig} \quad (EQ\ 7)$$

where $$K_6 = \frac{f_{max} - f_{min}}{V_{digmax} - V_{digmin}} \quad (EQ\ 8)$$

If $C_{ref}=C_{senmin}$ which occurs when f=0, then:

$$K_6 = \frac{K_2 K_3}{K_{dig}} \quad (EQ\ 9)$$

As can be seen from EQs 4 and 6, the conventional convertor arrangement produces an output which is proportional to C whereas the arrangement of the present invention produces an output which is proportional to 1/C which is proportional to distance. Accordingly, the arrangement of the present invention allows a larger change in capacitance to be measured for smaller changes in distance as compared to the conventional arrangement. As a result the force sensor of the present invention is able to accurately sense relatively light forces, such as the force of handwriting on the nib of the sensing device whilst requiring minimal power.

Figure 31:
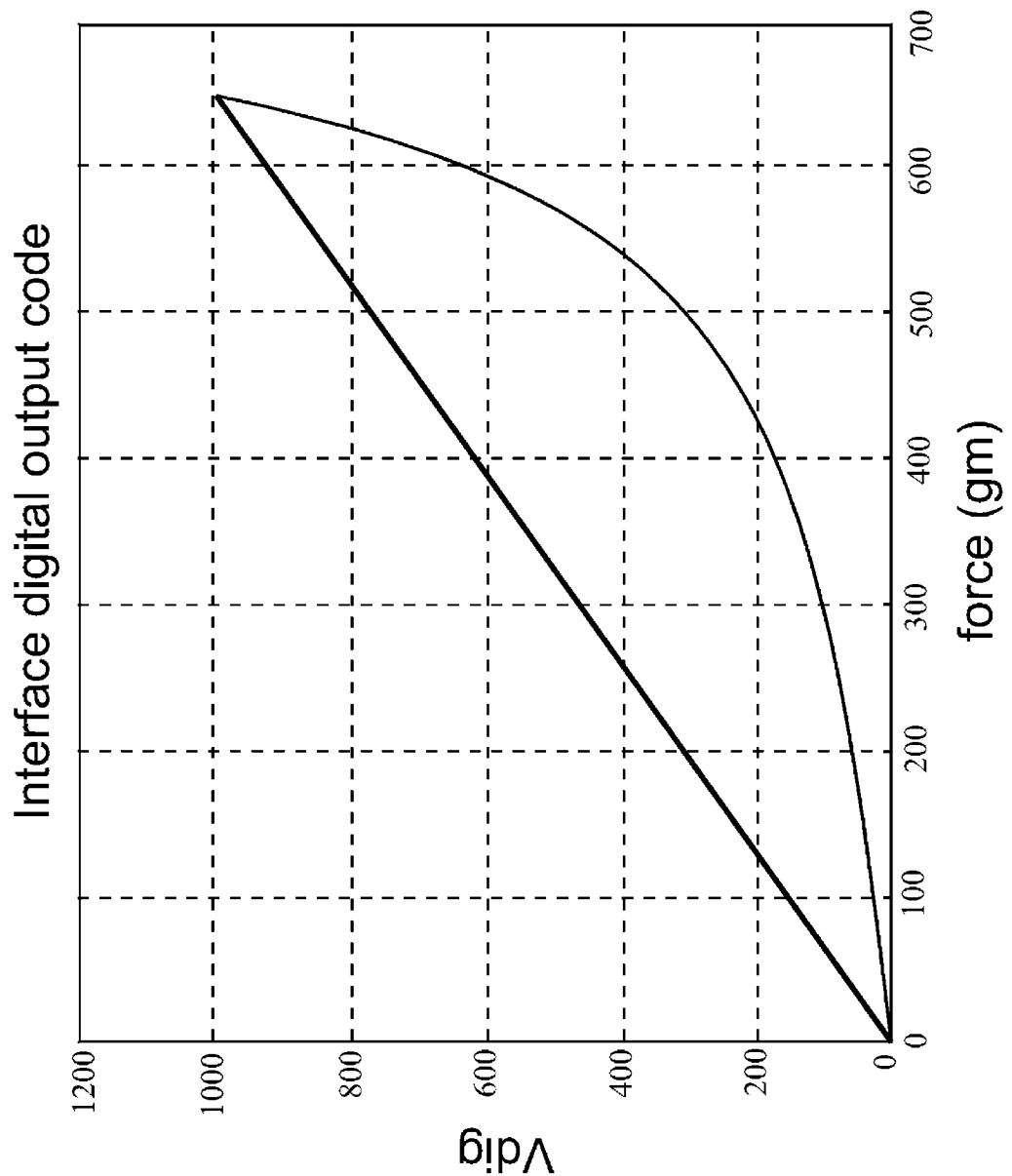
FIG. 31 illustrates output code versus applied force.
Figure 32:
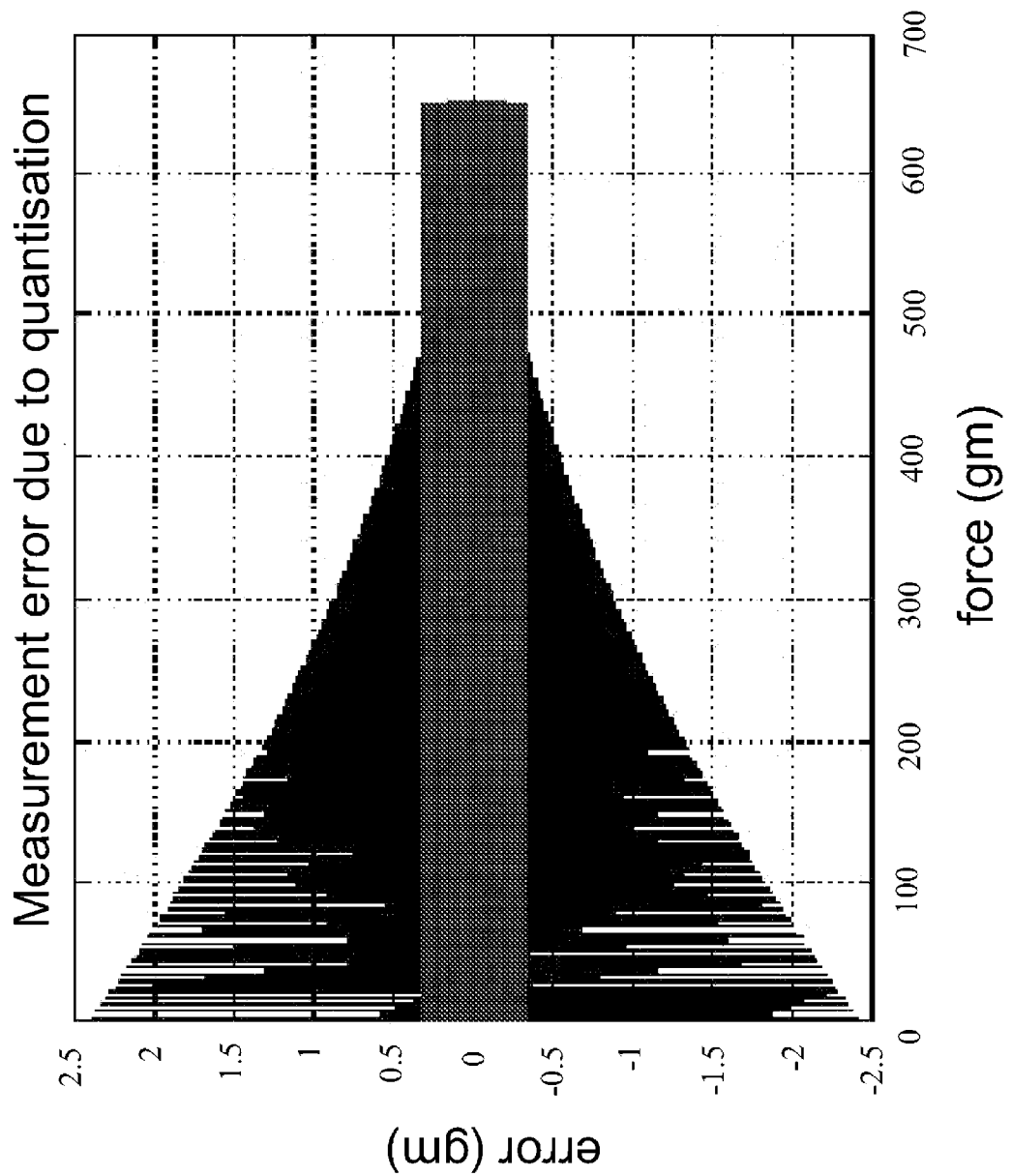
FIG. 32 illustrates measurement error due to quantization.
Figure 33:
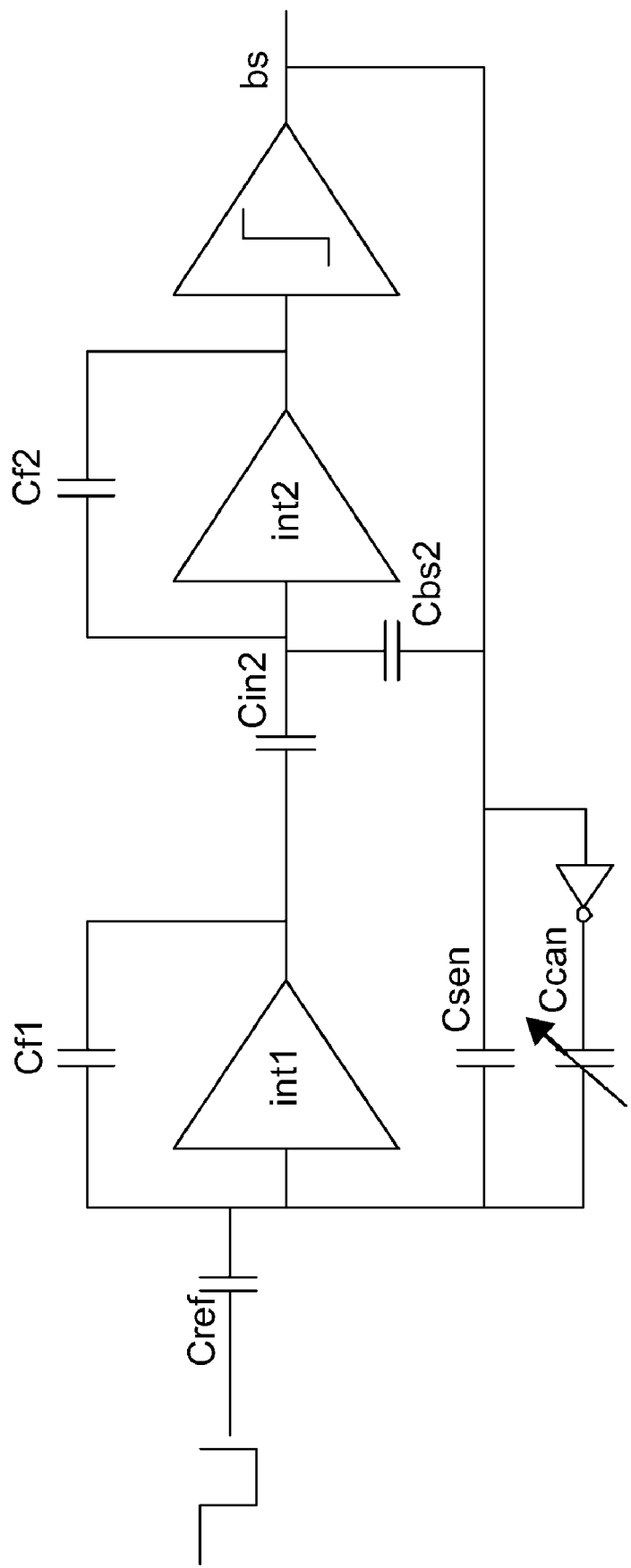
FIG. 33 is a schematic of a second order 1/C CDC.

Results of an exemplary comparison are illustrated in FIGS. 31 and 33. In this example, a 10 bit convertor in which the gains have been adjusted such that both types of convertor cover the same force and output code ranges is used. FIG. 31 shows the non-linear output code versus applied force for the proportional to C convertor and FIG. 32 shows that the error due to quantization increases with decreasing force for the proportional to C convertor whereas the error remains constant for the 1/C convertor. That is, the proportional to C arrangement loses resolution at the low force end of the range (which is the most important for accuracy in the Netpage pen application).

The above-described arrangement of the present invention is a first order sigma-delta capacitive sensor. However, higher order sensors are possible and within the scope of the present invention. For example, a possible second order sigma-delta capacitive sensor is illustrated in FIG. 33.

The second order sensor employs zero force trimming through the addition of capacitor Ccan as illustrated in FIG. 33, which allows any parasitic capacitance across the capacitor Csen to be cancelled. This arrangement has more parameters that can be optimized than the first order arrangement. The low pass response of the convertor to input signals becomes more obvious and the cut-off frequency is proportional to Csen, i.e., with the minimum value of Csen, at nib-up, the convertor provides the most filtering.

Figure 34:
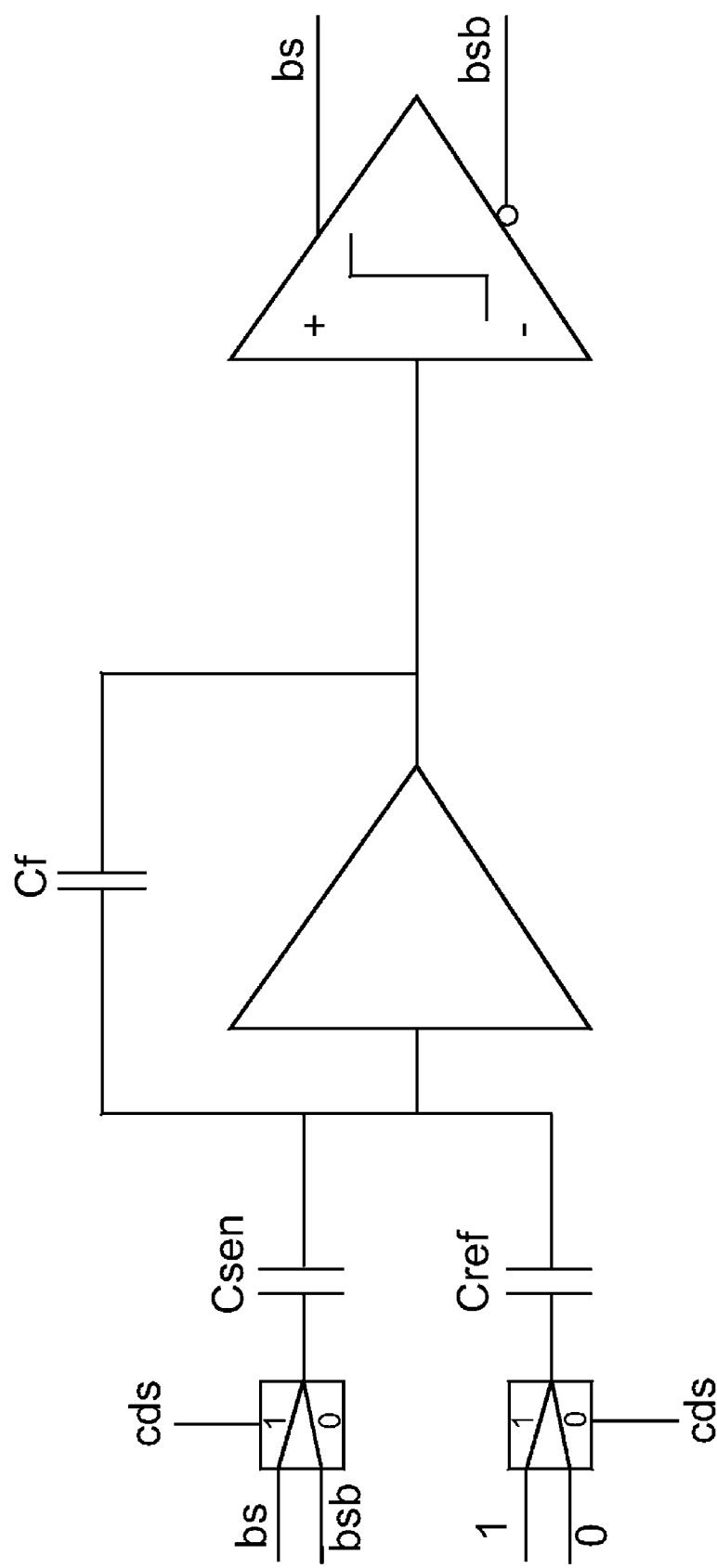
FIG. 34 is a schematic of a conventional improvement to the second order circuit.
Figure 35:
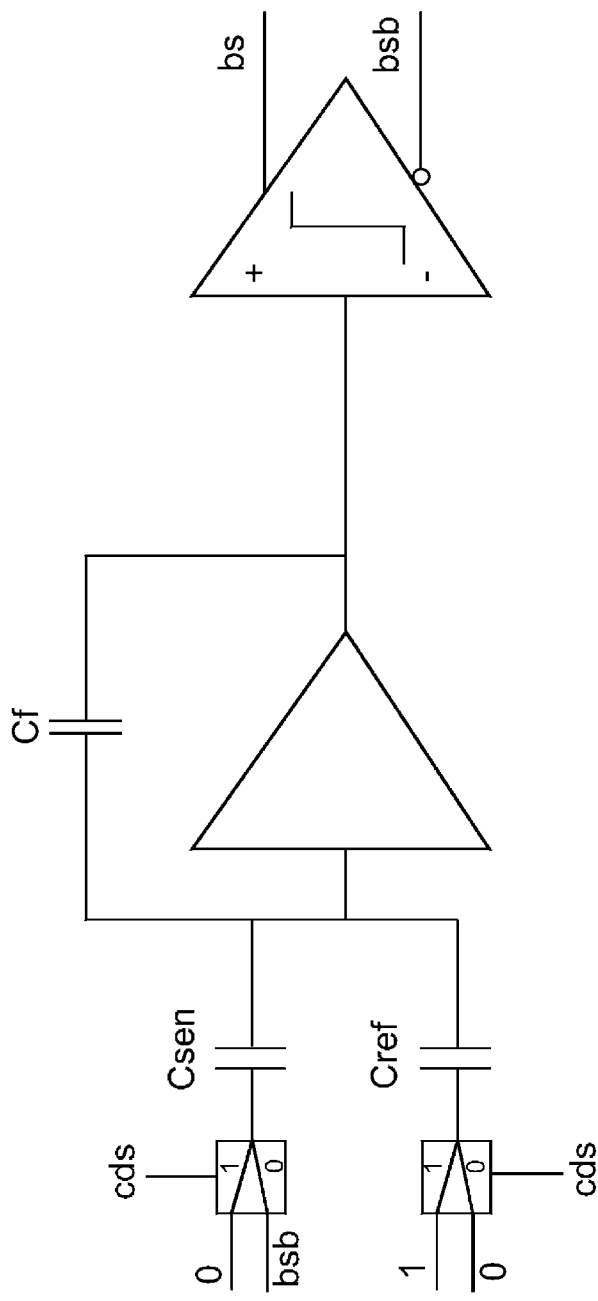
FIG. 35 is a schematic of an offset second order circuit.

A further improvement to the first (or second) order arrangement is explained in relation to FIGS. 34 and 35. A conventional circuit is illustrated in FIG. 34, in which correlated double sampling (CDS) has been applied to reduce offsets. As $C_{sen}$ increases the conventional delta-sigma convertor will reach a balanced state with a 50% duty cycle on the signal bs. Thus, only half (i.e., 0% to 50%) of the conversion range is available.

On the other hand, in the further arrangement of the present invention illustrated in FIG. 35, CDS is again applied but the signal bs at the capacitor Csen is replaced by 0 (zero), which changes the balanced state of the convertor to a 100% duty cycle. Accordingly, the entire conversion range is made available.

In particular, the capacitor Cref is used to set the offset which must be adjusted so that the sigma-delta convertor is near saturation when $C_{sen}$ is at the minimum expected value. When CDS is used in the integrator int in conjunction with the zero input signal at the capacitor Csen, the bitstream applied to the capacitor Csen is changed in a way that allows substantially the full range of the convertor to be used.

Figure 36:
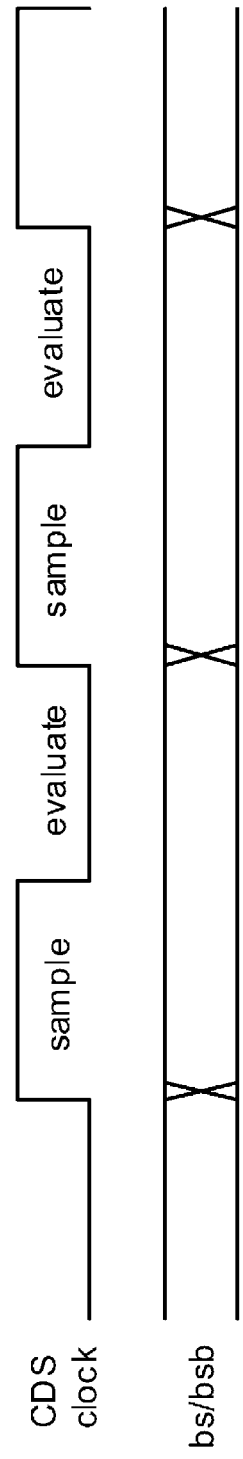
FIG. 36 illustrates CDS operation.

CDS operates on two phases as demonstrated in FIG. 36, being sample and evaluate, and the input to the integrator int (through the capacitor Csen) is $V_{int}=V_{eval}-V_{samp}$. It is assumed that the signal bs can take the values 0 and 1 and that the average $V_{int}=0$ for the circuit to be balanced. $V_{int}$ is calculated in Table 3 for the conventional circuit of FIG. 34 and in Table 4 for the offset circuit of FIG. 35.

TABLE 3

Calculation for conventional circuit

| Bs | cds = 1 | cds = 0 | $V_{int}$ |
|---|---|---|---|
| 0 | bsb | — | bs | |
| 0 | 1 | — | 0 | 1 |
| 1 | 0 | — | 1 | −1 |

Thus for balance, the signal bs requires a duty cycle of 50% to maintain the average $V_{int}=0$.

TABLE 4

Calculation for offset circuit

| Bs | cds = 1 | cds = 0 | $V_{int}$ |
|---|---|---|---|
| | bsb | — | 0 | |
| 0 | 1 | — | 0 | 1 |
| 1 | 0 | — | 0 | 0 |

Thus for balance, the signal bs=1 (100% of the time) to maintain the average $V_{int}=0$.

8.1 Behavioral Modeling

Some requirements of the force sensor for the Netpage system are:

Pen down delay <1.5 ms;
Final sampling rate 50 Hz to 150 Hz;
Output 10 bits monotonic;
Power consumption <100 uW (55 uA @1.8 V);
Operating temperature range −10° C. to 55° C.;
Pen down detection at 6 grams; and
Accuracy <20%.

VHDL modeling was carried out with these requirements as considerations.

8.1.1 First Order VHDL

A VHDL model written for a first order sigma-delta capacitive sensor explores the proportional to distance (1/C) arrangement of the present invention.

A test bench calculated EQ 1, with d linearly stepped in increments of five distance units (except the first value was 0.5 instead of 0). This simulation resulted in a set of linear steps in response to $C_{sen}$ with $C_f$=8 pF and $C_{ref}$=0.49 pF. The amplitude of the output of the integrator int is controlled by the capacitor Csen and is saturated when $C_{sen}$=20 pF.

The output voltage is given by $C_{ref}/C_{sen}$ (e.g., 0.08 pF/0.1 pF=0.8 V). This configuration only allows the offset to be set (the feedback capacitor Cf only controls the integrator gain).

The gain could be reduced by connecting another capacitor in parallel with the capacitor Csen but this will introduce non-linearity.

The feedback capacitor Cf allows the integrator dynamic range to be optimized. Provided the integrator is well behaved if clipping is allowed, the minimum value for $C_f$ should be used so that clipping occurs at the maximum value of $C_{sen}$.

Both arrangements could be implemented with a select bit to control the mode. Due to mechanical tolerances, any practical sensor will require two point calibration to set the offset and gain.

8.1.2 Second Order VHDL

As previously discussed, the second order arrangement of FIG. 33 has more parameters that can be optimized than the first order design.

The dc level at the output of integrator int1 can be controlled by the ratio $C_{bs2}/C_{in2}$. This allows some freedom in the setting the gain of the integrator int1 which should be as high as possible without clipping. It is important that no clipping occurs with pen-up otherwise the margin to the pen-down threshold is reduced. $C_{in1}$ is set so that the convertor is as near to the lower end of the conversion range without clipping. Too low a duty cycle in the bitstream results in very large excersions at integrator int2. Some allowance needs to be made for long term drift in the zero force capacitance of the sensor to ensure it always stays within the range of the ADC.

In the model, the sensor is assumed to provide a 3:1 capacitance change with plate distance of the capacitor Csen in the range of 50 um to 150 um. The capacitance at 50um was 1 pF. Then capacitance (in pF) is given by:

$$C_{sen} = \frac{50}{d} \quad (EQ\ 10)$$

where d(um) is the plate distance. The value of d is given by:

$$d = 150 - \frac{f}{5} \quad (EQ\ 11)$$

Then:

$$C_{sen} = \frac{250}{(750-f)} \quad (EQ\ 12)$$

The value of $C_{can}$ is adjusted to cancel the parasitic capacitance across the sensor. The remaining error, due to quantization of $C_{can}$, results in a gain error. On the other hand, the gain accuracy requirement is <20%. If the resolution of $C_{can}$ were 100 fF and the remaining offset taken out with $C_{in1}$, the convertor would read 455 g instead of 500 g or a gain error of −9% (which could be corrected for in software).

Three decimators were tried; normally a third order decimator should be used with a second order convertor for optimum noise filtering for which the step response takes about three samples to settle. To meet the pen-down detection time requirement of <2 ms, the output sample rate was set to 1.5 kHz. A decimation factor of 42 was used with an input sampling clock of 64 kHz. A first order decimator cannot provide the required 10 bits of resolution with this decimation factor. A second order decimator can provide 10.8 bits of resolution and could, on average, detect pen-down one sample earlier at 1.33 ms but with less certainty.

The implementation uses CDS to cancel OTA offsets, the most important being that of the integrator int1. CDS should also attenuate the 1/f noise coming from the capacitor Csen and capacitor Cin1. However, there is a problem when adding an anti-alias filter to the input of integrator 1 as it must pass chopped CDS signals. Even with a normalized cut-off of three, ADC gain is reduced by about 5%. Furthermore, unwanted signals at the input will be aliased to dc when they occur at harmonics of the sampling frequency. This is an unusual switched capacitor circuit since one of the switched capacitors is external and the anti-alias filter can only be placed inside the switched capacitor circuit. The same is true for a non-CDS implementation, the anti-alias filter must allow the integrator input current to settle within half a clock cycle. Therefore, the function of this filter can only be to attenuate rf signals well above the sampling frequency. It cannot be used to attenuate signals just above the Nyquist frequency.

8.1.3 Digital Output Calculation

This section gives analytical expressions to calculate the CDC output code.

8.1.3.1 Decimator Gain

The decimator gain, which is the same for both modes of the convertor, is given by:

$$K_{dig} = \frac{dec^n}{scale} \quad (EQ\ 13)$$

where dec=decimation factor, n=order of decimator, scale=scale factor at decimator output and must be a power of 2. The digital output is 10 bits and scale must be adjusted to make the useful data fit within these 10 bits (or allow some clipping if this is acceptable). Typically the sigma-delta CDC should only be operated between 10% and 90% of full scale to avoid internal clipping so the decimator output will not reach full scale.

For example, with $F_{in}$=64 kHz and $F_{out}$=1.5 kHz, dec=42 and n=3. This would give a maximum output of $42^3$=74088 but the maximum allowable output code is 1023. If scale=128, the maximum output would be 579 which is <1023. However, assuming the maximum analogue signal range is up to 80% of full scale, scale can be set to 64 so then 74088*0.8/64=926<1024 (range) making better use of the digital range. In this case, $K_{dig}$=74088/64=1157.625.

A digital offset is provided to centre the CDC range within the output range, so the lower 10% of the CDC range which will not be used can be removed.

8.1.3.2 Proportional to C

The following applies for the second order:

$$V_{dig} = K_{dig}\left(\frac{(C_{sen} - C_{can})}{C_{in1}}\right) \quad (EQ\ 14)$$

$C_{in1}$ sets the conversion gain and $C_{can}$ allows the range of $C_{sen}$ to be centred in the available conversion range. $V_{dig}$ represents the scaled and offset sensor capacitance. The term within the outer parenthesis should lie between 0.1 and 0.9.

The force is calculated as:

$$f = K_1 - \frac{K_2}{V_{dig}} \quad (EQ\ 15)$$

from EQ 12, $C_{sen}$ in terms of force is given by:

$$C_{sen} = \frac{K_4}{(K_5 - f)} \quad \text{(EQ 16)}$$

Substituting for $C_{sen}$ in EQ 14 and assuming no offset, $K_1 = K_5$ and $K_2 = K_4 K_{dig}/C_{in1}$ so that:

$$f = K_5 - \frac{K_4 K_{dig}}{C_{in1} V_{dig}} \quad \text{(EQ 17)}$$

8.1.3.3 Proportional to 1/C

The following applies for the second order:

$$V_{dig} = K_{dig}\left(1 - \frac{C_{in1}}{(C_{sen} - C_{can})}\right) \quad \text{(EQ 18)}$$

The term within the outer parenthesis should lie between 0.1 and 0.9. The force is calculated from (assuming no offset):

$$f = K_3 V_{dig} \quad \text{(EQ 19)}$$

$K_3$ is the slope of the CDC given by:

$$K_3 = \frac{f_{max} - f_{min}}{V_{digmax} - V_{digmin}} \quad \text{(EQ 20)}$$

where $f_{min}$ (0g) is the minimum force and $f_{max}$ (500 g) the maximum.

Substituting for $C_{sen}$ from EQ 16 in EQ 17 and for $V_{dig}$ in EQ 20 yields:

$$K_3 = \frac{K_4}{K_{dig} C_{in1}} \quad \text{(EQ 21)}$$

For example, assuming $C_{in1} = C_{sensmin} = \frac{1}{3}$ pf, then $K_3 = 250 \times 64 \times 3/74088 = 0.64788$. Note that in practice, $C_{in1} < C_{sensmin}$ so that the CDC does not clip.

An error in the value of $C_{in1}$ results in both offset and gain errors at the CDC output. Modifying EQ12 to allow an error e in the value of $C_{in1}$ gives:

$$K_{3e} = \frac{K_4}{K_{dig}(C_{in1} + e)} \quad \text{(EQ 22)}$$

Then using the following approximation:

$$\frac{1}{(K + x)} \approx \frac{1}{K} - \frac{x}{K^2} \quad \text{(EQ 23)}$$

then:

$$K_{3e} = \frac{K_4}{K_{dig}}\left(\frac{1}{C_{in1}} - \frac{e}{C_{in1}^2}\right) \quad \text{(EQ 24)}$$

the slope error is then given by:

$$K_3 - K_{3e} = \frac{K_4 e}{K_{dig} C_{in1}^2} \quad \text{(EQ 25)}$$

or expressed as a percentage error as:

$$er = \frac{100e}{C_{in1}} \quad \text{(EQ 26)}$$

If e=1 fF, the gain error is 0.3% for $C_{in1}=\frac{1}{3}$ pF.

8.1.4 Matlab

Figure 37:
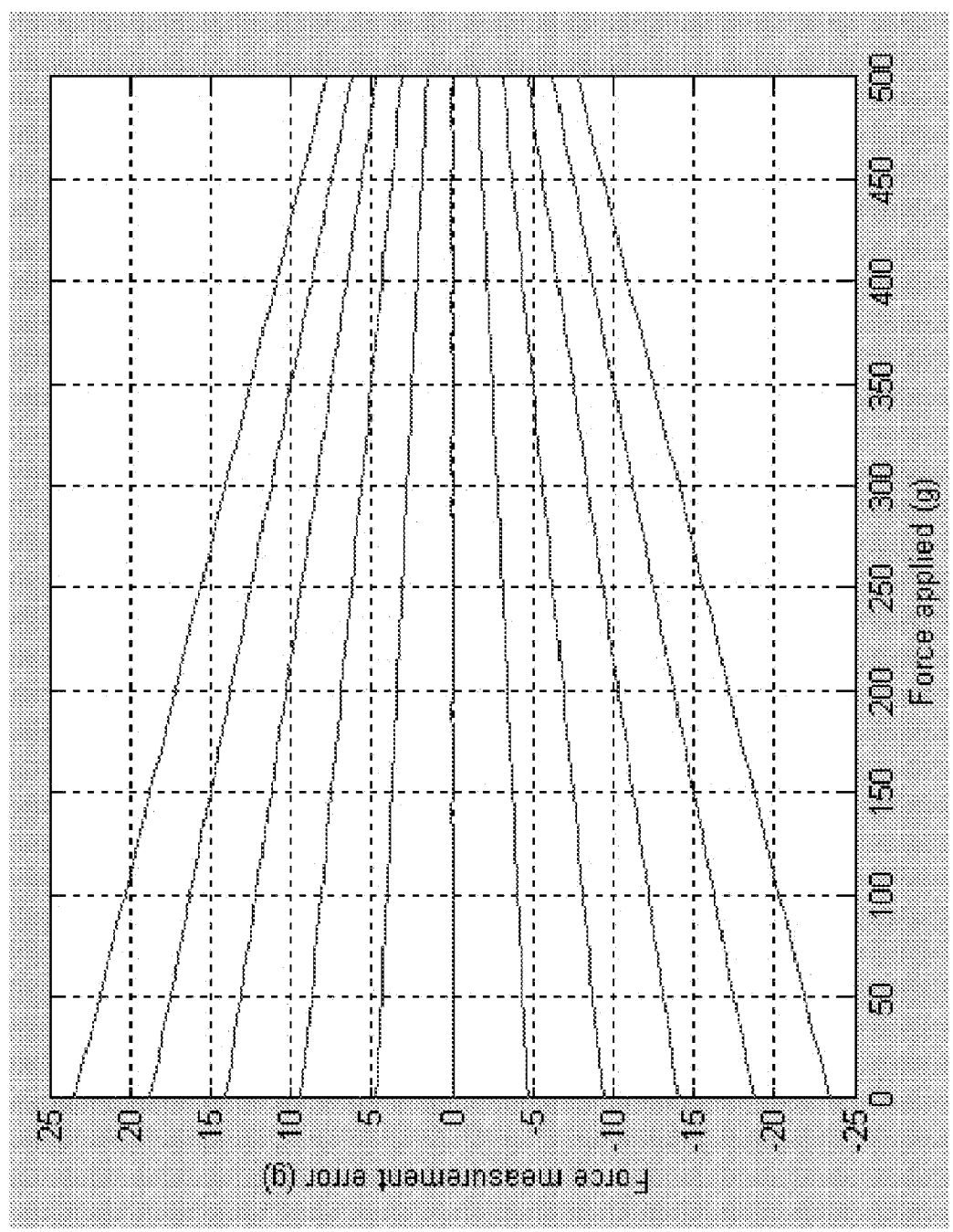
FIG. 37 shows error in $C_{in1}$.
Figure 38:
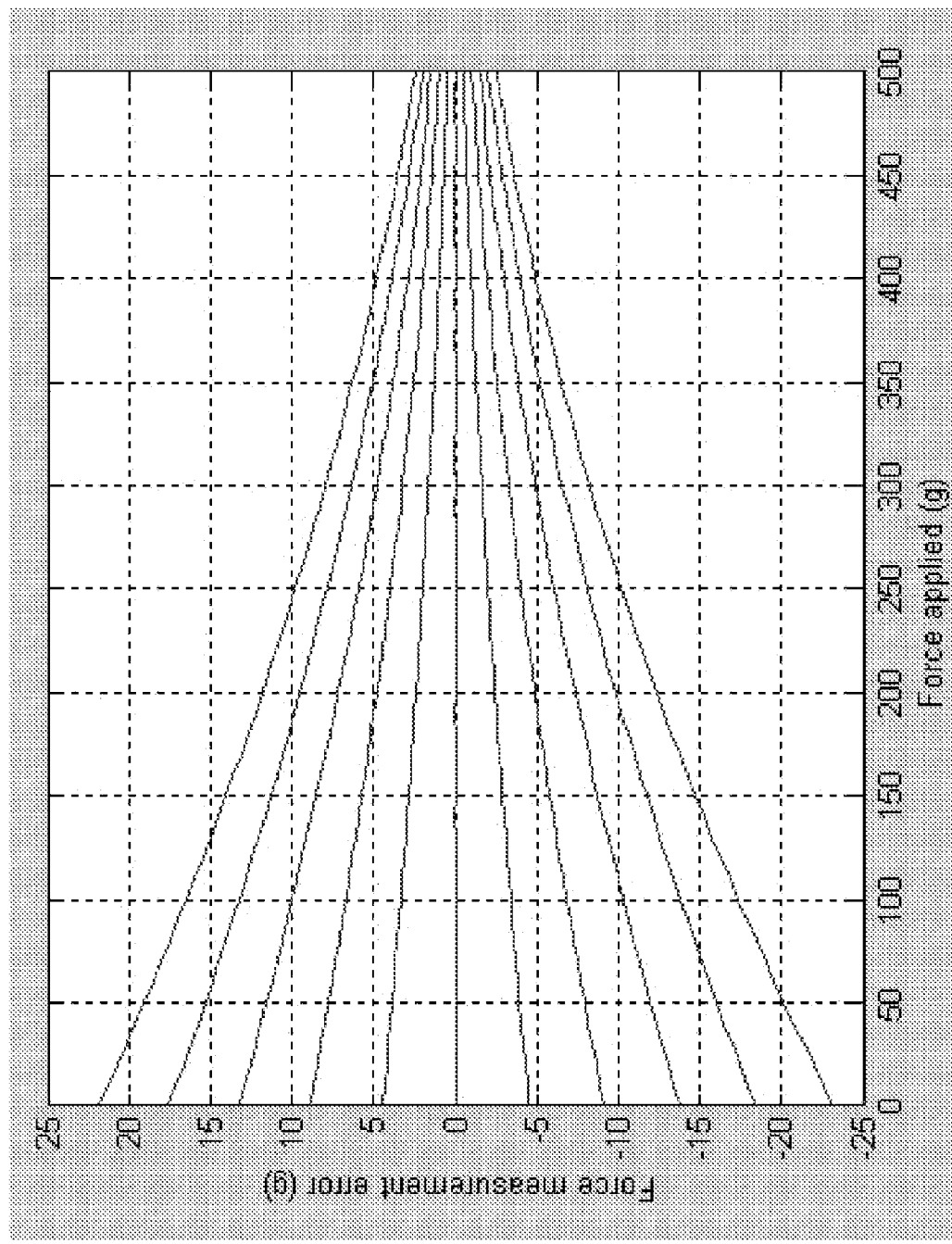
FIG. 38 shows error in $C_{can}$.

The graphs plotted shown in FIGS. 37 and 38 are from the equations derived in Section 8.1.3 and show the measured force error due to the specified capacitor value error.

The simulation assumes a 2 point calibration for gain and offset after which an error of up to +10 fF in steps of 2 fF is added to $C_{in1}$.

8.1.5 Noise Analysis

The nib is allowed to move up to 100 u so a range of 50 u to 150 u would be practical. The sensor capacitance is expected to be in the range of 0.333 pF to 1 pF. Then with Cref=0.333 pF, the output would be in the range of 1 V down to 0.333 V (−0.34 V with the full range variant). The S/N loss due to not being able to reach full scale is only 20*log(⅔)=3.5 dB.

The incremental gain of the ADC is −3 V/pf when Csen=0.333 pF and −1 V/pf when Csen=1 pF.

Assuming the dominant noise source is the sensor capacitor, the rms noise voltage is given by:

$$V_n = \sqrt{\frac{kT}{C_{sen}}} \quad \text{(EQ 27)}$$

where k=1.38×10$^{-23}$, T=300, $C_{sen}$=0.333 pF then $V_n$=117 uVrms.

Assuming all of this noise is folded into the passband of the sigma-delta convertor, a proportion of the noise will be removed by the decimation filter. Since this noise is present at the input, no noise shaping takes place and the improvement in signal to noise ratio at the filter output is given by 10 log(OSR) where OSR is the over sampling ratio. With a clock of 64 kHz and an output sample rate of 1.3 kHz, OSR=49.23 giving an improvement of 16.92 dB.

The voltage gain of the convertor from Csen to the output was checked in the behavioural model. For Csen=0.333 pF, the gain is 0.5(for full scale=0 to +1 V). Thus, the noise generated by the capacitor is reduced by 6 dB at the output. However Cref will contribute an equal amount of noise as it is also 0.333 pF thus increasing the noise by 3 dB at the output. Note that the exemplary convertor implements CDS which reduces the low frequency capacitor noise.

The pre-decimation filter output noise with Csen=0.333 pF=117 uV/2=58.5 uVrms, output signal=1V. Output with Csen=1pF=0.333 V. S/N=20 log((1−0.333)/58.5 uV)=81.1 dB. After the decimation filter, S/N=81.1+16.92=98 dB or 16.3 ENOB. The convertor output needs to be thresholded to detect pen down so it is appropriate to consider the peak noise.

Assuming a pk to rms ratio of 13 dB for the noise, the resolution of the convertor will be reduced to 14.2 ENOB.

Note that with Csen=0.333 pF, the overall S/N will be limited by the OSR of the sigma-delta convertor to about 70 dB (11.6 ENOB) rather than kT/C noise.

8.2 Design Criteria

Circuit simulation has shown some of the criteria for implementing the capacitive interface.

8.2.1 Input Impedance

The stage connected to the sensor must be able to overcome the effects of parasitic capacitance to ground at this node. The input resistance is given by 1/gm so forms an RC filter with a time constant of $C_{par}$/gm. This time constant dominates in the settling time of the integrator and can be used to determine the minimum gm requirement of the first stage.

The voltage step response is given by:

$$V = 1 - e^{\frac{t}{CR}} \quad (EQ\ 28)$$

Then:

$$gm_{min} = -2C_{par}F_s \ln(1-V) \quad (EQ\ 29)$$

For a 1% final error with C=50 pF and $F_s$=64 kHz, $gm_{min}$=29u Mhos. It should be noted that the power consumption of the first stage is proportional to the sampling rate and $C_{par}$.

Although it is possible to connect the sensor to the first integrator, the requirements to provide a low input impedance to overcome parasitic capacitance require high current in the first integrator. It is much better to use a buffer amplifier which allows the buffer and sigma-delta convertor to be optimised independently. The first integrator current can be substantially reduced and the overall current consumption reduced by adding the buffer.

With parasitic capacitance to ground present, the gm of the buffer substantially controls the settling time of the circuit and the open loop voltage gain determines the accuracy. Some trade-off can be made between gm and Ro maintaining the same low frequency Av. A good target would be gm=100 u Mhos and Ro=100 M ohms so that Av=80 dB.

The gain boosted folded cascode, when operated at 4.3u tail current (1uA into the reference circuit) provides gm=55u Mhos and Ro=140M giving Av=78dB. Since the input from the sensor is single ended, only a single ended output OTA is required which should save power. The non-inverting input can then be tied directly to vcm thus ensuring the lowest input impedance.

8.2.2 Connection of inn to vcm

If the first integrator is used to directly interface to the capacitive sensor, it would be desirable to connect the unused differential input directly to the common mode voltage, vcm, to obtain the lowest resistance at the virtual earth summing node. However, because of offsets in the OTA, this connection must be made with a capacitor so that the offset can be stored during the sample phase and cancelled during evaluation.

8.2.3 Capdac Unit Capacitor 20 fF may be too small. Need careful layout and good extraction.

8.2.4 Multiplexers

Some multiplexers may be directly connected to the summing points of the integrator. In this case, leakage due to the body source diodes and sub-threshold current must be minimised. Tee switches may be used for both the capdacs and modulator input multiplexers to obtain sufficient isolation.

When Tee switches are used, the mid point of the Tee switch must be biased to vcm and not to one of the supplies. This ensures sub-threshold current only flows when the output node of the multiplexer is not at vcm. The integrator summing points are biased at vcm thus minimising sub-threshold leakage.

The front end multiplexers which provide the excitation signals are three levels deep and could be replaced with more logic and one level of muxing.

8.2.5 Sensor Node Leakage

DC leakage current into the sensor node degrades the accuracy of the circuit. The analogue input pad is expected to be the largest source. 1 nA of leakage current results in 1 nA*15.625 us/3 pF=5.2 mV of error per integrator step. In both modes, this current results in a pen up force error of 20 g. This can be solved by chopping the excitation signals and modulator inputs. The chopping signal must contain an even number of cycles during the output period of the decimation filter. This leakage current uses up part of the conversion range so it must be ensured that the convertor remains within its operating range. The feedback within the sigma-delta modulator will minimise the range loss provided the convertor does not saturate (which is most likely to happen at pen-up).

The pad leakage current may be expected to be up to 50 nA. It may be necessary to use both NMOS and PMOS protection devices so that not all the leakage current flows into the convertor.

Figure 39:
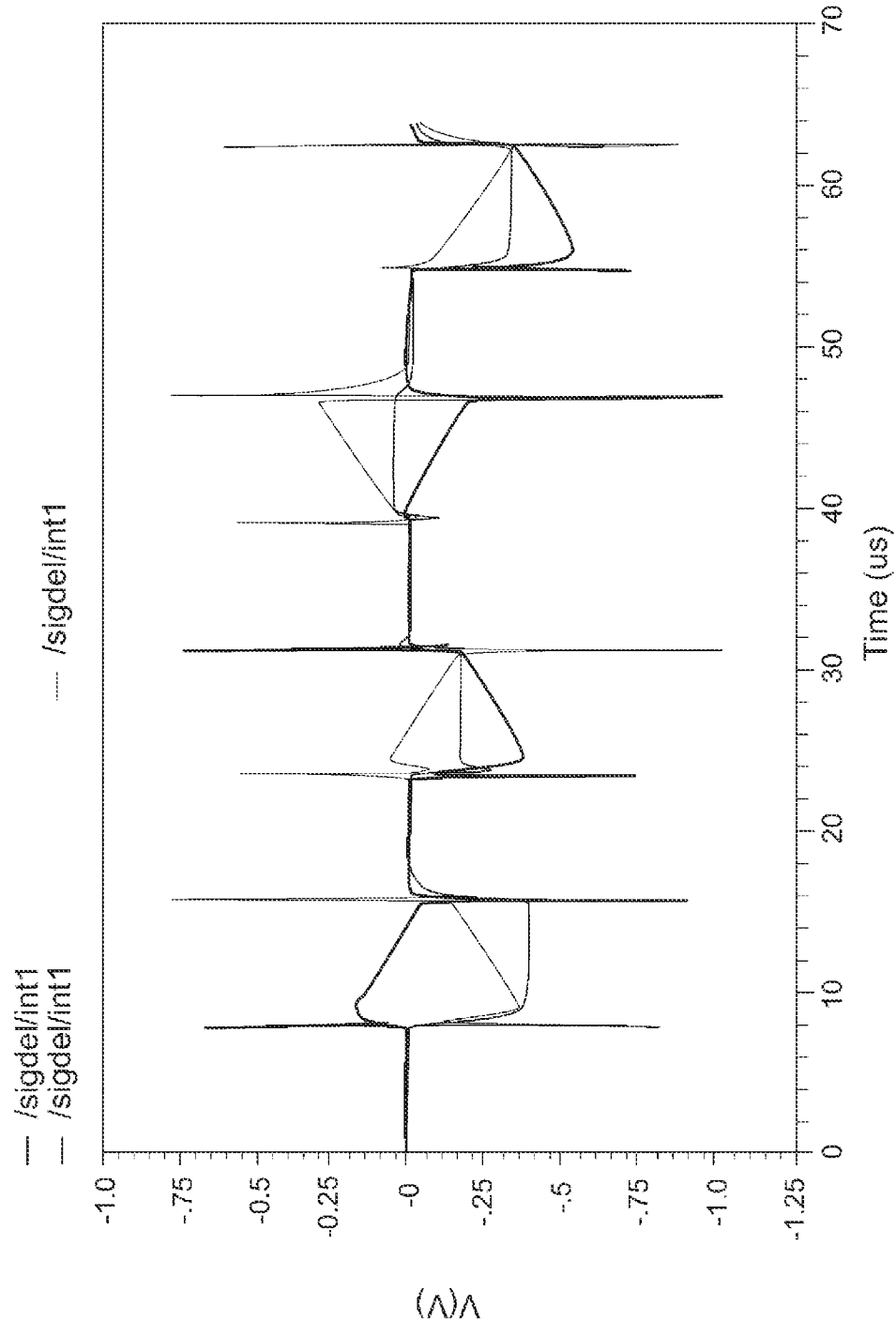
FIG. 39 shows output of integrator 1 with leakage of ±50 nA and clk/2 chopping.

FIG. 39 shows the cancellation of 50 nA of leakage current with the corrected result being obtained every second cycle.

The chop signal should change at the same time as ph0 not when the input clock of the 2-phase clock generator changes as this results in large errors. The best solution is to have an enabled toggle clocking on ph0 and taking its enable from a programmable divider that operates on the same clock as the decimation filter.

8.2.6 Sensor Parallel Resistance

Figure 40:
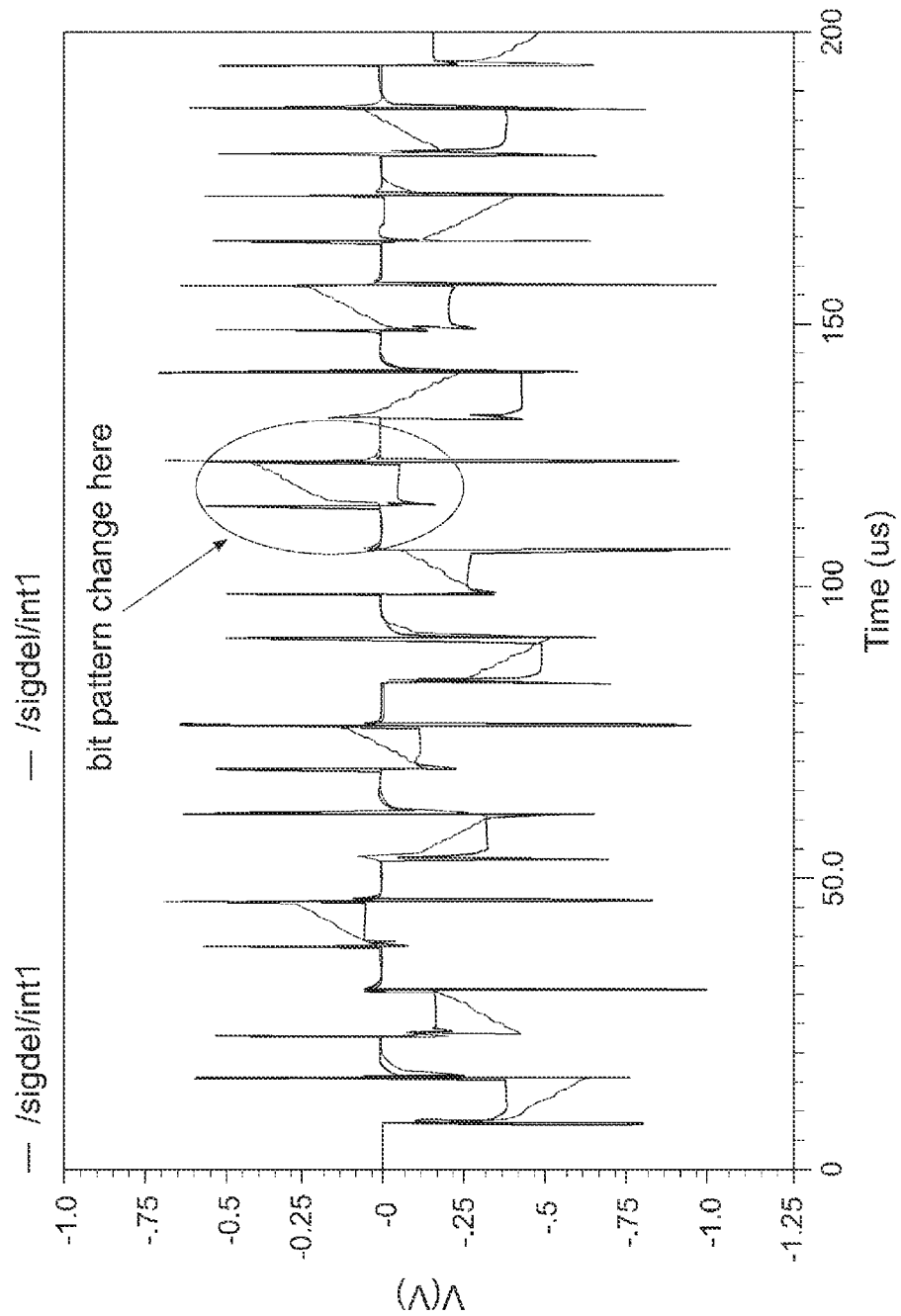
FIG. 40 shows the effect of sensor parallel resistance (18 Mohms)

Sensor parallel resistance cannot be corrected by chopping and provides a time dependant charge injection. This looks like a capacitor in parallel with the sensor but one whose value depends on the clock frequency. Taking a resistor that would leak 50 nA of value 1.8/(2*50 nA)=18 Mohms; FIG. 40 shows that after a few cycles, the bit pattern deviates from the reference with no parallel resistor.

The equivalent capacitance is given by:

$$C_{eq} = \frac{1}{4F_s R_p} \quad (EQ\ 30)$$

where $F_s$ is the sampling frequency and $R_p$ the parallel resistance. The factor of 4 occurs because of 2 factors of 2. The first is that integration of the leakage current only takes place during the evaluation phase of the integrator which is half the cycle time. Secondly, because of the CDS, charge is taken into account on both phases of the clock for the capacitor. Effectively, the sensor capacitor is subject to a voltage swing of vdd but the resistor only to vdd/2. This is because the virtual earth point is held at vdd/2 and the resistor driven with 0 or vdd. For $F_s$=64 kHz and $R_p$=1 Gohm, $C_{eq}$=3.9 fF.

This is confirmed by the Analog Devices datasheet, which infers at least 1 Gohm to be equivalent to a capacitance change of 8 fF or 6 gm (with $F_s$=32 kHz).

If the pen down threshold were set to 12 gm, the capacitance change would be 5.42 fF. Then if the error due to $R_p$ was allowed to be 10% or 0.54 fF, $R_p$ needs to be >7.2 Gohm. $R_p$ can be calibrated out so then it is the change in $R_p$ that becomes important.

Since $C_{eq}$ is a sampling frequency dependant capacitor, it would be possible to make measurements at 2 different frequencies and isolate it from the real parasitic capacitance. The use of the highest possible sampling frequency would minimise its effect but this is contrary to minimising power consumption.

8.2.7 Sensor Series Resistance

This is another of the design criteria which may be considered for the arrangement of the present invention.

8.2.8 Driver Parasitic Capacitance

The driver output must settle within half a clock cycle. Assuming constant current drive in the following:

$$I_{min} = 2F_s C_{par} V_d \qquad (EQ\ 31)$$

then for $F_s$=64 kHz, $C_{par}$=50 pF, $V_d$=1.8 V, $I_{min}$=11.5 uA.

Assuming resistive drive, then:

$$R_{max} = \frac{1}{2F_s C_{par} \ln(1-tol)} \qquad (EQ\ 32)$$

To cancel the sensor parallel parasitic capacitance, the drive waveform needs to settle to high accuracy. An error of 1% when this capacitance is 2 pF would result in a cancellation error of 20 fF. Simulation indicates that a source resistance of up to 10 Kohms should be acceptable at the voltage reference allowing for additional resistance in the switches.

8.2.9 RF Filter

This is not an anti-aliasing filter. Since it is inside a switched capacitor circuit, its cut-off frequency directly affects the settling time. As an approximation, the cut-off frequency should be about $10F_s$. With a fixed cut-off and highest sampling frequency of 1 MHz, it should be set to 10 MHz.

8.2.10 Power Saving

By using clocked bias, tt is possible to save current during the sample phase of the integrators (clock ph0=1) as a lower voltage gain is acceptable when the outputs are connected to the inputs. A reduction in current consumption to 10% is possible during the sample phase.

Figure 41:
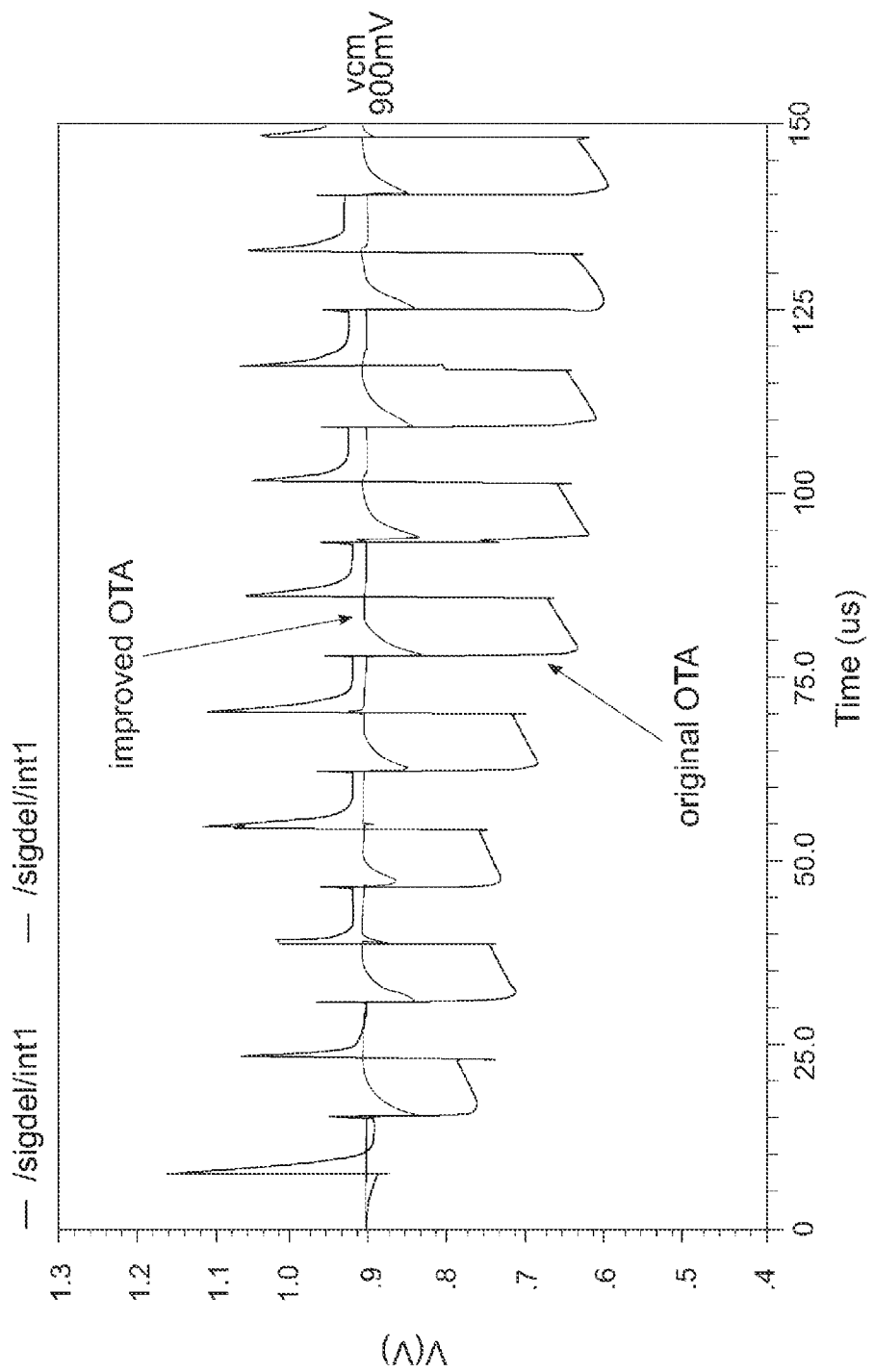
FIG. 41 shows common mode voltage.

There was a problem with the common mode amplifier as it had to adapt its output each time the bias current changed. The common mode voltage at the outputs was dropping to 600mV during low current, as illustrated in FIG. 41; there was insufficient time for it to recover.

The original OTA relied on the common mode amplifier offsetting a bias current in the output branches of the OTA. This offset was dependant on the bias current so needed correction each time the bias current was switched. This was solved by making the common mode amplifier push-pull and balancing currents in the output branches of the main OTA. The sigma-delta modulator now performs very well at low current.

TABLE 5

| Supply Current | | |
| --- | --- | --- |
| ph0 = 1 | 0 | average |
| 33 uA | 85 uA | 60 uA |

Table 5 above shows the current consumption during the 2 clock phases and the average with a 64 kHz clock. Clocked biasing was only applied to the sigma-delta convertor as no benefit could be obtained from the buffer amplifier. Further current will be required by the bandgap reference and low power oscillator.

8.2.11 PSRR

At DC, there is no dependence on vdd other than the operating range of the circuits as it cancels in the equations of the interface. However, the feedback loop cannot cancel variation from one clock cycle to the next although some averaging out may occur in the decimation filter. This can be seen in the VHDL model but the amount of supply rejection is not simple to estimate as it varies with the sensor capacitance.

The solution is to provide regulated reference levels in the CDC. This will reduce slightly the SNR of the CDC as the reference levels must each be some 400mV away from the power supplies.

The common mode voltage, vcm, also needs to be regulated and not derived directly from VDD. Vcm must be set for optimum operation at $VDD_{min}$ or about 800 mV.

Register control over the reference and vcm voltages should be provided.

The Analog Devices datasheet gives no information on supply rejection other than at DC, 50 Hz and 60 Hz. AD7745 board measurements may be performed.

8.2.12 Integrator Reset

Mainly for simulation. All switches are closed to save adding more.

8.2.13 Summing Point

With an input swing of 1.8 V, the summing point voltage shown in FIG. 42 can reach 0.9±1.8 V instantaneously before the OTA can respond. This will result in clipping and loss of charge giving rise to large errors at the output of the integrator. It can be solved by either increasing the rise and fall times of the drive waveform but this is undesirable as a low impedance slew rate limited driver would be needed. Alternatively, a capacitor can be added to ground at the summing point. If this were equal to the input capacitor, the voltage swing would be limited to 0.9±0.9 V. This will be provided by the pad and ground parasitic capacitances.

The direct path through $C_{ref}$ and $C_f$ to the output explains the glitches that are seen there.

8.2.14 Connection of Inn to VCM

The average voltage at the buffer summing point should be vcm when the sensor is operating correctly. If a short circuit between the plates occurs, the voltage will toggle between GND and VDD. This can be detected by a couple of comparators with reference levels of vcm±$V_t$ and a simple low pass filter. This will also detect any short of the sensing input to GND or VDD.

Or simply detect if the summing point goes below GND+$V_t$ or above VDD−$V_t$. Minimise current consumption.

8.3 Sensor Requirements

Figure 43:
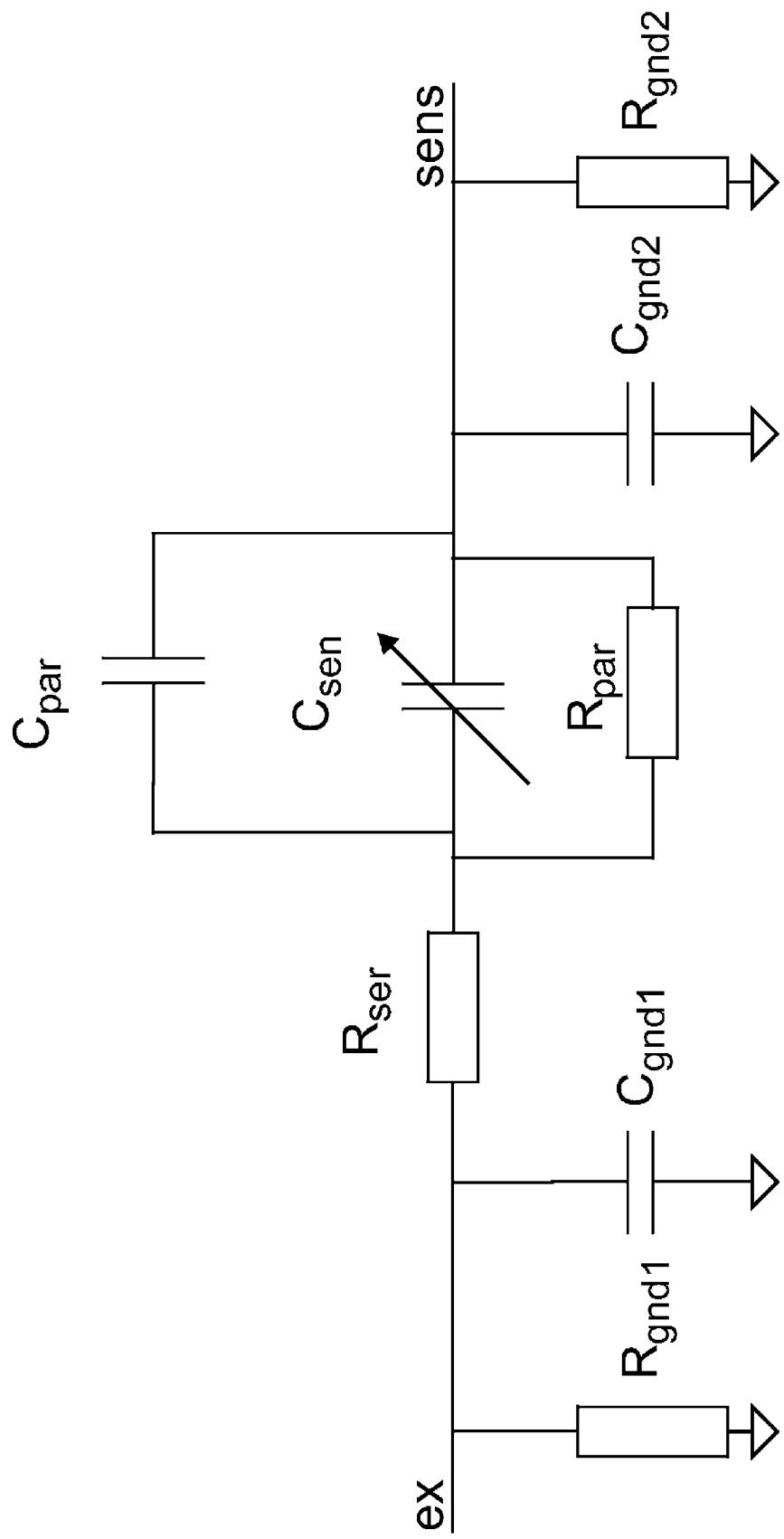
FIG. 43 shows a sensor equivalent circuit.

FIG. 43 illustrates a sensor equivalent circuit for determining sensor requirements.

In Table 6 below, only one impairment is applied at a time.

TABLE 6

Capacitive sensor requirements ($F_s$ = 64 kHz)

| Parameter | Sym | Comments | Min | Typ | Max | Units |
|---|---|---|---|---|---|---|
| Capacitance at minimum force | $C_{senmin}$ | Excluding $C_{par}$ | | 0.33 | | pF |
| Capacitance at maximum force | $C_{senmax}$ | Excluding $C_{par}$ | | 1 | | pF |
| Parallel parasitic capacitance | $C_{par}$ | Can be cancelled with $C_{can}$ | 0 | | 5.1 | pF |
| Excitation node parasitic capacitance | $C_{gnd1}$ | | | | 50 | pF |
| Sensing node parasitic capacitance | $C_{gnd2}$ | 1fF error when $C_{sen}$ = 0.5 pF | | | 15 | pF |
| Series resistance | $R_{ser}$ | | | | 10 | Kohm |
| Parallel resistance[a] | $R_{par}$ | 1fF error when $C_{sen}$ = 0.5 pF | 4 | | | Gohm |
| Excitation node parasitic resistance | $R_{gnd1}$ | 1fF error when $C_{sen}$ = 0.5 pF | 30 | | | Mohm |
| Sensing node parasitic resistance | $R_{gnd2}$ | 1fF error when $C_{sen}$ = 0.5 pF; chopping on. | 30 | | | Mohm |

[a]Without dynamic zero force correction

8.4 Calibration Procedure

The required decimation factor and corresponding decimator shift should be set first. The ADC offset should be set to 0. Both modes of operation require 2 point calibration to take out gain and offset errors. Only one calibrated force of 500 gm needs to be applied.

The gain of the CDC depends on absolute capacitor values to is subject to process variation (typically ±10% for MiM capacitors). The offset will be dominated by sensor parasitic capacitance, $C_{par}$ and the mechanical tolerances of the sensor. Also, $R_{par}$ could be significant and must be maximised by good design. If dynamic calibration is used, only $C_{can}$ should be used to offset $R_{par}$, so that the converter remains in its normal operating range.

8.4.1 1/C Mode

The following procedure elements are used.

The nominal zero force capacitance, $C_{senmin}$, must be known; this is a design parameter of the force sensor.

$C_{in1}$ must be set so that the convertor operates at 10% of full scale under zero force conditions. This value can be calculated given $C_{sensmin}$. Using EQ 18 and assuming $C_{par}$ has been cancelled, $C_{in1}$=0.9$C_{sensmin}$. For example, with $C_{sensmin}$=0.3333 pF, set $C_{in1}$=0.3 pF.

Cancel $C_{par}$ by adjusting $C_{can}$ until the converter reads 10% of scale. The typical value for $C_{par}$ will be known and should get the converter out of saturation. Using the example of Section 8.1.3.1, with scale=64, the reading at 10% will be 116.

Set the ADC offset to zero the converter. (Since the converter output cannot be negative, perform this step now and not before setting the 10% point).

Apply the calibrated force and record the output; this sets the gain calibration factor.

8.4.2 C Mode

The following procedure elements are used.

The parameters $K_4$ and $K_5$ used in EQ 17 will have been determined so the sensor and converter need to be calibrated to match it.

Set $C_{par}$ and $C_{in1}$ to their typical values to get the converter into its operating range.

Calculate the force from the current converter output.

Apply the calibrated force and record the calculated force; the difference between the two calculations sets the gain calibration.

Calculate the value for $C_{in1}$ that gives the required gain correction and set this value.

With no applied force, calculate the force and calculate the required value for $C_{can}$ that will set the force to zero and set this value.

8.4.3 Dynamic Calibration

The step size of $C_{can}$ is likely to be about 20 fF which represents a force change of 42 gm. A combination of adjustment of $C_{can}$ and the ADC offset must be used so that the pen-down threshold remains accurate. In the case of 1/C operation, the gain calibration factor needs to be recalculated. Without recalculation, the $C_{can}$ step size will result in a 10% gain error (which may be acceptable).

8.5 AD7745 Measurements

Some measurements to evaluate interfering signal immunity of an AD7745 have been made. An unwanted signal was injected into the CIN1 pin, which is the output side of the sensor capacitor, via a 39 pF capacitor. The addition of this capacitor has negligible effect on the measured sensor capacitor since it is connected to ground via the output impedance of the signal generator. The sensor capacitance was mostly parasitic capacitance of about 60 fF.

The board was set up to output the maximum sampling rate of 90 Hz and both CAPDAC's switched off. The excitation level was the maximum of ±VDD/2 and operated in single ended mode. The excitation frequency was about 33 kHz.

The signal level (measured on CIN1) required to alter the measured capacitor was adjusted to give a −20 fF error. See Table 7 below:

TABLE 7

| F (MHz) | level mVpk-pk |
|---|---|
| 2 | 120 |
| 2.4 | 150 |
| 3 | 180 |
| 4 | 220 |
| 5 | 300 |
| 6 | 440 |
| >7 | <600 |

8.5.1 Observations

Above 2 MHz, the injected signal reduces the measured capacitance.

Below 1 MHz, the injected signal increases the measured capacitance.

Between 1 MHz and 2 MHz, depending on the frequency and amplitude, the capacitance error can go in either direction.

Frequencies which are near harmonics of the excitation frequency result in the most sensitivity (these will be aliased down to the passband).

With chop enable selected, the immunity increased by a factor of about 3 times. The maximum output sampling rate was 49.8 Hz.

There appears to be a pole at about 3 MHz which is either implemented as an input RC filter or due to the integrator op-amp bandwidth. The data sheet recommends no more than 1 K input series resistance implying an RC filter with C=53 pF (rather large) could be added.

The most likely source of interference is the serial interface at 35 MHz and Bluetooth at 2.4 GHz; well away from 3 MHz.

8.5.2 Noise Measurements

These were made with a mechanical mock up of a capacitive proximity detector. CAPDACA was set to the maximum of 16.87 pF to offset the parasitic capacitance of the sensor. A capacitance change of about 0.75 pF was seen in the linear region and 1.75 pF using sticky tape as the dielectric at the end of the range. With 90 Hz sampling and ±VDD/2 excitation, the noise levels were measured with 1000 samples in "pen-up" as 0.00036 pFrms and 0.0032 pFpk-pk.

Assuming white noise, the scaling factor from 90 Hz to 1.3 kHz is 10*log(1300/90)=11.6 dB.

For a range of 0.75 pF, pk-pk signal to rms noise S/N=20*log(0.75/0.00036)=66.4 dB. (note that the AD7745 calculates its S/N for a capacitance range of 8 pF giving an rms resolution of 13 bits or 78 dB S/N). Scaling for 1.3 kHz, S/N=66.4 dB−11.6 dB=54.8 dB (9.1 ENOB).

With the sensor disconnected and CAPDACA off, the measured capacitance was 0.0052 pF. The rms noise measured reduced to 0.0000654 pFrms which is a 14.8 dB improvement.

8.6 Conclusions

The sigma-delta capacitive interface arrangements of the present invention provide a robust solution to the problem of force sensing, particularly for the nib of the Netpage sensing device. The above-described arrangements have the advantages of providing convertor output directly proportional to applied force, avoiding hardware division in the calculation of force from the convertor output, maintaining constant accuracy over the force range, and making use of the full range of the convertor.

Further advantages of the specific and modeled examples are:

Low impedance drive (excitation) into the sensor capacitor, voltage pickup immunity;

Sensor capacitor drives a virtual earth, voltage pickup immunity;

High tolerance to parasitic capacitance to ground on both sides of the sensor capacitor;

No active guard required;

Can be designed to provide an output proportional to 1/C (compressing the output as C increases and conversely providing enough resolution for small values of C);

Good immunity to RF (>10 MHz) induced voltages;

Does not need an accurate clock;

Does not need an accurate voltage reference so the maximum excitation ±VDD/2 can be used;

The usual benefits of sigma-delta conversion apply;

If power consumption can be made low enough (in processor sleep mode), pen-down offset can be applied in the digital domain; and Sampling rate can be increased when the processor is on to improve unwanted signal rejection.

It will, of course, be appreciated that the present invention has been described purely by way of example and that modifications of detail may be made within the scope of the invention as described herein.

The invention claimed is:

1. A capacitive sensor circuit, a reference capacitor connected to an input of the capacitive sensor circuit, a sensor capacitor having variable capacitance $C_{sen}$ arranged within a capacitive feedback circuit of the capacitive sensor circuit which has an integrator such that one of the plates of the sensor capacitor is connected directly to an output of the capacitive sensor circuit, a feedback capacitor connected across the integrator, and a capacitor connected across the sensor capacitor for cancelling parasitic capacitance across the sensor capacitor, the arrangement of the capacitors resulting in the output of the capacitive sensor circuit being proportional to $1/C_{sen}$.

2. A sensor circuit as claimed in claim 1, wherein the sensor capacitor is a parallel plate capacitor having one fixed plate and one movable plate.

3. A sensor circuit as claimed in claim 2, wherein the movable plate is configured to move relative to the fixed plate due to a pressure force exerted on the movable plate thereby altering separation of the plates and said capacitance $C_{sen}$.

4. A sensor circuit as claimed in claim 2, wherein a compression spring is connected to the movable plate.

5. A sensor circuit as claimed in claim 1, wherein the capacitive sensor circuit is a sigma-delta convertor circuit.

* * * * *